US010306632B2

(12) United States Patent
Gaal et al.

(10) Patent No.: US 10,306,632 B2
(45) Date of Patent: May 28, 2019

(54) TECHNIQUES FOR TRANSMITTING CHANNEL USAGE BEACON SIGNALS OVER AN UNLICENSED RADIO FREQUENCY SPECTRUM BAND

(71) Applicant: QUALCOMM Incorporated, San Diego, CA (US)

(72) Inventors: Peter Gaal, San Diego, CA (US); Srinivas Yerramalli, San Diego, CA (US); Durga Prasad Malladi, San Diego, CA (US); Naga Bhushan, San Diego, CA (US); Yongbin Wei, La Jolla, CA (US); Tao Luo, San Diego, CA (US); Hao Xu, San Diego, CA (US); Wanshi Chen, San Diego, CA (US); Shimman Arvind Patel, San Diego, CA (US); Aleksandar Damnjanovic, Del Mar, CA (US); Xiaoxia Zhang, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 351 days.

(21) Appl. No.: 14/865,640

(22) Filed: Sep. 25, 2015

(65) Prior Publication Data
US 2016/0095120 A1 Mar. 31, 2016

Related U.S. Application Data

(60) Provisional application No. 62/057,418, filed on Sep. 30, 2014.

(51) Int. Cl.
H04W 72/04 (2009.01)
H04L 5/00 (2006.01)
(Continued)

(52) U.S. Cl.
CPC ....... *H04W 72/0453* (2013.01); *H04L 5/0007* (2013.01); *H04L 5/0048* (2013.01);
(Continued)

(58) Field of Classification Search
CPC ............ H04W 72/0453; H04L 5/0007; H04L 5/0048
See application file for complete search history.

(56) References Cited

U.S. PATENT DOCUMENTS

2009/0016411 A1* 1/2009 McCallister .......... H04L 5/0017
375/146
2011/0158104 A1* 6/2011 Frenger ............ H04W 74/0833
370/241
(Continued)

FOREIGN PATENT DOCUMENTS

| WO | WO-2012040520 A1 | 3/2012 |
| WO | WO-2015042594 A2 | 3/2015 |
| WO | WO-2015142555 A1 | 9/2015 |

OTHER PUBLICATIONS

ISA/EPO, Partial International Search Report of the International Searching Authority, Int'l. App. No. PCT/US2015/52588, dated Dec. 4, 2015, European Patent Office, Rijswijk, NL, 7 pgs.
(Continued)

Primary Examiner — Noel R Beharry
Assistant Examiner — Pamit Kaur
(74) Attorney, Agent, or Firm — Dalei Dong; Holland & Hart

(57) ABSTRACT

Techniques are described for wireless communication. A first method includes winning a contention for access to an unlicensed radio frequency spectrum band, and transmitting at least a portion of a channel usage beacon signal (CUBS) over the unlicensed radio frequency spectrum band. The at least portion of the CUBS is transmitted in a number of frequency interlaces of the unlicensed radio frequency spectrum band. A second method includes winning a contention
(Continued)

for access to an unlicensed radio frequency spectrum band; determining whether the contention is won within a threshold time before a next symbol period boundary; and transmitting at least a portion of a CUBS over the unlicensed radio frequency spectrum band. The at least portion of the CUBS is transmitted during a preamble including a fractional period of a first symbol period. The at least portion of the CUBS may be based at least in part on the determining.

111 Claims, 30 Drawing Sheets

(51) Int. Cl.
*H04W 16/14* (2009.01)
*H04W 40/24* (2009.01)
*H04W 74/08* (2009.01)
*H04W 88/02* (2009.01)
*H04W 88/08* (2009.01)
*H04L 1/00* (2006.01)

(52) U.S. Cl.
CPC .......... *H04L 5/0051* (2013.01); *H04L 5/0053* (2013.01); *H04W 16/14* (2013.01); *H04W 40/244* (2013.01); *H04W 72/0406* (2013.01); *H04W 74/0816* (2013.01); *H04L 1/0071* (2013.01); *H04L 5/001* (2013.01); *H04W 88/02* (2013.01); *H04W 88/08* (2013.01)

(56) References Cited

U.S. PATENT DOCUMENTS

| | | | |
|---|---|---|---|
| 2014/0031031 A1* | 1/2014 | Gauvreau | H04L 5/0053 455/426.1 |
| 2014/0112289 A1* | 4/2014 | Kim | H04W 16/14 370/329 |
| 2015/0071050 A1* | 3/2015 | Iranzo Molinero | H01L 33/10 370/210 |
| 2016/0050667 A1* | 2/2016 | Papasakellariou | H04W 74/0808 370/329 |
| 2017/0230970 A1* | 8/2017 | Kim | H04W 28/26 |

OTHER PUBLICATIONS

Qualcomm Incorporated, "Solutions for Required Functionalities and Design Targets," 3GPP TSG RAN WG1 #78bis, Ljubljana, Slovenia, R1-144000, Oct. 6-10, 2014, 3rd Generation Partnership Project.

ETRI, "Discussion on Channel Access Mechanism for Supporting LAA Using LTE," 3GPP TSG RAN WG1 Meeting #78bis, R1-143963, Ljubljana, Slovenia, Oct. 6-10, 2014, 4 pgs., 3rd Generation Partnership Project.

ISA/EPO, International Search Report and Written Opinion of the International Searching Authority, Int'l. App. No. PCT/US2015/52588, dated Mar. 22, 2016, European Patent Office, Rijswijk, NL, 24 pgs.

LG Electronics, "Candidate Solutions for LAA Operations," 3GPP TSG RAN WG1 Meetings #78bis, R1-144042, Ljubljana, Slovenia, Oct. 6-10, 2014, 6 pgs., 3rd Generation Partnership Project.

* cited by examiner

TECHNIQUES FOR TRANSMITTING CHANNEL USAGE BEACON SIGNALS OVER AN UNLICENSED RADIO FREQUENCY SPECTRUM BAND

CROSS REFERENCES

The present application for Patent claims priority to U.S. Provisional Patent Application No. 62/057,418 by Gaal et al., entitled "Techniques for Transmitting Channel Usage Beacon Signals Over an Unlicensed Radio Frequency Spectrum Band," filed Sep. 30, 2014, assigned to the assignee hereof, and expressly incorporated by reference in its entirety herein.

BACKGROUND

1. Field of the Disclosure

The present disclosure, for example, relates to wireless communication systems, and more particularly to techniques for transmitting channel usage beacon signals over an unlicensed radio frequency spectrum band.

2. Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, single-carrier frequency-division multiple access (SC-FDMA) systems, and orthogonal frequency-division multiple access (OFDMA) systems.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station).

Some modes of communication may enable communications between a base station and a UE over an unlicensed radio frequency spectrum band, or over different radio frequency spectrum bands (e.g., a licensed radio frequency spectrum band or an unlicensed radio frequency spectrum band) of a cellular network. With increasing data traffic in cellular networks that use a licensed radio frequency spectrum band, offloading of at least some data traffic to an unlicensed radio frequency spectrum band may provide a cellular operator with opportunities for enhanced data transmission capacity. An unlicensed radio frequency spectrum band may also provide service in areas where access to a licensed radio frequency spectrum band is unavailable.

Prior to gaining access to, and communicating over, an unlicensed radio frequency spectrum band, a base station or UE may perform a listen before talk (LBT) procedure to contend for access to the unlicensed radio frequency spectrum band. An LBT procedure may include performing a clear channel assessment (CCA) procedure to determine whether a channel of the unlicensed radio frequency spectrum band is available. When it is determined that the channel of the unlicensed radio frequency spectrum band is available, a channel usage beacon signal (CUBS) may be transmitted to reserve the channel.

SUMMARY

The present disclosure, for example, relates to one or more techniques for transmitting CUBS over an unlicensed radio frequency spectrum band. At times, a first UE may attempt to reserve a first channel of an unlicensed radio frequency spectrum band while a second UE is transmitting on a second channel of the unlicensed radio frequency spectrum band. The second channel may have a tone or frequency spectrum adjacent the first channel. When the first UE wins contention for access to the first channel at a symbol period boundary, the first UE may generate a CUBS having a length that matches the duration of the symbol period, and the CUBS may be transmitted orthogonally to a transmission on the second channel. However, when the first UE wins contention for access to the first channel between symbol period boundaries, the first UE may transmit a shortened CUBS or a portion of a CUBS. Because a duration of the shortened CUBS or portion of a CUBS is shorter than a symbol period, and because transmission of the shortened CUBS or portion of a CUBS commences between symbol period boundaries, the shortened CUBS or portion of a CUBS may not be orthogonal to a transmission on the second channel, and may interfere with the transmission on the second channel. Techniques for mitigating this interference are described in this disclosure.

In an example, a method for wireless communication is described. In one example, the method may include winning a contention for access to an unlicensed radio frequency spectrum band, and transmitting at least a portion of a CUBS over the unlicensed radio frequency spectrum band. The at least portion of the CUBS may be transmitted in a number of frequency interlaces of the unlicensed radio frequency spectrum band.

In some examples of the method, the transmitting at least a portion of a CUBS over the unlicensed radio frequency spectrum band may include transmitting at least a portion of a first CUBS and at least a portion of a second CUBS over the unlicensed radio frequency spectrum band, and the transmitting may occur during a preamble including at least a fractional period of a first symbol period. The first CUBS may be different from the second CUBS.

In some examples of the method, the first symbol period may include a plurality of sub-periods, and the transmitting may include transmitting an instance of the first CUBS in each of a number of full sub-periods that follow the winning the contention for access to the unlicensed radio frequency spectrum band. In these examples, the first CUBS may include a periodic zero crossing that provides smoothness in the time domain when the instance of the first CUBS is abutted to another instance of the first CUBS or the second CUBS.

In some examples of the method, the preamble may include a second symbol period following the first symbol period, and the transmitting may include transmitting a beginning portion of the first CUBS during the fractional period of the first symbol period and transmitting the second CUBS during the second symbol period.

In some examples of the method, the preamble may include a second symbol period following the first symbol period, and the method may further include time-aligning the second CUBS with the second symbol period. In these examples, the transmitting may include transmitting the first CUBS across the fractional period of the first symbol period and a first portion of the second symbol period, and transmitting an ending portion of the time-aligned second CUBS during a second portion of the second symbol period.

In some examples of the method, the preamble may include a second symbol period following the first symbol period and a third symbol period following the second symbol period. In these examples, the transmitting may include transmitting the first CUBS across the fractional period of the first symbol period and a first portion of the second symbol period, transmitting a beginning portion of the first CUBS during a second portion of the second symbol period; and transmitting the second CUBS during the third symbol period.

In some examples of the method, the preamble may include a second symbol period following the first symbol period, and the method may further include time-aligning the first CUBS with the first symbol period. In these examples, the transmitting may include transmitting an ending portion of the time-aligned first CUBS during the fractional period of the first symbol period, and transmitting the second CUBS during the second symbol period.

In some examples, the method may include performing a windowing and overlap-and-add operation at a transmission juncture of the at least portion of the first CUBS and the at least portion of the second CUBS. In some examples, the method may include performing a windowing and overlap-and-add operation at a commencement of transmission of the at least portion of the first CUBS. In some examples of the method, each of the first CUBS and the second CUBS may include a duration of one symbol period.

In some examples of the method, the second CUBS may include a copy of a signal included in a transmission to be made over the unlicensed radio frequency spectrum band subsequent to a transmission of the at least portion of the first CUBS and the at least portion of the second CUBS. In some examples, the signal may include a demodulation reference signal (DM-RS). In some examples, the transmission may include at least one of a physical uplink shared channel (PUSCH), a physical uplink control channel (PUCCH), a physical random access channel (PRACH), a sounding reference signal (SRS), a scheduling request (SR), or a combination thereof.

In some examples of the method, the at least portion of the first CUBS and the at least portion of the second CUBS may be transmitted over the unlicensed radio frequency spectrum band using a same set of antenna ports and precoder used for a first transmission over the unlicensed radio frequency spectrum band subsequent to the transmission of the at least portion of the first CUBS and the at least portion of the second CUBS. In some examples of the method, the winning the contention and the transmitting may be performed by a UE.

In an example, an apparatus for wireless communication is described. In one example, the apparatus may include means for winning a contention for access to an unlicensed radio frequency spectrum band, and means for transmitting at least a portion of a CUBS over the unlicensed radio frequency spectrum band. The at least portion of the CUBS may be transmitted in a number of frequency interlaces of the unlicensed radio frequency spectrum band.

In some examples of the apparatus, the means for transmitting at least a portion of a CUBS over the unlicensed radio frequency spectrum band may include means for transmitting at least a portion of a first CUBS and at least a portion of a second CUBS over the unlicensed radio frequency spectrum band, and the transmitting may occur during a preamble including at least a fractional period of a first symbol period. The first CUBS may be different from the second CUBS.

In some examples of the apparatus, the first symbol period may include a plurality of sub-periods, and the means for transmitting may include transmitting an instance of the first CUBS in each of a number of full sub-periods that follow the winning the contention for access to the unlicensed radio frequency spectrum band. In these examples, the first CUBS may include a periodic zero crossing that provides smoothness in the time domain when the instance of the first CUBS is abutted to another instance of the first CUBS or the second CUBS.

In some examples of the apparatus, the preamble may include a second symbol period following the first symbol period, and the means for transmitting may include means for transmitting a beginning portion of the first CUBS during the fractional period of the first symbol period and transmitting the second CUBS during the second symbol period.

In some examples of the apparatus, the preamble may include a second symbol period following the first symbol period, and the apparatus may further include means for time-aligning the second CUBS with the second symbol period. In these examples, the means for transmitting may include means for transmitting the first CUBS across the fractional period of the first symbol period and a first portion of the second symbol period, and means for transmitting an ending portion of the time-aligned second CUBS during a second portion of the second symbol period.

In some examples of the apparatus, the preamble may include a second symbol period following the first symbol period and a third symbol period following the second symbol period. In these examples, the means for transmitting may include means for transmitting the first CUBS across the fractional period of the first symbol period and a first portion of the second symbol period, means for transmitting a beginning portion of the first CUBS during a second portion of the second symbol period; and means for transmitting the second CUBS during the third symbol period.

In some examples of the apparatus, the preamble may include a second symbol period following the first symbol period, and the apparatus may further include means for time-aligning the first CUBS with the first symbol period. In these examples, the means for transmitting may include means for transmitting an ending portion of the time-aligned first CUBS during the fractional period of the first symbol period, and means for transmitting the second CUBS during the second symbol period.

In some examples, the apparatus may include means for performing a windowing and overlap-and-add operation at a transmission juncture of the at least portion of the first CUBS and the at least portion of the second CUBS. In some examples, the apparatus may include means for performing a windowing and overlap-and-add operation at a commencement of transmission of the at least portion of the first CUBS. In some examples of the apparatus, each of the first CUBS and the second CUBS may include a duration of one symbol period.

In some examples of the apparatus, the second CUBS may include a copy of a signal included in a transmission to be made over the unlicensed radio frequency spectrum band subsequent to a transmission of the at least portion of the first CUBS and the at least portion of the second CUBS. In some examples, the signal may include a demodulation reference signal (DM-RS). In some examples, the transmission may include at least one of a physical uplink shared channel (PUSCH), a physical uplink control channel (PUCCH), a physical random access channel (PRACH), a sounding reference signal (SRS), a scheduling request (SR), or a combination thereof.

In some examples of the apparatus, the at least portion of the first CUBS and the at least portion of the second CUBS may be transmitted over the unlicensed radio frequency spectrum band using a same set of antenna ports and precoder used for a first transmission over the unlicensed radio frequency spectrum band subsequent to the transmission of the at least portion of the first CUBS and the at least portion of the second CUBS. In some examples of the apparatus, the apparatus may include a user equipment (UE).

In an example, another apparatus for wireless communication is described. In one example, the apparatus may include a processor, memory in electronic communication with the processor, and the processor and memory configured to win a contention for access to an unlicensed radio frequency spectrum band, and to transmit at least a portion of a CUBS over the unlicensed radio frequency spectrum band. The at least portion of the CUBS may be transmitted in a number of frequency interlaces of the unlicensed radio frequency spectrum band.

In some examples of the apparatus, the processor and memory may be configured to transmit at least a portion of a CUBS over the unlicensed radio frequency spectrum band may include transmitting at least a portion of a first CUBS and at least a portion of a second CUBS over the unlicensed radio frequency spectrum band, and the transmitting may occur during a preamble including at least a fractional period of a first symbol period. The first CUBS may be different from the second CUBS.

In some examples of the apparatus, the first symbol period may include a plurality of sub-periods, and the processor and memory configured to transmit may include transmitting an instance of the first CUBS in each of a number of full sub-periods that follow the winning the contention for access to the unlicensed radio frequency spectrum band. In these examples, the first CUBS may include a periodic zero crossing that provides smoothness in the time domain when the instance of the first CUBS is abutted to another instance of the first CUBS or the second CUBS.

In some examples of the apparatus, the preamble may include a second symbol period following the first symbol period, and the processor and memory configured to transmit may include instructions executable by the processor to transmit a beginning portion of the first CUBS during the fractional period of the first symbol period and transmitting the second CUBS during the second symbol period.

In some examples of the apparatus, the preamble may include a second symbol period following the first symbol period, and the processor and memory may be configured to time-align the first CUBS with the first symbol period. In these examples the processor and memory configured to time-align may include instructions executable by the processor to transmit comprise instructions executable by the processor to transmit an ending portion of the time aligned first CUBS during the fractional period of the first symbol period and transmit the second CUBS during the second symbol period.

In some examples of the apparatus, the processor and memory may be configured to perform a windowing and overlap-and-add operation at a transmission juncture of the at least portion of the first CUBS and the at least portion of the second CUBS. In some examples of the apparatus the processor and memory may be configured to perform a windowing and overlap-and-add operation at commencement of transmission of the at least portion of the first CUBS. In some examples, the apparatus may include a user equipment (UE).

In an example, a non-transitory computer-readable medium storing computer-executable code for wireless communications is described. In one example, the code may be executable by a processor to win a contention for access to an unlicensed radio frequency spectrum band, and to transmit at least a portion of a CUBS over the unlicensed radio frequency spectrum band. The at least portion of the CUBS may be transmitted in a number of frequency interlaces of the unlicensed radio frequency spectrum band.

In some examples, the non-transitory computer-readable medium may include the code executable by the processor to transmit at least a portion of a CUBS over the unlicensed radio frequency spectrum band. In these examples, the code may include code executable by the processor to transmit at least a portion of a first CUBS and at least a portion of a second CUBS over the unlicensed radio frequency band. In these examples, the transmitting may occur during a preamble comprising at least a fractional period of a first symbol period, and the first CUBS may be different from the second CUBS.

In some examples, the code executable by the processors to transmit at least a portion of a CUBS over the unlicensed radio frequency spectrum band may include code executable by the processor to transmit at least a portion of a first CUBS and at least a portion of a second CUBS over the unlicensed radio frequency spectrum band. In some examples, the transmitting may occur during a preamble comprising at least a fractional period of a first symbol period, the first CUBS being different from the second CUBS.

In some examples of the non-transitory computer-readable medium, the first symbol period may include a plurality of sub-periods, and the code executable by the processor to transmit may include code to transmit an instance of the first CUBS in each of a number of full sub-periods that follow the winning the contention for access to the unlicensed radio frequency spectrum band.

In some examples of the non-transitory computer-readable medium, the preamble may include a second symbol period following the first symbol period. In these examples, the code executable by the processor to transmit may include code executable by the processor to transmit a beginning portion of the first CUBS during the fractional period of the first symbol period; and transmit the second CUBS during the second symbol period.

In some examples of the non-transitory computer-readable medium, the preamble may include a second symbol period following the first symbol period. In these examples, the code may be executable by the processor to time-align the first CUBS with the first symbol period. In these examples, the code executable by the processor to transmit comprises code executable by the processor to transmit an ending portion of the time-aligned first CUBS during the fractional period of the first symbol period; and transmit the second CUBS during the second symbol period.

In an example, another method for wireless communication is described. In one example, the method may include winning a contention for access to an unlicensed radio frequency spectrum band, determining whether the contention is won within a threshold time before a next symbol period boundary, and transmitting at least a portion of a CUBS over the unlicensed radio frequency spectrum band. The at least portion of the CUBS may be transmitted during a preamble including a fractional period of a first symbol period. The at least portion of the CUBS may be based at least in part on the determining.

In some examples of the method, the contention may be won within the threshold time before the next symbol period boundary, the preamble may include a second symbol period following the fractional period of the first symbol period, and the at least portion of the CUBS may be transmitted during the second symbol period.

In some examples of the method, the contention may be won within the threshold time before the next symbol period boundary, the preamble may include a second symbol period following the fractional period of the first symbol period, and the at least portion of the CUBS may include a first CUBS transmitted across the fractional period of the first symbol period and a first portion of the second symbol period. In these examples, the method may further include time-aligning a second CUBS with the second symbol period, and transmitting an ending portion of the time-aligned second CUBS over the unlicensed radio frequency spectrum band during a second portion of the second symbol period.

In some examples of the method, the contention may be won within the threshold time before the next symbol period boundary, the preamble may include a second symbol period and a third symbol period following the fractional period of the first symbol period, and the at least portion of the CUBS may include a first CUBS transmitted across the fractional period of the first symbol period and a first portion of the second symbol period. In these examples, the method may further include transmitting a beginning portion of the first CUBS over the unlicensed radio frequency spectrum band during a second portion of the second symbol period, and transmitting a second CUBS over the unlicensed radio frequency spectrum band during the third symbol period.

In some examples of the method, the contention may be won within the threshold time before the next symbol period boundary, the preamble may include a second symbol period following the fractional period of the first symbol period, and the CUBS may include a first CUBS. In these examples, the method may further time-aligning the first CUBS with the first symbol period, transmitting an ending portion of the time-aligned first CUBS over the unlicensed radio frequency spectrum band during the fractional period of the first symbol period, and transmitting a second CUBS over the unlicensed radio frequency spectrum band during the second symbol period.

In some examples of the method, the winning the contention and the transmitting may be performed by a UE.

In an example, another apparatus for wireless communication is described. In one example, the apparatus may include means for winning a contention for access to an unlicensed radio frequency spectrum band, means for determining whether the contention is won within a threshold time before a next symbol period boundary, and means for transmitting at least a portion of a CUBS over the unlicensed radio frequency spectrum band. The at least portion of the CUBS may be transmitted during a preamble including a fractional period of a first symbol period. The at least portion of the CUBS may be based at least in part on the determining.

In some examples, the apparatus may include means for winning the contention within the threshold time before the next symbol period boundary. The preamble may include a second symbol period following the fractional period of the first symbol period and the at least portion of the CUBS may be transmitted during the second symbol period.

In some examples, the apparatus may include means for winning the contention within the threshold time before the next symbol period boundary. In these examples, the preamble may include a second symbol period following the fractional period of the first symbol period. In these examples, the at least portion of the CUBS may include a first CUBS transmitted across the fractional period of the first symbol period and a first portion of the second symbol period. In these examples, the apparatus may further include means for time-aligning a second CUBS with the second symbol period and means for transmitting an ending portion of the time-aligned second CUBS over the unlicensed radio frequency spectrum band during a second portion of the second symbol period.

In some examples, the apparatus may include means of winning the contention within the threshold time before the next symbol period boundary. In these examples, the apparatus may also include a second symbol period and a third symbol period following the fractional period of the first symbol period. In these examples, the at least portion of the CUBS may include a first CUBS transmitted across the fractional period of the first symbol period and a first portion of the second symbol period. In these examples, the apparatus may further include means for transmitting a beginning portion of the first CUBS over the unlicensed radio frequency spectrum band during a second portion of the second symbol period and means for transmitting a second CUBS over the unlicensed radio frequency spectrum band during the third symbol period.

In some examples of the apparatus, the contention may be won within the threshold time before the next symbol period boundary, and the preamble may include a second symbol period following the fractional period of the first symbol period. In these examples, the CUBS may include a first CUBS. The apparatus may further include means for time-aligning the first CUBS with the first symbol period, means for transmitting an ending portion of the time-aligned first CUBS over the unlicensed radio frequency spectrum band during the fractional period of the first symbol period, and means for transmitting a second CUBS over the unlicensed radio frequency spectrum band during the second symbol period. In some examples, the apparatus may include a user equipment (UE).

In an example, another apparatus for wireless communication is described. In one example, the apparatus may include a processor, memory in electronic communication with the processor, and the processor and memory configured to win a contention for access to an unlicensed radio frequency spectrum band, to determine whether the contention is won within a threshold time before a next symbol period boundary, and to transmit at least a portion of a CUBS over the unlicensed radio frequency spectrum band. The at least portion of the CUBS may be transmitted during a preamble including a fractional period of a first symbol period. The at least portion of the CUBS may be based at least in part on the determining.

In some examples of the apparatus, the contention may be won within the threshold time before the next symbol period boundary. In these examples, the preamble may include a second symbol period following the fractional period of the first symbol period, and the at least portion of the CUBS may include comprises a first CUBS transmitted across the fractional period of the first symbol period and a first portion of the second symbol period. The processor and memory may be configured to time-align a second CUBS with the second symbol period and transmit an ending portion of the time-aligned second CUBS over the unlicensed radio frequency spectrum band during a second portion of the second symbol period.

In some examples of the apparatus, the contention may be won within the threshold time before the next symbol period boundary. In these examples, the preamble may include a second symbol period and a third symbol period following the fractional period of the first symbol period, and the at least portion of the CUBS may include a first CUBS transmitted across the fractional period of the first symbol period and a first portion of the second symbol period. In these examples, the processor and memory may be configured to transmit a beginning portion of the first CUBS over the unlicensed radio frequency spectrum band during a second portion of the second symbol period and transmit a second CUBS over the unlicensed radio frequency spectrum band during the third symbol period.

In some examples of the apparatus, the contention may be won within the threshold time before the next symbol period boundary. In these examples, the preamble may include a second symbol period following the fractional period of the first symbol period, and the CUBS may include a first CUBS. In these examples, the processor and memory may be configured to time-align the first CUBS with the first symbol period, transmit an ending portion of the time-aligned first CUBS over the unlicensed radio frequency spectrum band during the fractional period of the first symbol period, and transmit a second CUBS over the unlicensed radio frequency spectrum band during the second symbol period.

In an example, another non-transitory computer-readable medium storing computer-executable code for wireless communications is described. In one example, the code may be executable by a processor to win a contention for access to an unlicensed radio frequency spectrum band, to determine whether the contention is won within a threshold time before a next symbol period boundary, and to transmit at least a portion of a CUBS over the unlicensed radio frequency spectrum band. The at least portion of the CUBS may be transmitted during a preamble including a fractional period of a first symbol period. The at least portion of the CUBS may be based at least in part on the determining.

In some examples of the non-transitory computer-readable medium, the contention may be won within the threshold time before the next symbol period boundary. In these examples, the preamble may include a second symbol period following the fractional period of the first symbol period, and the at least portion of the CUBS may include a first CUBS transmitted across the fractional period of the first symbol period and a first portion of the second symbol period. In these examples, the code may be executable by the processor to time-align a second CUBS with the second symbol period and transmit an ending portion of the time-aligned second CUBS over the unlicensed radio frequency spectrum band during a second portion of the second symbol period.

In some examples of the non-transitory computer-readable medium, the contention may be won within the threshold time before the next symbol period boundary. In these examples, the preamble may include a second symbol period and a third symbol period following the fractional period of the first symbol period, and the at least portion of the CUBS may include a first CUBS transmitted across the fractional period of the first symbol period and a first portion of the second symbol period. In these examples, the code may be executable by the processor to transmit a beginning portion of the first CUBS over the unlicensed radio frequency spectrum band during a second portion of the second symbol period and transmit a second CUBS over the unlicensed radio frequency spectrum band during the third symbol period.

In some examples of the non-transitory computer-readable medium, the contention may be won within the threshold time before the next symbol period boundary. In these examples, the preamble may include a second symbol period following the fractional period of the first symbol period, and the CUBS may include a first CUBS. The code may be executable by the processor to time-align the first CUBS with the first symbol period, transmit an ending portion of the time-aligned first CUBS over the unlicensed radio frequency spectrum band during the fractional period of the first symbol period, and transmit a second CUBS over the unlicensed radio frequency spectrum band during the second symbol period.

In an example, another method for wireless communication is described. In one example, the method may include winning a contention for access to an unlicensed radio frequency spectrum band, selecting a portion of a CUBS, and transmitting the portion of the CUBS over the unlicensed radio frequency spectrum band during a fractional period of a symbol period. The portion of the CUBS may be selected based at least in part on a timing of winning the contention with reference to a next symbol period boundary.

In some examples, the method may include selecting a plurality of tones included in a transmission to be made over the unlicensed radio frequency spectrum band subsequent to a transmission of the at least portion of the CUBS, mapping a discrete Fourier transform (DFT) output to the plurality of tones, and performing an inverse fast Fourier transform (IFFT) on the plurality of tones to generate the CUBS.

In some examples, the method may include generating a random sequence, and performing a DFT on the random sequence to generate the DFT output. In some examples, the random sequence may include a quadrature phase-shift keying (QPSK) sequence. In some examples, the random sequence may include a sequence in a set of Generalized Zadoff-Chu or chirp-like sequences. In some examples, the random sequence may include a polyphase sequence. In some examples, the plurality of tones may include ten tones, the random sequence may have a length of ten terms, and the DFT performed on the random sequence may have a length of ten.

In some examples, the method may include generating a random sequence, performing a DFT on the random sequence to generate an intermediate output, and downsampling the intermediate output to generate the DFT output. In some examples of the method, the transmission to be made over the unlicensed radio frequency spectrum band subsequent to the transmission of the portion of the CUBS may include at least one of a PUSCH, a PUCCH, a PRACH, an SRS, or an SR. In some examples of the method, selecting the plurality of tones may include selecting a tone in a middle of a resource block allocated to the transmission to be made over the unlicensed radio frequency spectrum band subsequent to the transmission of the portion of the CUBS. In some examples of the method, selecting the plurality of tones may include selecting a tone in a middle of a contiguous resource block cluster allocated to the transmission to be made over the unlicensed radio frequency spectrum band subsequent to the transmission of the portion of the CUBS. In some examples of the method, the plurality of tones may have a uniform frequency spacing in the unlicensed radio frequency spectrum band. In some examples of the method, the plurality of tones has a non-uniform frequency spacing in the unlicensed radio frequency spectrum band.

In some examples, the method may include performing a windowing and overlap-and-add operation for a transmission juncture of the portion of the CUBS and a subsequently transmitted signal. In some examples, the method may include performing a windowing and overlap-and-add operation for a commencement of transmission of the portion of the CUBS. In some examples of the method, the contention and the transmitting may be performed by a UE. In some examples of the method, the portion of the CUBS may include a beginning portion of the CUBS. In some examples of the method, the portion of the CUBS may include an ending portion of the CUBS.

In an example, another apparatus for wireless communication is described. In one example, the apparatus may include means for winning a contention for access to an unlicensed radio frequency spectrum band, means for selecting a portion of a CUBS, and means for transmitting the portion of the CUBS over the unlicensed radio frequency spectrum band during a fractional period of a symbol period. The portion of the CUBS may be selected based at least in part on a timing of winning the contention with reference to a next symbol period boundary, and the apparatus may also include means for transmitting the portion of the CUBS over the unlicensed radio frequency spectrum band during fractional period of a symbol period.

In some examples, the apparatus may include means for selecting a plurality of tones included in a transmission to be made over the unlicensed radio frequency spectrum band subsequent to a transmission of the at least portion of the CUBS. In these examples, the apparatus may also include means for mapping a discrete Fourier transform (DFT) output to the plurality of tones and means for performing an inverse fast Fourier transform (IFFT) on the plurality of tones to generate the CUBS.

In some examples, the apparatus may include means for generating a random sequence and means for performing a DFT on the random sequence to generate the DFT output.

In some examples, the random sequence may include a quadrature phase-shift keying (QPSK) sequence. In some examples, the random sequence may include a sequence in a set of Generalized Zadoff-Chu or chirp-like sequences. In some examples, the random sequence may include a polyphase sequence. In some examples, the plurality of tones may include ten tones, the random sequence may have a length of ten terms, and the DFT performed on the random sequence may have a length of ten.

In some examples, the apparatus may include means for generating a random sequence, performing a DFT on the random sequence to generate an intermediate output, and down-sampling the intermediate output to generate the DFT output. In some examples of the apparatus, the transmission to be made over the unlicensed radio frequency spectrum band subsequent to the transmission of the portion of the CUBS may include at least one of a PUSCH, a PUCCH, a PRACH, an SRS, or an SR. In some examples of the apparatus, means for selecting the plurality of tones may include selecting a tone in a middle of a resource block allocated to the transmission to be made over the unlicensed radio frequency spectrum band subsequent to the transmission of the portion of the CUBS. In some examples of the apparatus, means for selecting the plurality of tones may include means for selecting a tone in a middle of a contiguous resource block cluster allocated to the transmission to be made over the unlicensed radio frequency spectrum band subsequent to the transmission of the portion of the CUBS.

In some examples of the apparatus, the plurality of tones may have a uniform frequency spacing in the unlicensed radio frequency spectrum band. In some examples of the apparatus, the plurality of tones may have a non-uniform frequency spacing in the unlicensed radio frequency spectrum band.

In some examples, the apparatus may include means for performing a windowing and overlap-and-add operation for a transmission juncture of the portion of the CUBS and a subsequently transmitted signal. In some examples, the apparatus may include means for performing a windowing and overlap-and-add operation for a commencement of transmission of the portion of the CUBS. In some examples of the apparatus, the contention and the transmitting may be performed by a UE. In some examples of the apparatus, the portion of the CUBS may include a beginning portion of the CUBS. In some examples of the apparatus, the portion of the CUBS may include an ending portion of the CUBS.

In an example, another apparatus for wireless communication is described. In one example, the apparatus may include a processor, memory in electronic communication with the processor, and the processor and memory may be configured to win a contention for access to an unlicensed radio frequency spectrum band, to select a portion of a CUBS, and to transmit the portion of the CUBS over the unlicensed radio frequency spectrum band during a fractional period of a symbol period. The portion of the CUBS may be selected based at least in part on a timing of winning the contention with reference to a next symbol period boundary.

In some examples, the processor and memory may be configured to select a plurality of tones included in a transmission to be made over the unlicensed radio frequency spectrum band subsequent to a transmission of the at least portion of the CUBS, map a discrete Fourier transform (DFT) output to the plurality of tones, and perform an inverse fast Fourier transform (IFFT) on the plurality of tones to generate the CUBS.

In some examples, the processor and memory may be configured to generate a random sequence and perform a DFT on the random sequence to generate the DFT output. In these examples the transmission to be made over the unlicensed radio frequency spectrum band subsequent to the transmission of the portion of the CUBS may include at least one of: a physical uplink shared channel (PUSCH), a physical uplink control channel (PUCCH), a physical random access channel (PRACH), a sounding reference signal (SRS), or a scheduling request (SR).

In some examples, the processor and memory configured to select the plurality of tones may include instructions executable by the processor to select a tone in a middle of a resource block allocated to the transmission to be made over the unlicensed radio frequency spectrum band subsequent to the transmission of the portion of the CUBS. In some examples the processor and memory configured to select the plurality of tones may include instructions executable by the processor to select a tone in a middle of a contiguous resource block cluster allocated to the transmission to be made over the unlicensed radio frequency spectrum band subsequent to the transmission of the portion of the CUBS.

In some examples of the apparatus, the processor and memory may be configured to perform a windowing and overlap-and-add operation for a transmission juncture of the portion of the CUBS and a subsequently transmitted signal. In some examples of the apparatus, the processor and memory may be configured to perform a windowing and overlap-and-add operation for a commencement of transmission of the portion of the CUBS. In some examples the portion of the CUBS may include a beginning portion of the CUBS. In some examples, the portion of the CUBS may include an ending portion of the CUBS.

In an example, another non-transitory computer-readable medium storing computer-executable code for wireless communications is described. In one example, the code may be executable by a processor to win a contention for access to an unlicensed radio frequency spectrum band, to select a portion of a CUBS, and to transmit the portion of the CUBS over the unlicensed radio frequency spectrum band during a fractional period of a symbol period. The portion of the CUBS may be selected based at least in part on a timing of winning the contention with reference to a next symbol period boundary.

In some examples, the non-transitory computer-readable medium may include code that may be executable by the processor to select a plurality of tones included in a transmission to be made over the unlicensed radio frequency spectrum band subsequent to a transmission of the at least portion of the CUBS, map a discrete Fourier transform (DFT) output to the plurality of tones, and perform an inverse fast Fourier transform (IFFT) on the plurality of tones to generate the CUBS.

In some examples, the non-transitory computer-readable medium may include code that may be executable by the processor to generate a random sequence and perform a DFT on the random sequence to generate the DFT output.

In an example, another method for wireless communication is described. In one example, the method may include receiving CUBS from each of a number of UEs, and determining, from the received CUBS, an identifier of each of the number of UEs. Each CUBS may be received in one of a plurality of frequency interlaces of an unlicensed radio frequency spectrum band.

In some examples of the method, a portion of a first CUBS and a second CUBS may be received from a first UE, and a first identifier of the first UE may be determined from the second CUBS. In some examples of the method, a structure of a first set of CUBS received from a first UE may differ from a structure of a second set of CUBS received from a second UE.

In an example, another apparatus for wireless communication is described. In one example, the apparatus may include means for receiving CUBS from each of a number of UEs, and means for determining, from the received CUBS, an identifier of each of the number of UEs. Each CUBS may be received in one of a plurality of frequency interlaces of an unlicensed radio frequency spectrum band.

In some examples of the apparatus, a portion of a first CUBS and a second CUBS may be received from a first UE. In these examples, a first identifier of the first UE is determined from the second CUBS. In some examples, the apparatus may include a structure of a first set of CUBS received from a first UE that differs from a structure of a second set of CUBS received from a second UE.

In an example, another apparatus for wireless communication is described. In one example, the apparatus may include a processor, memory in electronic communication with the processor, and instructions stored in the memory. The instructions may be executable by the processor to receive CUBS from each of a number of UEs, and to determine, from the received CUBS, an identifier of each of the number of UEs. Each CUBS may be received in one of a plurality of frequency interlaces of an unlicensed radio frequency spectrum band.

In some examples of the apparatus, a portion of a first CUBS and a second CUBS may be received from a first UE, and a first identifier of the first UE may be determined from the second CUBS. In some examples of the apparatus, a portion of a first CUBS and a second CUBS may be received from a first UE, and a first identifier of the first UE may be determined from the second CUBS.

In an example, another non-transitory computer-readable medium storing computer-executable code for wireless communications is described. In one example, the code may be executable by a processor to receive CUBS from each of a number of UEs, and to determine, from the received CUBS, an identifier of each of the number of UEs. Each CUBS may be received in one of a plurality of frequency interlaces of an unlicensed radio frequency spectrum band.

In some examples, the non-transitory computer-readable medium may include a portion of a first CUBS and a second CUBS. In these examples, the portion of a first CUBS and a second CUBS may be received from a first UE, and a first identifier of the first UE is determined from the second CUBS. In some examples the non-transitory computer-readable medium may include a structure of a first set of CUBS received from a first UE that differs from a structure of a second set of CUBS received from a second UE.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Techniques are described in which an unlicensed radio frequency spectrum band is used for at least a portion of communications over a wireless communication system. In some examples, the unlicensed radio frequency spectrum band may be used for Long Term Evolution (LTE) communications or LTE-Advanced (LTE-A) communications. The unlicensed radio frequency spectrum band may be used in combination with, or independent from, a licensed radio frequency spectrum band. In some examples, the unlicensed radio frequency spectrum band may be a radio frequency spectrum band for which a device may need to contend for access because the radio frequency spectrum band is available, at least in part, for unlicensed use, such as Wi-Fi use.

With increasing data traffic in cellular networks that use a licensed radio frequency spectrum band, offloading of at least some data traffic to an unlicensed radio frequency spectrum band may provide a cellular operator (e.g., an operator of a public land mobile network (PLMN) or a coordinated set of base stations defining a cellular network, such as an LTE/LTE-A network) with opportunities for enhanced data transmission capacity. As noted above, before communicating over the unlicensed radio frequency spectrum band, devices may perform an LBT procedure to gain access to the medium. Such an LBT procedure may include performing a CCA procedure (or extended CCA procedure) to determine whether a channel of the unlicensed radio frequency spectrum band is available. When it is determined that the channel of the unlicensed radio frequency spectrum band is available, a CUBS may be transmitted to reserve the channel. When it is determined that a channel is not available, a CCA procedure (or extended CCA procedure) may be performed for the channel again at a later time.

When a first UE wins contention for access to a first channel between symbol period boundaries, the first UE's transmission of a CUBS (or portion of a CUBS) may not be orthogonal to a transmission on a second channel, and may interfere with the transmission on the second channel.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
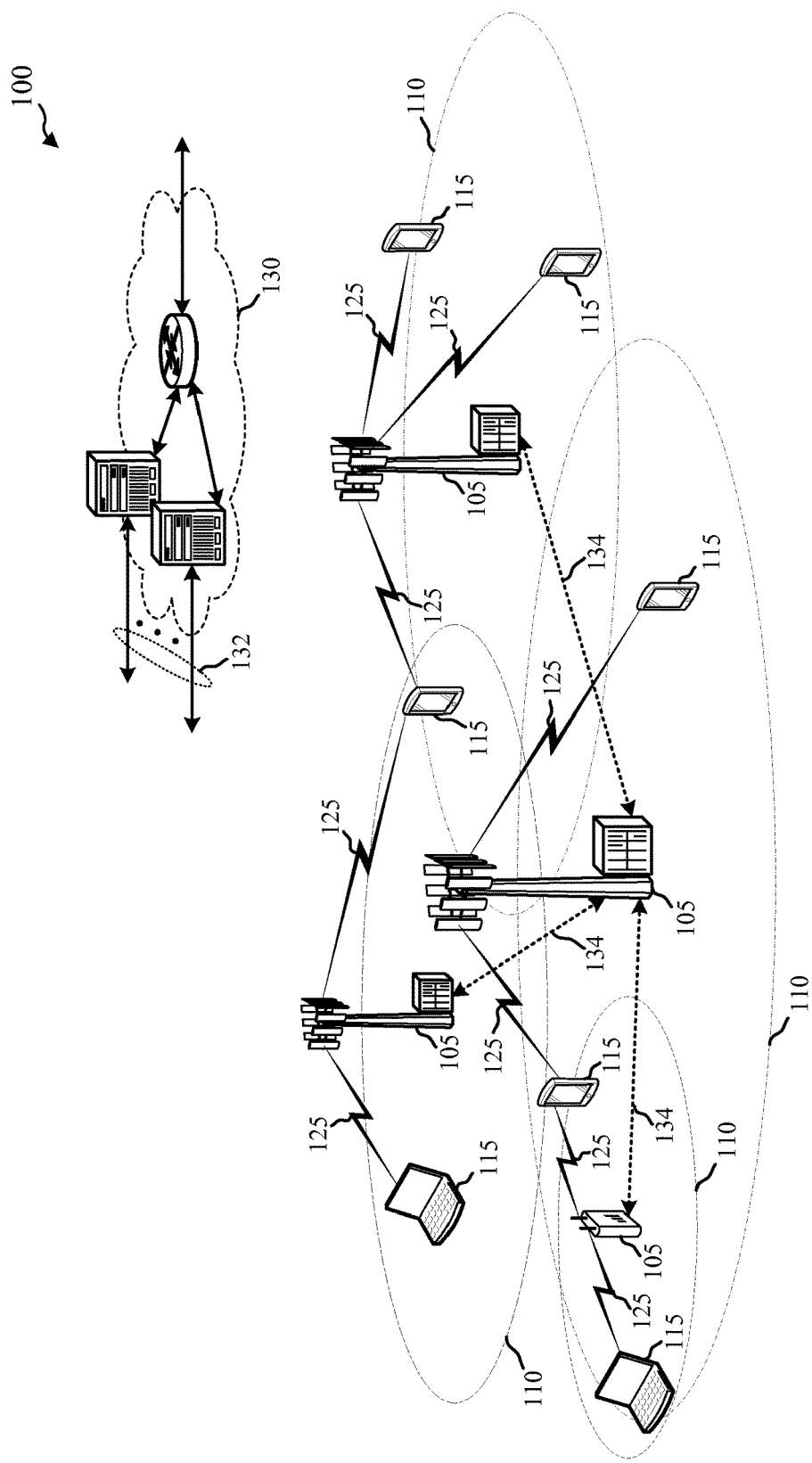
FIG. 1 illustrates an example of a wireless communication system, in accordance with various aspects of the disclosure.

FIG. 1 illustrates an example of a wireless communication system 100, in accordance with various aspects of the disclosure. The wireless communication system 100 may include base stations 105, UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, a base station 105 may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105 may be divided into sectors making up a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may include an LTE/LTE-A network. In LTE/LTE-A networks, the term evolved Node B (eNB) may be used to describe the base stations 105, while the term UE may be used to describe the UEs 115. The wireless communication system 100 may be a Heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., licensed, unlicensed, etc.) radio frequency spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARM) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment, including macro eNBs, small cell eNBs, relay base stations, and the like.

The communication links 125 shown in wireless communication system 100 may include downlink (DL) transmissions, from a base station 105 to a UE 115, or uplink (UL) transmissions from a UE 115 to a base station 105. The downlink transmissions may also be called forward link transmissions, while the uplink transmissions may also be called reverse link transmissions. In some examples, UL transmissions may include transmissions of uplink control information, which uplink control information may be transmitted over an uplink control channel (e.g., a physical uplink control channel (PUCCH) or enhanced PUCCH (ePUCCH)). The uplink control information may include, for example, acknowledgements or non-acknowledgements of downlink transmissions, or channel state information. UL transmissions may also include transmissions of data, which data may be transmitted over a physical uplink shared channel (PUSCH) or enhanced PUSCH (ePUSCH). UL transmissions may also include the transmission of a sounding reference signal (SRS) or enhanced SRS (eSRS), a physical random access channel (PRACH) or enhanced PRACH (ePRACH) (e.g., in a dual connectivity mode or the standalone mode described with reference to FIG. 2), or a scheduling request (SR) or enhanced SR (eSR) (e.g., in the standalone mode described with reference to FIG. 2). References in this disclosure to a PUCCH, a PUSCH, a PRACH, an SRS, or an SR are presumed to inherently include references to a respective ePUCCH, ePUSCH, ePRACH, eSRS, or eSR.

In some examples, each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using a frequency domain duplexing (FDD) operation (e.g., using paired spectrum resources) or a time domain duplexing (TDD) operation (e.g., using unpaired spectrum resources). Frame structures for FDD operation (e.g., frame structure type 1) and TDD operation (e.g., frame structure type 2) may be defined.

In some examples of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

The wireless communication system 100 may also or alternatively support operation over a licensed radio frequency spectrum band (e.g., a radio frequency spectrum band for which transmitting apparatuses may not contend for access because the radio frequency spectrum band is licensed to some users for various uses, such as a licensed radio frequency spectrum band usable for LTE/LTE-A communications) or an unlicensed radio frequency spectrum band (e.g., a radio frequency spectrum band for which transmitting apparatuses may need to contend for access because the radio frequency spectrum band is available for unlicensed use, such as Wi-Fi use). Upon winning a contention for access to the unlicensed radio frequency spectrum band, a transmitting apparatus (e.g., a base station 105 or UE 115) may transmit one or more CUBS over the unlicensed radio frequency spectrum band. The CUBS may serve to reserve the unlicensed radio frequency spectrum by providing a detectable energy on the unlicensed radio frequency spectrum band. The CUBS may also serve to identify the transmitting apparatus or serve to synchronize the transmitting apparatus and a receiving apparatus. In some examples, a CUBS transmission may commence at a symbol period boundary (e.g., an OFDM symbol period boundary). In other examples, a CUBS transmission may commence between symbol period boundaries. In these latter examples, the transmission of a portion of a CUBS, which portion of a CUBS has a length that is shorter than a full symbol period, may provide a non-orthogonal transmission that interferes with one or more transmissions on adjacent tones (e.g., one or more transmissions of other apparatuses on adjacent tones).

Figure 2:
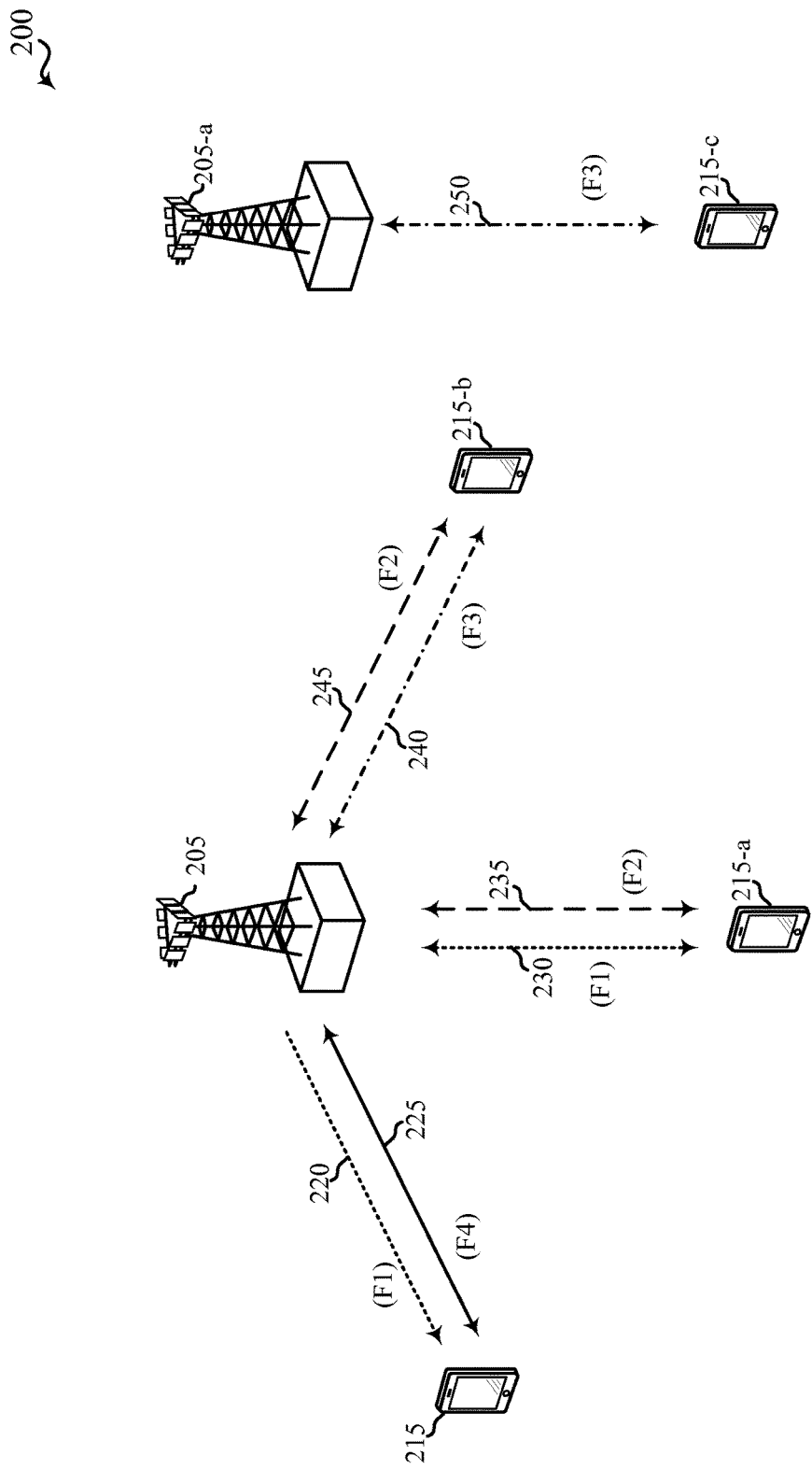
FIG. 2 shows a wireless communication system in which LTE/LTE-A may be deployed under different scenarios using an unlicensed radio frequency spectrum band, in accordance with various aspects of the present disclosure.

FIG. 2 shows a wireless communication system 200 in which LTE/LTE-A may be deployed under different scenarios using an unlicensed radio frequency spectrum band, in accordance with various aspects of the present disclosure. More specifically, FIG. 2 illustrates examples of a supplemental downlink mode, a carrier aggregation mode, and a standalone mode in which LTE/LTE-A is deployed using an unlicensed radio frequency spectrum band. The wireless communication system 200 may be an example of portions of the wireless communication system 100 described with reference to FIG. 1. Moreover, a first base station 205 and a second base station 205-a may be examples of aspects of one or more of the base stations 105 described with reference to FIG. 1, while a first UE 215, a second UE 215-a, a third UE 215-b, and a fourth UE 215-c may be examples of aspects of one or more of the UEs 115 described with reference to FIG. 1.

In the example of a supplemental downlink mode in the wireless communication system 200, the first base station 205 may transmit OFDMA waveforms to the first UE 215 using a downlink channel 220. The downlink channel 220 may be associated with a frequency F1 in an unlicensed radio frequency spectrum band. The first base station 205 may transmit OFDMA waveforms to the first UE 215 using a first bidirectional link 225 and may receive SC-FDMA waveforms from the first UE 215 using the first bidirectional link 225. The first bidirectional link 225 may be associated with a frequency F4 in a licensed radio frequency spectrum band. The downlink channel 220 in the unlicensed radio frequency spectrum band and the first bidirectional link 225 in the licensed radio frequency spectrum band may operate contemporaneously. The downlink channel 220 may provide a downlink capacity offload for the first base station 205. In some examples, the downlink channel 220 may be used for unicast services (e.g., addressed to one UE) or for multicast services (e.g., addressed to several UEs). This scenario may occur with any service provider (e.g., a mobile network operator (MNO)) that uses a licensed radio frequency spectrum and needs to relieve some of the traffic or signaling congestion.

In one example of a carrier aggregation mode in the wireless communication system 200, the first base station 205 may transmit OFDMA waveforms to the second UE 215-a using a second bidirectional link 230 and may receive OFDMA waveforms, SC-FDMA waveforms, or resource block interleaved FDMA waveforms from the second UE 215-a using the second bidirectional link 230. The second bidirectional link 230 may be associated with the frequency F1 in the unlicensed radio frequency spectrum band. The first base station 205 may also transmit OFDMA waveforms to the second UE 215-a using a third bidirectional link 235 and may receive SC-FDMA waveforms from the second UE 215-a using the third bidirectional link 235. The third bidirectional link 235 may be associated with a frequency F2 in a licensed radio frequency spectrum band. The second bidirectional link 230 may provide a downlink and uplink capacity offload for the first base station 205. Like the supplemental downlink described above, this scenario may occur with any service provider (e.g., MNO) that uses a licensed radio frequency spectrum and needs to relieve some of the traffic or signaling congestion.

In another example of a carrier aggregation mode in the wireless communication system 200, the first base station 205 may transmit OFDMA waveforms to the third UE 215-b using a fourth bidirectional link 240 and may receive OFDMA waveforms, SC-FDMA waveforms, or resource block interleaved waveforms from the third UE 215-b using the fourth bidirectional link 240. The fourth bidirectional link 240 may be associated with a frequency F3 in the unlicensed radio frequency spectrum band. The first base station 205 may also transmit OFDMA waveforms to the third UE 215-b using a fifth bidirectional link 245 and may receive SC-FDMA waveforms from the third UE 215-b using the fifth bidirectional link 245. The fifth bidirectional link 245 may be associated with the frequency F2 in the licensed radio frequency spectrum band. The fourth bidirectional link 240 may provide a downlink and uplink capacity offload for the first base station 205. This example and those provided above are presented for illustrative purposes and there may be other similar modes of operation or deployment scenarios that combine LTE/LTE-A in a licensed radio frequency spectrum band and use an unlicensed radio frequency spectrum band for capacity offload.

As described above, one type of service provider that may benefit from the capacity offload offered by using LTE/LTE-A in an unlicensed radio frequency spectrum band is a traditional MNO having access rights to an LTE/LTE-A licensed radio frequency spectrum band. For these service providers, an operational example may include a boot-strapped mode (e.g., supplemental downlink, carrier aggregation) that uses the LTE/LTE-A primary component carrier (PCC) on the licensed radio frequency spectrum band and at least one secondary component carrier (SCC) on the unlicensed radio frequency spectrum band.

In the carrier aggregation mode, data and control may, for example, be communicated in the licensed radio frequency spectrum band (e.g., via first bidirectional link 225, third bidirectional link 235, and fifth bidirectional link 245) while data may, for example, be communicated in the unlicensed radio frequency spectrum band (e.g., via second bidirectional link 230 and fourth bidirectional link 240). The carrier aggregation mechanisms supported when using an unlicensed radio frequency spectrum band may fall under a hybrid frequency division duplexing-time division duplexing (FDD-TDD) carrier aggregation or a TDD-TDD carrier aggregation with different symmetry across component carriers.

In one example of a standalone mode in the wireless communication system 200, the second base station 205-a may transmit OFDMA waveforms to the fourth UE 215-c using a bidirectional link 250 and may receive OFDMA waveforms, SC-FDMA waveforms, or resource block interleaved FDMA waveforms from the fourth UE 215-c using the bidirectional link 250. The bidirectional link 250 may be associated with the frequency F3 in the unlicensed radio frequency spectrum band. The standalone mode may be used in non-traditional wireless access scenarios, such as in-stadium access (e.g., unicast, multicast). An example of a type of service provider for this mode of operation may be a stadium owner, cable company, event host, hotel, enterprise, or large corporation that does not have access to a licensed radio frequency spectrum band.

In some examples, a transmitting apparatus such as one of the base stations 105, 205, or 205-a described with reference to FIG. 1 or 2, or one of the UEs 115, 215, 215-a, 215-b, or 215-c described with reference to FIG. 1 or 2, may use a gating interval to gain access to a channel of an unlicensed radio frequency spectrum band (e.g., to a physical channel of the unlicensed radio frequency spectrum band). In some examples, the gating interval may be periodic. For example, the periodic gating interval may be synchronized with at least one boundary of an LTE/LTE-A radio interval. The gating interval may define the application of a contention-based protocol, such as an LBT protocol based on the LBT protocol specified in European Telecommunications Standards Institute (ETSI) (EN 301 893). When using a gating interval that defines the application of an LBT protocol, the gating interval may indicate when a transmitting apparatus needs to perform a contention procedure (e.g., an LBT procedure) such as a clear channel assessment (CCA) procedure. The outcome of the CCA procedure may indicate to the transmitting apparatus whether a channel of an unlicensed radio frequency spectrum band is available or in use for the gating interval (also referred to as an LBT radio frame). When a CCA procedure indicates that the channel is available for a corresponding LBT radio frame (e.g., "clear" for use), the transmitting apparatus may reserve or use the channel of the unlicensed radio frequency spectrum band during part or all of the LBT radio frame. When the CCA procedure indicates that the channel is not available (e.g., that the channel is in use or reserved by another transmitting apparatus), the transmitting apparatus may be prevented from using the channel during the LBT radio frame.

Figure 3:
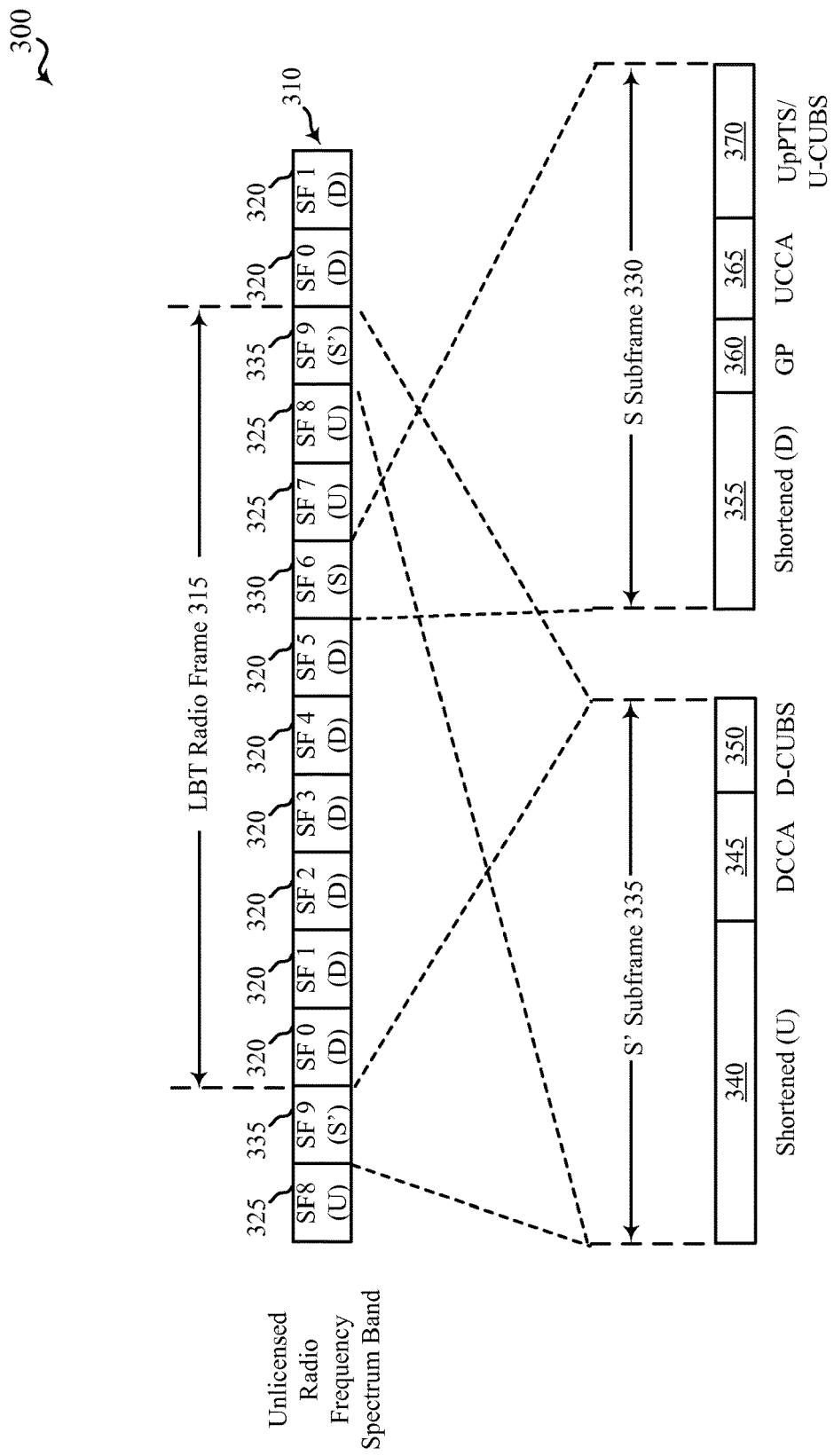
FIG. 3 shows an example of a wireless communication over an unlicensed radio frequency spectrum band, in accordance with various aspects of the present disclosure.

FIG. 3 shows an example 300 of a wireless communication 310 over an unlicensed radio frequency spectrum band, in accordance with various aspects of the present disclosure. In some examples, an LBT radio frame 315 may have a duration of ten milliseconds and include a number of downlink (D) subframes 320, a number of uplink (U) subframes 325, and two types of special subframes, an S subframe 330 and an S' subframe 335. The S subframe 330 may provide a transition between downlink subframes 320 and uplink subframes 325, while the S' subframe 335 may provide a transition between uplink subframes 325 and downlink subframes 320 and, in some examples, a transition between LBT radio frames.

During the S' subframe 335, a downlink clear channel assessment (DCCA) procedure 345 may be performed by one or more base stations, such as one or more of the base stations 105, 205, or 205-a described with reference to FIG. 1 or 2, to reserve, for a period of time, a channel of the unlicensed radio frequency spectrum band over which the wireless communication 310 occurs. Following a successful DCCA procedure 345 by a base station, the base station may transmit a channel usage beacon signal (CUBS) (e.g., a downlink CUBS (D-CUBS 350)) to provide an indication to other base stations or apparatuses (e.g., UEs, Wi-Fi access points, etc.) that the base station has reserved the channel. In some examples, a D-CUBS 350 may be transmitted using a plurality of interleaved resource blocks. Transmitting a D-CUBS 350 in this manner may enable the D-CUBS 350 to occupy at least some percentage of the available frequency bandwidth of the unlicensed radio frequency spectrum band and satisfy one or more regulatory requirements (e.g., a requirement that transmissions over the unlicensed radio frequency spectrum band occupy at least 80% of the available frequency bandwidth). The D-CUBS 350 may in some examples take a form similar to that of an LTE/LTE-A CRS or a channel state information reference signal (CSI-RS). When the DCCA procedure 345 fails, the D-CUBS 350 may not be transmitted.

The S' subframe 335 may include a plurality of OFDM symbol periods (e.g., 14 OFDM symbol periods). A first portion of the S' subframe 335 may be used by a number of UEs as a shortened uplink (U) period. A second portion of the S' subframe 335 may be used for the DCCA procedure 345. A third portion of the S' subframe 335 may be used by one or more base stations that successfully contend for access to the channel of the unlicensed radio frequency spectrum band to transmit the D-CUBS 350.

During the S subframe 330, an uplink CCA (UCCA) procedure 365 may be performed by one or more UEs, such as one or more of the UEs 115, 215, 215-a, 215-b, or 215-c described above with reference to FIG. 1 or 2, to reserve, for a period of time, the channel over which the wireless communication 310 occurs. Following a successful UCCA procedure 365 by a UE, the UE may transmit an uplink CUBS (U-CUBS 370) to provide an indication to other UEs or apparatuses (e.g., base stations, Wi-Fi access points, etc.) that the UE has reserved the channel. In some examples, a U-CUBS 370 may be transmitted using a plurality of interleaved resource blocks. Transmitting a U-CUBS 370 in this manner may enable the U-CUBS 370 to occupy at least some percentage of the available frequency bandwidth of the unlicensed radio frequency spectrum band and satisfy one or more regulatory requirements (e.g., the requirement that transmissions over the unlicensed radio frequency spectrum band occupy at least 80% of the available frequency bandwidth). The U-CUBS 370 may in some examples take a form similar to that of an LTE/LTE-A CRS or CSI-RS. When the UCCA procedure 365 fails, the U-CUBS 370 may not be transmitted.

The S subframe 330 may include a plurality of OFDM symbol periods (e.g., 14 OFDM symbol periods). A first portion of the S subframe 330 may be used by a number of base stations as a shortened downlink (D) period 355. A second portion of the S subframe 330 may be used as a guard period (GP) 360. A third portion of the S subframe 330 may be used for the UCCA procedure 365. A fourth portion of the S subframe 330 may be used by one or more UEs that successfully contend for access to the channel of the unlicensed radio frequency spectrum band as an uplink pilot time slot (UpPTS) or to transmit the U-CUBS 370.

In some examples, the DCCA procedure 345 or the UCCA procedure 365 may include the performance of a single CCA procedure. In other examples, the DCCA procedure 345 or the UCCA procedure 365 may include the performance of an extended CCA procedure. The extended CCA procedure may include a random number of CCA procedures, and in some examples may include a plurality of CCA procedures.

Figure 4:
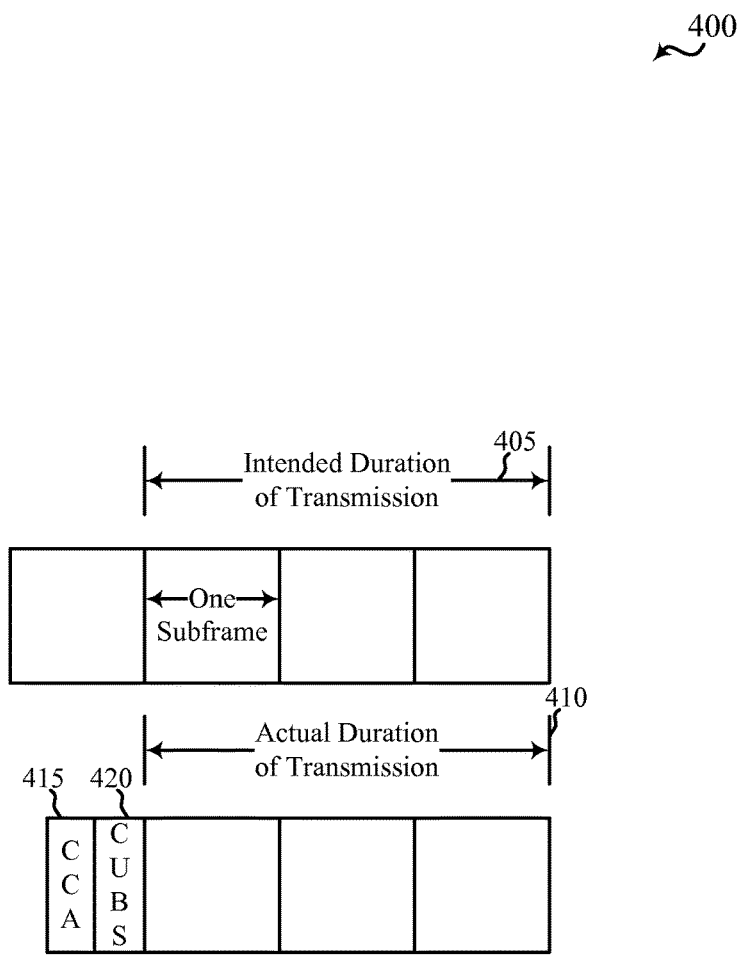
FIG. 4 shows an example of a CCA procedure performed by a transmitting apparatus when contending for access to an unlicensed radio frequency spectrum band, in accordance with various aspects of the present disclosure.

FIG. 4 shows an example 400 of a CCA procedure 415 performed by a transmitting apparatus when contending for access to an unlicensed radio frequency spectrum band, in accordance with various aspects of the present disclosure. In some examples, the CCA procedure 415 may be an example of the DCCA procedure 345 or UCCA procedure 365 described with reference to FIG. 3. The CCA procedure 415 may have a fixed duration. In some examples, the CCA procedure 415 may be performed in accordance with an LBT-frame based equipment (LBT-FBE) protocol (e.g., the LBT-FBE protocol described by EN 301 893). Following the CCA procedure 415, a CUBS 420 may be transmitted, followed by a data transmission (e.g., an uplink transmission or a downlink transmission). By way of example, the data transmission may have an intended duration 405 of three subframes and an actual duration 410 of three subframes.

Figure 5:
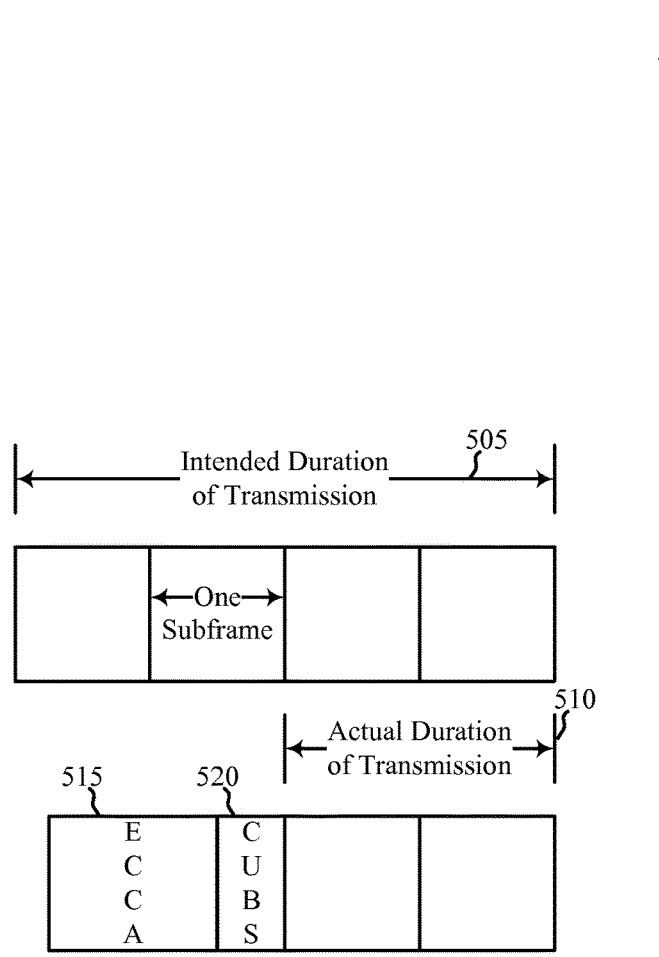
FIG. 5 shows an example of an extended CCA (ECCA) procedure performed by a transmitting apparatus when contending for access to an unlicensed radio frequency spectrum band, in accordance with various aspects of the present disclosure.

FIG. 5 shows an example 500 of an extended CCA (ECCA) procedure 515 performed by a transmitting apparatus when contending for access to an unlicensed radio frequency spectrum band, in accordance with various aspects of the present disclosure. In some examples, the ECCA procedure 515 may be an example of the DCCA procedure 345 or UCCA procedure 365 described with reference to FIG. 3. The ECCA procedure 515 may include a random number of CCA procedures, and in some examples may include a plurality of CCA procedures. The ECCA procedure 515 may therefore have a variable duration. In some examples, the ECCA procedure 515 may be performed in accordance with an LBT-load based equipment (LBT-LBE) protocol (e.g., the LBT-LBE protocol described by EN 301 893). The ECCA procedure 515 may provide a greater likelihood of winning contention to access the unlicensed radio frequency spectrum band, but at a potential cost of a shorter data transmission. Following the ECCA procedure 515, a CUBS 520 may be transmitted, followed by a data transmission. By way of example, the data transmission may have an intended duration 505 of three subframes and an actual duration 510 of two subframes.

When using either the CCA procedure 415 or the ECCA procedure 515, contention for access to the unlicensed radio frequency spectrum band may be won at a time that does not coincide with a symbol period boundary (e.g., an OFDM symbol period boundary). The CUBS 420 or CUBS 520 may therefore have a length that is less the duration of a symbol period or the CUBS 420 or CUBS 520 may include a CUBS transmitted in a fractional period of a symbol period. In such examples, the transmitted CUBS may not be orthogonal to other transmissions and may interfere with other transmissions. Techniques to mitigate such interference are described in the present disclosure.

When transmitting U-CUBS, various transmission techniques may be used. A few of the exemplary techniques are described in this disclosure. For example, when transmitting U-CUBS prior to an SC-FDM ePUSCH, the U-CUBS may be generated similarly to a demodulation reference signal (DM-RS) to be transmitted as part of the ePUSCH, and may be transmitted using the same physical resource blocks and frequency interlaces used to transmit the SC-FDM ePUSCH. The U-CUBS sequence parameters may be the same parameters used for DM-RS generation, effectively resulting in the DM-RS transmission being repeated in a slot of a subframe.

As another example, when transmitting U-CUBS prior to an OFDM ePUSCH, the U-CUBS may be generated similarly to the U-CUBS generated for transmission prior to an SC-FDM ePUSCH. Alternatively, one symbol of DM-RS may be transmitted as a U-CUBS. However, even though the transmission of a symbol of DM-RS provides channel reservation, it may not provide for multiplexing UEs.

As another example, when transmitting U-CUBS prior to an ePUCCH, the U-CUBS may be transmitted similarly to the U-CUBS transmitted prior to an ePUSCH, or not transmitted. Transmitting U-CUBS prior to an ePUCCH similarly to how U-CUBS are transmitted prior to an ePUSCH may provide for cyclic shifts, but may not provide multiplexing ePUCCH users separated by an orthogonal cover code (OCC). However, ePUCCH may not be persistent across subframes, so CUBS in one subframe may interfere with transmissions of other UEs.

As another example, when transmitting U-CUBS prior to an interlaced ePUSCH and ePUCCH, U-CUBS may be transmitted as described for a U-CUBS transmission prior to an ePUSCH, regardless of the contemporaneous transmission of an ePUCCH.

As another example, when transmitting U-CUBS in a multi-user MIMO (MU-MIMO) environment, there may be no special handling of U-CUBS, as a base station may be expected to spatially separate different UEs. This can be challenging, however, when transmitting U-CUBS without prior channel estimation. In some examples, a base station may obtain a channel estimation from a prior eSRS. However, U-CUBS transmitted in an uplink MIMO environment may be transmitted using a same set of antenna ports and precoder used for subsequent transmission (e.g., an ePUSCH, an ePUCCH, an ePRACH, an eSRS, an eSR, or a combination thereof). This may ensure reception at a same power for CCA purposes, and ensure that full transmit power can be utilized in a case of 20 dBm+20 dBM receive chains.

Figure 6:
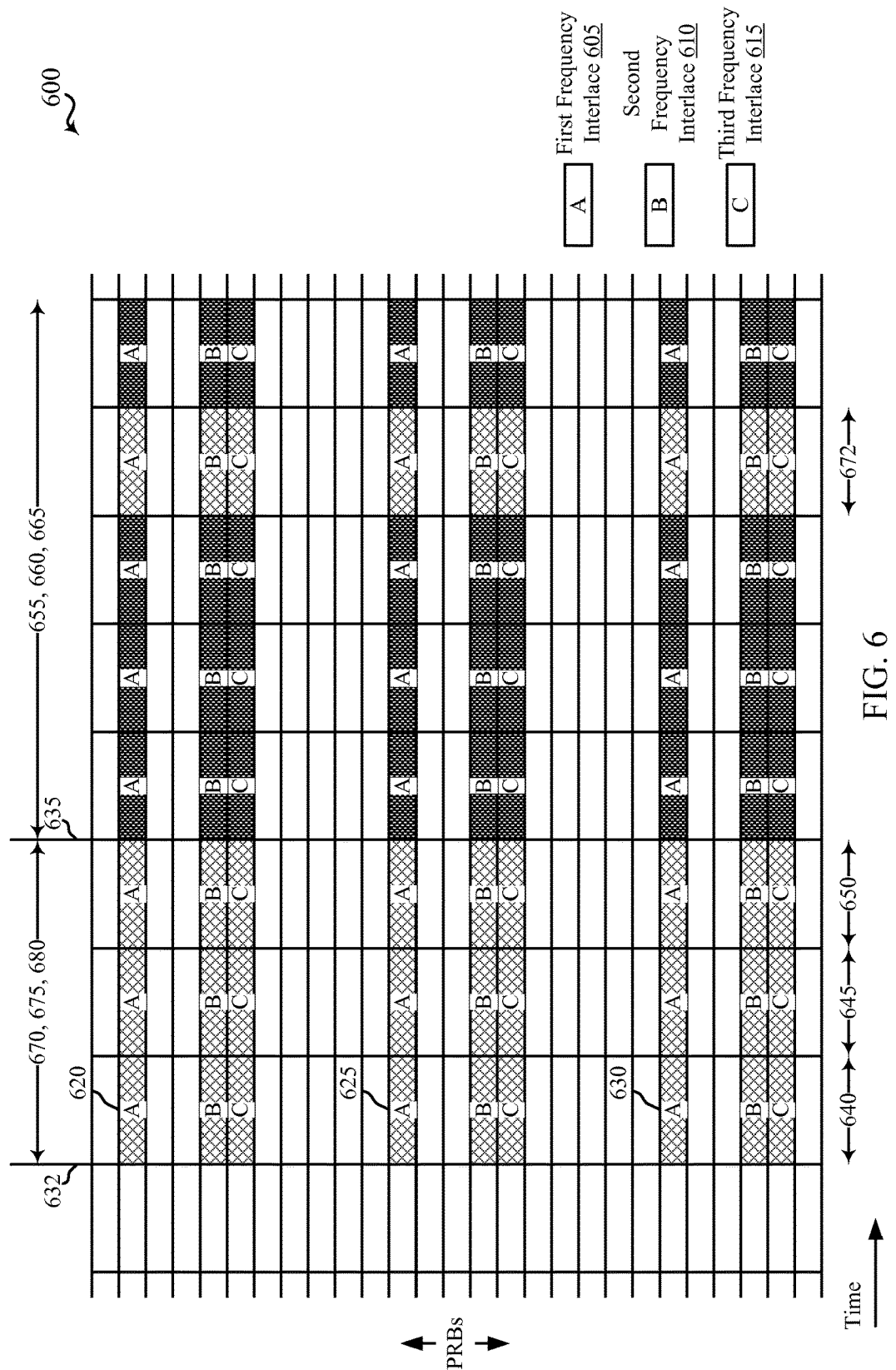
FIG. 6 is a timing diagram illustrating exemplary transmissions of CUBS over an unlicensed radio frequency spectrum band, in accordance with various aspects of the present disclosure.

FIG. 6 is a timing diagram illustrating exemplary transmissions of CUBS over an unlicensed radio frequency spectrum band, in accordance with various aspects of the present disclosure. The unlicensed radio frequency spectrum band may include a radio frequency spectrum band for which transmitting apparatuses may need to contend for access because the radio frequency spectrum band is available for unlicensed use, such as Wi-Fi use. In some examples, the transmissions may be made by a number of UEs, such as a number of the UEs 115, 215, 215-a, 215-b, or 215-c described with reference to FIG. 1 or 2.

In some examples, each of a first CUBS 670, a second CUBS 675, and a third CUBS 680 may be transmitted over a respective first frequency interlace 605, second frequency interlace 610, and third frequency interlace 615 of the unlicensed radio frequency spectrum band. Each frequency interlace may include a plurality of contemporaneously transmitted resource blocks, with at least two of the contemporaneously transmitted resource blocks (or at least two sets of the contemporaneously transmitted resource blocks) being non-contiguous in the unlicensed radio frequency spectrum band. In some examples, the contemporaneously transmitted resource blocks may be uniformly spaced in the unlicensed radio frequency spectrum band, as shown in FIG. 6. In other examples, the contemporaneously transmitted resource blocks may be non-uniformly spaced in the unlicensed radio frequency spectrum band. By way of example, each of the first frequency interlace 605, the second frequency interlace 610, and the third frequency interlace 615 is shown to include three contemporaneously transmitted resource blocks (e.g., the first frequency interlace 605 includes a contemporaneously transmitted first resource block 620, second resource block 625, and third resource block 630). However, a frequency interlace may include more or fewer contemporaneously transmitted resource blocks. In some examples, a frequency interlace may include ten contemporaneously transmitted resource blocks.

Each of the first CUBS 670, the second CUBS 675, and the third CUBS 680 may be transmitted between a time 632 of winning contention for access to the unlicensed radio frequency spectrum band (e.g., a time of winning a UCCA, as described with reference to FIG. 3, 4, or 5) and a subframe boundary 635. By way of example, FIG. 6 shows the time window between the time 632 and the subframe boundary 635 to include a first symbol period 640, a second symbol period 645, and a third symbol period 650 (e.g., OFDM symbol periods). Each of the first CUBS 670, the second CUBS 675, and the third CUBS 680 may be transmitted during each of the first symbol period 640, the second symbol period 645, and the third symbol period 650.

In some examples, each of the first CUBS 670, the second CUBS 675, and the third CUBS 680 may include a copy of a signal included in a respective first transmission 655, second transmission 660, and third transmission 665 to be made over the unlicensed radio frequency spectrum band subsequent to the transmission of the first CUBS 670, the second CUBS 675, or the third CUBS 680. In some examples, the signal included in the respective first transmission 655, second transmission 660, or third transmission 665 may include a demodulation reference signal (DM-RS). By way of example, a DM-RS is shown to be transmitted in a fourth symbol period 672 of each of the first transmission 655, the second transmission 660, and the third transmission 665. In some examples, copies of the signals (e.g., the DM-RS) included in the first transmission 655, the second transmission 660, and the third transmission 665 may be transmitted in each full symbol period (e.g., the first symbol period 640, the second symbol period 645, and the third symbol period 650) falling between the time 632 of winning contention for access to the unlicensed radio frequency spectrum band and the subframe boundary 635. In some examples, each of the first transmission 655, the second transmission 660, and the third transmission 665 may include a PUSCH, a PUCCH, a PRACH, an SRS, an SR, or a combination thereof.

Each of the first CUBS 670, the second CUBS 675, and the third CUBS 680 may be transmitted over the same set of physical resource blocks and tones as the respective first transmission 655, second transmission 660, and third transmission 665. In this manner, each of the first CUBS 670, the second CUBS 675, and the third CUBS 680 may be transmitted orthogonal to each other, and to all other transmissions following the same rules (that is, assuming that the first transmission 655, the second transmission 660, and the third transmission 665 are transmitted orthogonal to each other).

In some examples, each of the first CUBS 670, the second CUBS 675, and the third CUBS 680 may be transmitted over the unlicensed radio frequency spectrum band using a same set of antenna ports and precoder used for the respective first transmission 655, second transmission 660, and third transmission 665.

Figure 7:
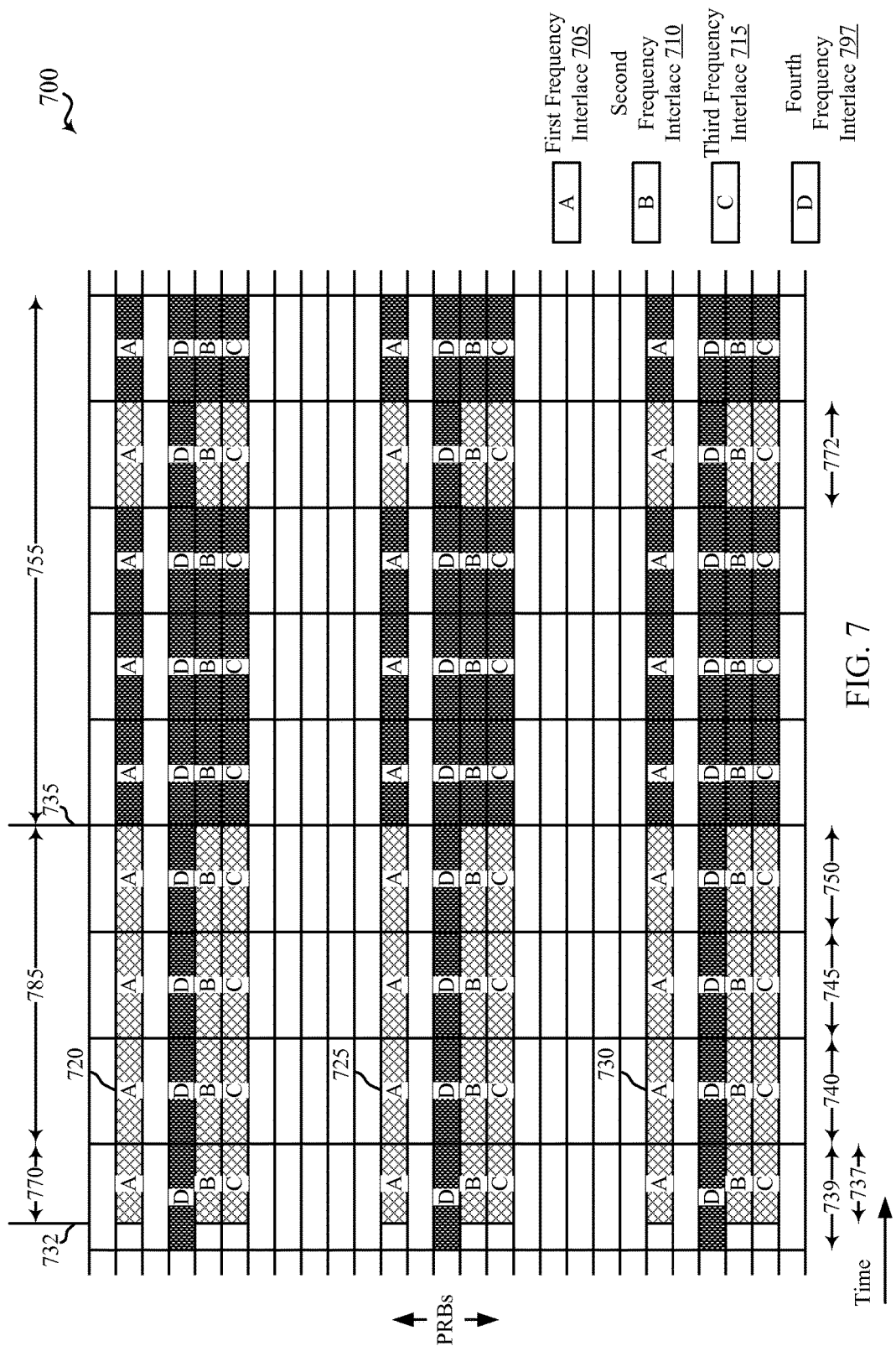
FIG. 7 is a timing diagram illustrating an exemplary transmission of CUBS over an unlicensed radio frequency spectrum band, in accordance with various aspects of the present disclosure.

FIG. 7 is a timing diagram illustrating an exemplary transmission of CUBS over an unlicensed radio frequency spectrum band, in accordance with various aspects of the present disclosure. The unlicensed radio frequency spectrum band may include a radio frequency spectrum band for which transmitting apparatuses may need to contend for access because the radio frequency spectrum band is available for unlicensed use, such as Wi-Fi use. In some examples, the transmission may be made by a UE, such as one of the UEs 115, 215, 215-a, 215-b, or 215-c described with reference to FIG. 1 or 2.

In some examples, a first CUBS 770 and a second CUBS 785 may be transmitted over a first frequency interlace 705 of the unlicensed radio frequency spectrum band, a second frequency interlace 710 of the unlicensed radio frequency spectrum band, and a third frequency interlace 715 of the unlicensed radio frequency spectrum band. In some examples, each of the first frequency interlace 705, the second frequency interlace 710, and the third frequency interlace 715 may be allocated to a first UE. A fourth frequency interlace 797 may be allocated to a second UE. Each frequency interlace may include a plurality of contemporaneously transmitted resource blocks, with at least two of the contemporaneously transmitted resource blocks (or at least two sets of the contemporaneously transmitted resource blocks) being non-contiguous in the unlicensed radio frequency spectrum band. In some examples, the contemporaneously transmitted resource blocks may be uniformly spaced in the unlicensed radio frequency spectrum band, as shown in FIG. 7. In other examples, the contemporaneously transmitted resource blocks may be non-uniformly spaced in the unlicensed radio frequency spectrum band. By way of example, each of the first frequency interlace 705, the second frequency interlace 710, the third frequency interlace 715, and the fourth frequency interlace 797 is shown to include three contemporaneously transmitted resource blocks (e.g., the first frequency interlace 705 includes a contemporaneously transmitted first resource block 720, second resource block 725, and third resource block 730). However, a frequency interlace may include more or fewer contemporaneously transmitted resource blocks. In some examples, a frequency interlace may include ten contemporaneously transmitted resource blocks.

Each of the first CUBS 770 and the second CUBS 785 may be transmitted between a time 732 of winning contention for access to the unlicensed radio frequency spectrum band (e.g., a time of winning a UCCA, as described with reference to FIG. 3, 4, or 5) and a subframe boundary 735. By way of example, FIG. 7 shows the time period between the time 732 and the subframe boundary 735 to include a fractional period 737 of a first symbol period 739, a second symbol period 740, a third symbol period 745, and a fourth symbol period 750 (e.g., OFDM symbol periods). The first CUBS 770 may be transmitted during the fractional period 737 of the first symbol period 739, and the second CUBS 785 may be transmitted during each of the second symbol period 740, the third symbol period 745, and the fourth symbol period 750.

In some examples, the second CUBS 785 may include a copy of a signal included in a transmission 755 to be made over the unlicensed radio frequency spectrum band subsequent to the transmission of the first CUBS 770 and the second CUBS 785. In some examples, the signal included in the transmission 755 may include a DM-RS. By way of example, a DM-RS is shown to be transmitted in a fourth symbol period 772 of the transmission 755. In some examples, a copy of the signal (e.g., the DM-RS) included in the transmission 755 may be transmitted in each full symbol period (e.g., the second symbol period 740, the third symbol period 745, and the fourth symbol period 750) falling between the time 732 of winning contention for access to the unlicensed radio frequency spectrum band and the subframe boundary 735. In some examples, the transmission 755 may include a PUSCH, a PUCCH, a PRACH, an SRS, an SR, or a combination thereof.

Each of the first CUBS 770 and the second CUBS 785 may be transmitted over the same set of physical resource blocks and tones as the transmission 755. In this manner, the second CUBS 785 may be transmitted orthogonal to other transmissions. However, because the first CUBS 770 has a variable length that is less than a full symbol period, the first CUBS 770 may not have a fixed tone spacing (that would be inversely proportional to a fixed symbol length). As a result, the transmissions of the first CUBS 770 may or may not be orthogonal to one or more ongoing and/or contemporaneous transmissions in other interlaces (e.g., to an ongoing and/or contemporaneous transmission in the fourth frequency interlace 797). Stated another way, the spectral content of the first CUBS 770 may leak into adjacent physical resource blocks and tones and may interfere with adjacent physical resource blocks and tones.

In some examples, each of the first CUBS 770 and the second CUBS 785 may be transmitted over the unlicensed radio frequency spectrum band using a same set of antenna ports and precoder used for the transmission 755. However, in some examples, and to reduce the chance of spectral leakage, the first CUBS 770 may be configured to be transmitted over selected tones and/or resource blocks used in the transmission 755. For example, the first CUBS 770 may be configured to be transmitted over a middle tone of each resource block allocated to the transmission 755 (e.g., over tone #5 or tone #7 in a twelve tone physical resource block having tones #0 to #11). In some examples, the total transmit power used for transmitting the first CUBS 770 on selected tones may be matched to the total transmit power used for transmitting the transmission 755.

In some examples, a transmission in the fourth frequency interlace 797 may begin earlier than transmissions in the first frequency interlace 705, the second frequency interlace 710, and the third frequency interlace 715 because the second UE may win contention for access to the unlicensed radio frequency spectrum band before the first UE (e.g., by successfully performing a CCA and not reverting to an ECCA).

Figure 8:
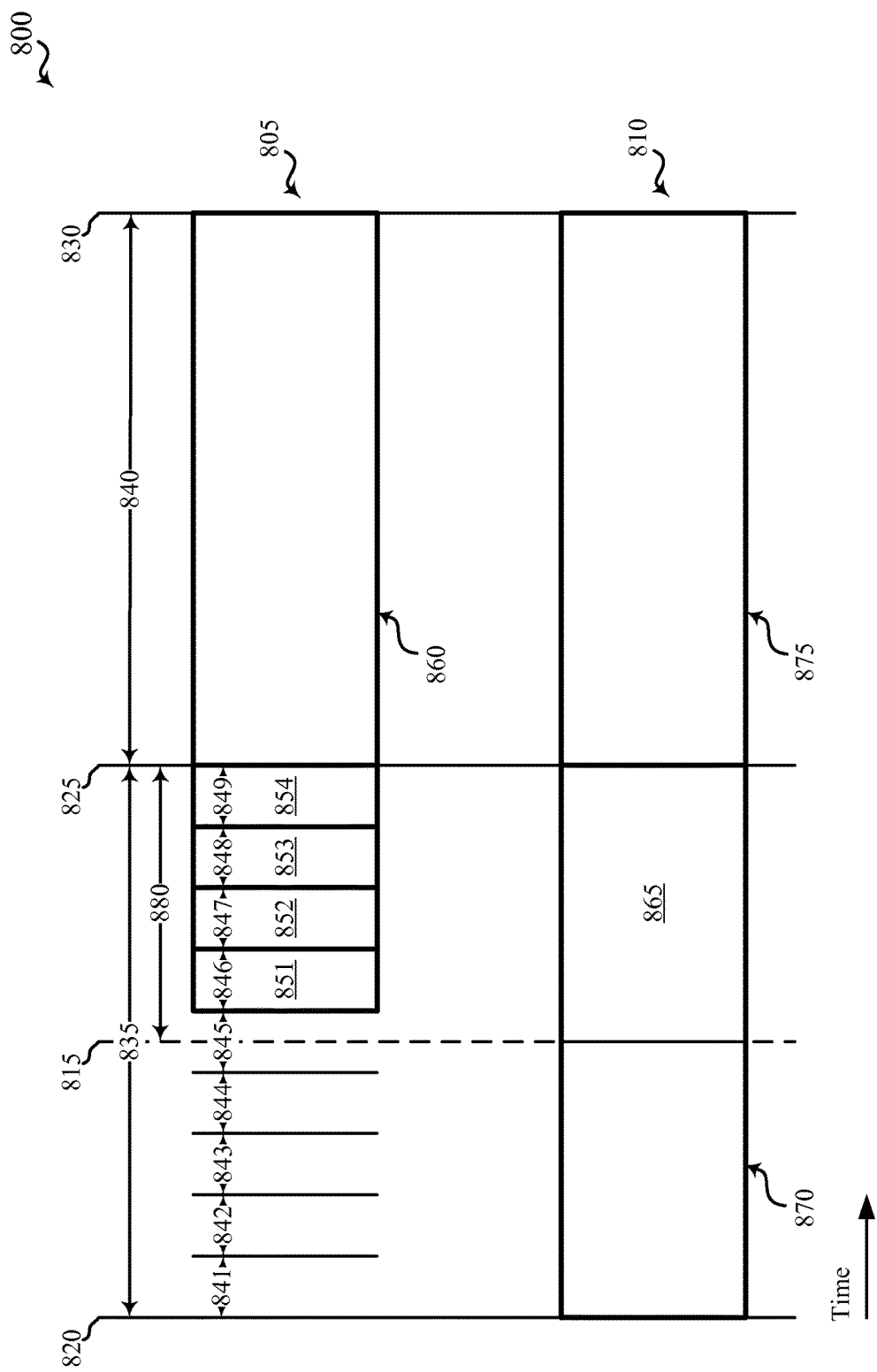
FIG. 8 is a timing diagram illustrating exemplary transmissions of at least a portion of a first CUBS and at least a portion of a second CUBS, in accordance with various aspects of the present disclosure.

FIG. 8 is a timing diagram illustrating exemplary transmissions of at least a portion of a first CUBS and at least a portion of a second CUBS, in accordance with various aspects of the present disclosure. In some examples, the transmissions may be made by a UE such as one of the UEs 115, 215, 215-a, 215-b, or 215-c described with reference to FIG. 1 or 2.

In some examples, a UE may make a first transmission 805 or a second transmission 810, as shown in FIG. 8, over an unlicensed radio frequency spectrum band. The unlicensed radio frequency spectrum band may include a radio frequency spectrum band for which transmitting apparatuses may need to contend for access because the radio frequency spectrum band is available for unlicensed use, such as Wi-Fi use. In some examples, the first transmission 805 or the second transmission 810 may be transmitted in a number of frequency interlaces (e.g., one or more frequency interlaces) of the unlicensed radio frequency spectrum band. Each frequency interlace may include a plurality of contemporaneously transmitted resource blocks, with at least two of the contemporaneously transmitted resource blocks (or at least two sets of the contemporaneously transmitted resource blocks) being non-contiguous in the unlicensed radio frequency spectrum band. In some examples, the contemporaneously transmitted resource blocks may be uniformly spaced in the unlicensed radio frequency spectrum band. In other examples, the contemporaneously transmitted resource blocks may be non-uniformly spaced in the unlicensed radio frequency spectrum band.

The first transmission 805 or the second transmission 810 may also be made by a UE with reference to one or more of a time 815 of winning contention for access to the unlicensed radio frequency spectrum band (e.g., a time of winning a UCCA, as described with reference to FIG. 3, 4, or 5) or a time or times of a number of symbol period boundaries (e.g., a first symbol period boundary 820, a second symbol period boundary 825, or a third symbol period boundary 830). By way of example, there is shown a first symbol period 835 bounded by the first symbol period boundary 820 and the second symbol period boundary 825, and a second symbol period 840 bounded by the second symbol period boundary 825 and the third symbol period boundary 830. The second symbol period 840 follows the first symbol period 835. In some examples, each of the first symbol period 835 and the second symbol period 840 may be an OFDM symbol period. By way of example, the time 815 of winning contention for access to the unlicensed radio frequency spectrum band is shown in FIG. 8 to occur during the first symbol period 835, thereby defining a fractional period 880 of the first symbol period 835 (e.g., a fractional period 880 bounded by the time 815 and the second symbol period boundary 825). The symbol period(s) or fractional period of a symbol period falling between the time 815 and a next subframe boundary may define a preamble.

In some examples, one or both of the first symbol period 835 and the second symbol period 840 may include a plurality of sub-periods. For example, and with reference to the first transmission 805, the first symbol period 835 is shown to include nine sub-periods (e.g., a first sub-period 841, a second sub-period 842, a third sub-period 843, a fourth sub-period 844, a fifth sub-period 845, a sixth sub-period 846, a seventh sub-period 847, an eighth sub-period 848, and a ninth sub-period 849).

Turning to the first transmission 805, the first transmission 805 may include an instance of a first CUBS transmitted in each of a number of full sub-periods that follow the time 815 of winning contention for access to the unlicensed radio frequency spectrum band. For example, the first transmission 805 may include a first instance 851 of the first CUBS which is transmitted in the sixth sub-period 846 of the first symbol period 835, a second instance 852 of the first CUBS which is transmitted in the seventh sub-period 847 of the first symbol period 835, a third instance 853 of the first CUBS which is transmitted in the eighth sub-period 848 of the first symbol period 835, and a fourth instance 854 of the first CUBS which is transmitted in the ninth sub-period 849 of the first symbol period 835. The first transmission 805 may also include a second CUBS 860 which is transmitted during the second symbol period 840. In some examples, a UE making the first transmission 805 may not transmit any signal during the fractional period of the fifth sub-period 845 between the time 815 of winning contention for access to the unlicensed radio frequency spectrum band and the start of the sixth sub-period 846 (e.g., the UE may attribute the fractional period of the fifth sub-period 845 to a silent period).

In some examples, the first CUBS transmitted as part of the first transmission 805 may include a fixed length short time domain sequence. The first CUBS may have a periodic zero crossing that provides smoothness (e.g., has no discontinuities) in the time domain when an instance of the first CUBS is abutted to another instance of the first CUBS (or abutted to the second CUBS 860 transmitted during the second symbol period 840). The second CUBS 860 may have a duration of one symbol period and be generated with a normal inverse fast Fourier transform (IFFT).

Turning to the second transmission 810, the second transmission 810 may include at least a portion 865 of a first CUBS 870, which portion 865 of the first CUBS 870 is transmitted during the first symbol period 835 following the time 815. When the time 815 of winning contention for access to the unlicensed radio frequency spectrum band coincides with the first symbol period boundary 820, the at least portion 865 of the first CUBS 870 may include the first CUBS 870. When the time 815 of winning contention for access to the unlicensed radio frequency spectrum band occurs after the first symbol period boundary 820, the at least portion 865 of the first CUBS 870 may include the portion 865 of the first CUBS 870. In some examples, the portion 865 of the first CUBS 870 may include a beginning portion of the first CUBS 870. In some examples, the portion 865 of the first CUBS 870 may include a middle portion of the first CUBS 870. In some examples, the portion 865 of the first CUBS 870 may include an ending portion of the first CUBS 870. In some examples, the first CUBS 870 may be generated, and the at least portion 865 of the first CUBS 870 may be selected, as described with reference to FIG. 11. The second transmission 810 may also include a second CUBS 875, which second CUBS 875 is transmitted during the second symbol period 840. Each of the first CUBS 870 and the second CUBS 875 may have a duration of one symbol period and be generated with a normal IFFT.

Figure 9:
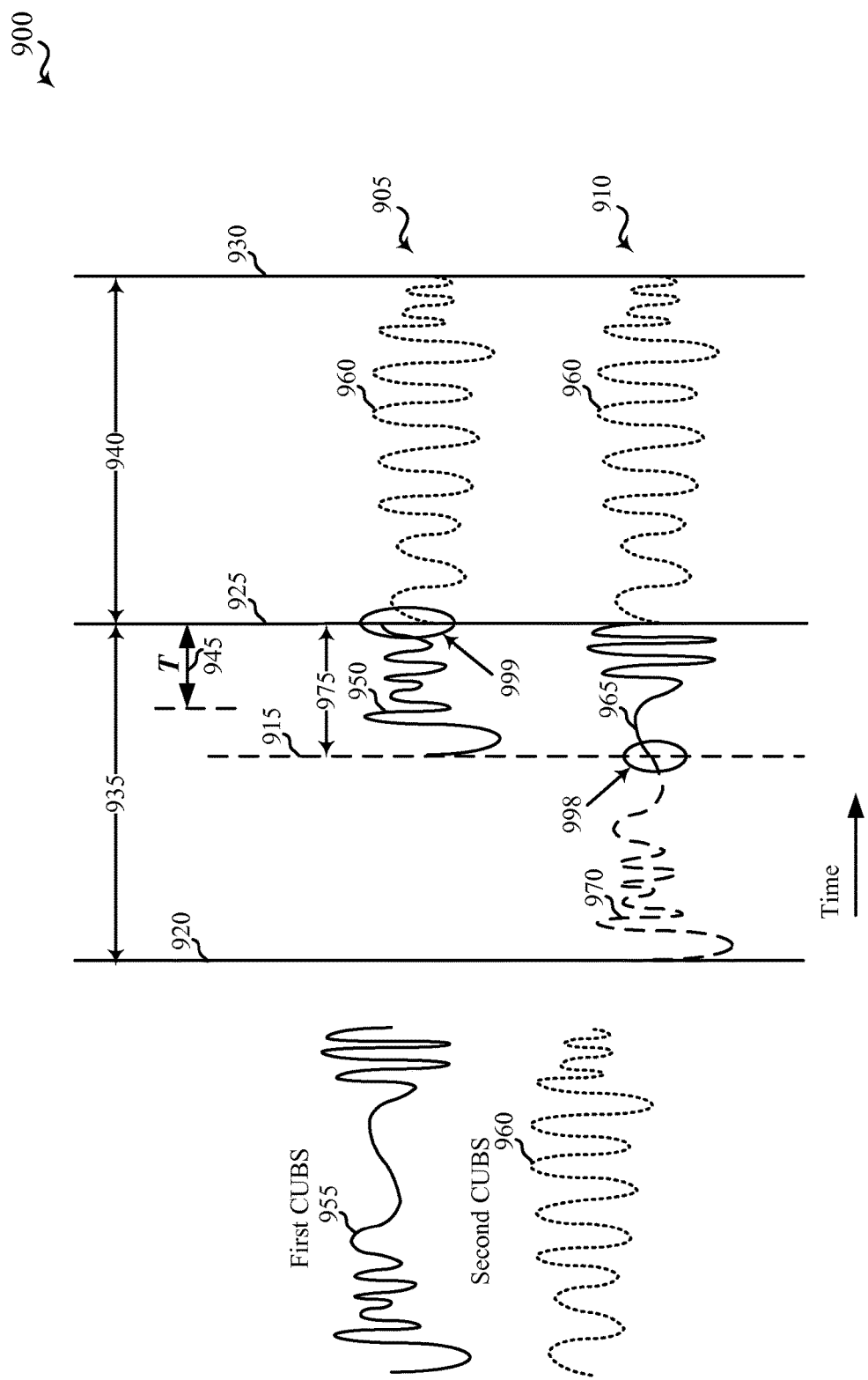
FIG. 9 is a timing diagram illustrating exemplary transmissions of at least a portion of a first CUBS and at least a portion of a second CUBS, in accordance with various aspects of the present disclosure.

FIG. 9 is a timing diagram illustrating exemplary transmissions of at least a portion of a first CUBS and at least a portion of a second CUBS, in accordance with various aspects of the present disclosure. In some examples, the transmissions may be made by a UE such as one of the UEs 115, 215, 215-a, 215-b, or 215-c described with reference to FIG. 1 or 2.

In some examples, a UE may make a first transmission 905 or a second transmission 910, as shown in FIG. 9, over an unlicensed radio frequency spectrum band. The unlicensed radio frequency spectrum band may include a radio frequency spectrum band for which transmitting apparatuses may need to contend for access because the radio frequency spectrum band is available for unlicensed use, such as Wi-Fi use. In some examples, the first transmission 905 or the second transmission 910 may be transmitted in a number of frequency interlaces (e.g., one or more frequency interlaces) of the unlicensed radio frequency spectrum band. Each frequency interlace may include a plurality of contemporaneously transmitted resource blocks, with at least two of the contemporaneously transmitted resource blocks (or at least two sets of the contemporaneously transmitted resource blocks) being non-contiguous in the unlicensed radio frequency spectrum band. In some examples, the contemporaneously transmitted resource blocks may be uniformly spaced in the unlicensed radio frequency spectrum band. In other examples, the contemporaneously transmitted resource blocks may be non-uniformly spaced in the unlicensed radio frequency spectrum band. In some examples, each of the first transmission 905 and the second transmission 910 may be an example of the second transmission 810 described with reference to FIG. 8.

The first transmission 905 or the second transmission 910 may be generated by a UE with reference to one or more of a time 915 of winning contention for access to the unlicensed radio frequency spectrum band (e.g., a time of winning a UCCA, as described with reference to FIG. 3, 4, or 5), a time or times of a number of symbol period boundaries (e.g., a first symbol period boundary 920, a second symbol period boundary 925, or a third symbol period boundary 930), or a threshold time (T) 945 before a next symbol period boundary following the time 915 (e.g., a threshold time 945 before the second symbol period boundary 925). By way of example, there is shown a first symbol period 935 bounded by the first symbol period boundary 920 and the second symbol period boundary 925, and a second symbol period 940 bounded by the second symbol period boundary 925 and the third symbol period boundary 930. The second symbol period 940 follows the first symbol period 935. In some examples, each of the first symbol period 935 and the second symbol period 940 may be an OFDM symbol period. By way of example, the time 915 of winning contention for access to the unlicensed radio frequency spectrum band is shown in FIG. 9 to occur during the first symbol period 935, thereby defining a fractional period 975 of the first symbol period 935 (e.g., a fractional period 975 bounded by the time 915 and the second symbol period boundary 925). The symbol period(s) or fractional period of a symbol period falling between the time 915 and a next subframe boundary may define a preamble.

Turning to the first transmission 905, the first transmission 905 may include a beginning portion 950 of a first CUBS 955, which beginning portion 950 of the first CUBS 955 may be transmitted during the fractional period 975 of the first symbol period 935. In some examples, the first CUBS 955 may be generated, and the beginning portion 950 of the first CUBS 955 may be selected, as described with reference to FIG. 11. For example, a starting sample of the first CUBS 955 may be aligned with the time 915, and a portion of the first CUBS 955 occurring after the second symbol period boundary 925 may be zeroed out (or punctured out). The starting power ramp for the beginning portion 950 of the first CUBS 955 may be pre-generated. The first transmission 905 may also include a second CUBS 960, which second CUBS 960 is transmitted during the second symbol period 940. In some examples, a windowing and overlap-and-add operation 999 may be performed at a transmission juncture of the beginning portion 950 of the first CUBS 955 and the second CUBS 960 (e.g., at the second symbol period boundary 925). Other ways of handling the transmission juncture between at least a first portion of a first CUBS (e.g., the first CUBS 955) and at least a second portion of a second CUBS (e.g., the second CUBS 960) are described with reference to FIG. 10.

Turning to the second transmission 910, the second transmission 910 may include an ending portion 965 of the first CUBS 955, which ending portion 965 of the first CUBS 955 may be transmitted during the fractional period 975 of the first symbol period 935. In some examples, the first CUBS 955 may be generated, and the ending portion 965 of the first CUBS 955 may be selected, as described with reference to FIG. 11. For example, the first CUBS 955 may be time-aligned with the first symbol period 935, and a portion 970 of the first CUBS 955 occurring before the time 915 may be zeroed out (or punctured out). In some examples, a windowing and overlap-and-add operation (e.g., a windowing and overlap-and-add with zero operation 998) may be performed at a commencement of transmission of the ending portion 965 of the first CUBS 955 (e.g., at the time 915). The second transmission 910 may also include a second CUBS 960, which second CUBS 960 is transmitted during the second symbol period 940.

Each of the first CUBS 955 and the second CUBS 960 may have a duration of one symbol period and be generated with a normal IFFT. In some examples of the first transmission 905 or the second transmission 910, the second CUBS 960 may include a copy of a signal included in a transmission to be made over the unlicensed radio frequency spectrum band subsequent to a transmission of the at least portion of the first CUBS 955 and the at least portion of the second CUBS 960. In some examples, the signal included in the transmission to be made over the unlicensed radio frequency spectrum band subsequent to the transmission of the at least portion of the first CUBS 955 and the at least portion of the second CUBS 960 may include a DM-RS. In some examples, the transmission to be made over the unlicensed radio frequency spectrum band subsequent to the transmission of the at least portion of the first CUBS 955 and the at least portion of the second CUBS 960 may include a PUSCH, a PUCCH, a PRACH, an SRS, an SR, or a combination thereof.

In some examples of the first transmission 905 or the second transmission 910, the at least portion of the first CUBS 955 and the at least portion of the second CUBS 960 may be transmitted over the unlicensed radio frequency spectrum band using a same set of antenna ports and precoder used for a first transmission (e.g., a PUSCH, a PUCCH, a PRACH, an SRS, an SR, or a combination thereof) over the unlicensed radio frequency spectrum band subsequent to the transmission of the at least portion of the first CUBS 955 and the at least portion of the second CUBS 960.

In some examples, the first transmission 905 or the second transmission 910 may be made upon determining that the time 915 of winning contention for access to the unlicensed radio frequency spectrum band occurs before the threshold time 945 before a next symbol period boundary following the time 915 (e.g., before the threshold time 945 before the second symbol period boundary 925). Making the first transmission 905 or the second transmission 910 upon determining that the time 915 of winning contention for access to the unlicensed radio frequency spectrum band occurs before the threshold time 945 before a next symbol period boundary following the time 915 may provide sufficient time for preparing the at least portion of the first CUBS 955 or the at least portion of the second CUBS 960. In other examples, the first transmission 905 or the second transmission 910 may be made regardless of the relation between the time 915 and the threshold time 945 before the next symbol period boundary following the time 915.

Figure 10:
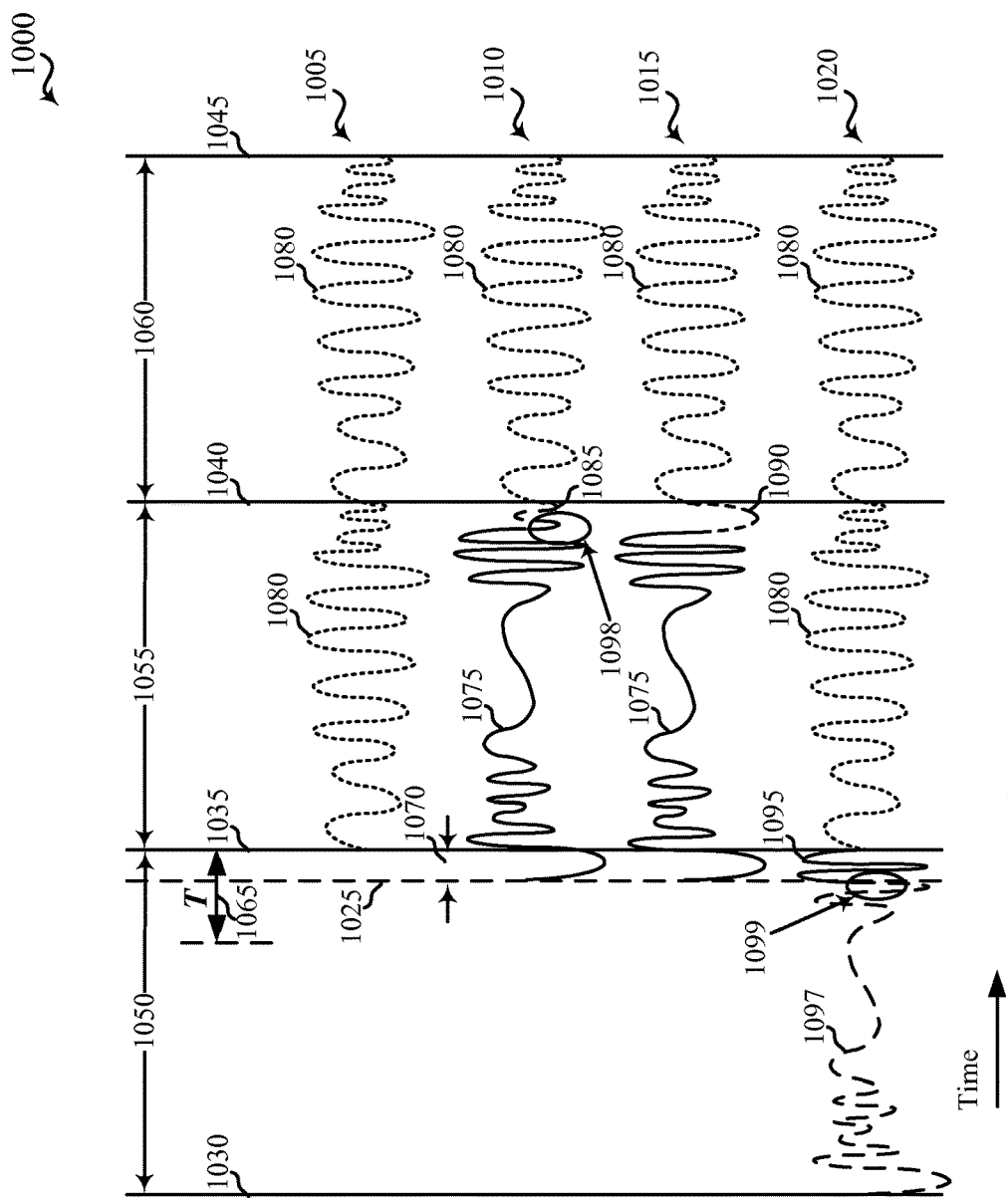
FIG. 10 is a timing diagram illustrating exemplary transmissions of at least a portion of a CUBS, in accordance with various aspects of the present disclosure.

FIG. 10 is a timing diagram illustrating exemplary transmissions of at least a portion of a CUBS, in accordance with various aspects of the present disclosure. In some examples, the transmissions may be made by a UE such as one of the UEs 115, 215, 215-a, 215-b, or 215-c described with reference to FIG. 1 or 2.

In some examples, a UE may make a first transmission 1005, a second transmission 1010, a third transmission 1015, or a fourth transmission 1020, as shown in FIG. 10, over an unlicensed radio frequency spectrum band. The unlicensed radio frequency spectrum band may include a radio frequency spectrum band for which transmitting apparatuses may need to contend for access because the radio frequency spectrum band is available for unlicensed use, such as Wi-Fi use. In some examples, the first transmission 1005, the second transmission 1010, the third transmission 1015, or the fourth transmission 1020 may be transmitted in a number of frequency interlaces (e.g., one or more frequency interlaces) of the unlicensed radio frequency spectrum band. Each frequency interlace may include a plurality of contemporaneously transmitted resource blocks, with at least two of the contemporaneously transmitted resource blocks (or at least two sets of the contemporaneously transmitted resource blocks) being non-contiguous in the unlicensed radio frequency spectrum band. In some examples, the contemporaneously transmitted resource blocks may be uniformly spaced in the unlicensed radio frequency spectrum band. In other examples, the contemporaneously transmitted resource blocks may be non-uniformly spaced in the unlicensed radio frequency spectrum band. In some examples, the first transmission 1005, the second transmission 1010, the third transmission 1015, or the fourth transmission 1020 may be made in place of the first transmission 905 or the second transmission 910 (described with reference to FIG. 9) when a time 1025 of winning contention for access to the unlicensed radio frequency spectrum band (e.g., a time of winning a UCCA, as described with reference to FIG. 3, 4, or 5) occurs within a threshold time (T) 1065 before a next symbol period boundary following the time 1025 (e.g., a threshold time 1065 before the second symbol period boundary 1035)

The first transmission 1005, the second transmission 1010, the third transmission 1015, or the fourth transmission 1020 may also be made by a UE with reference to one or more of a time 1025 of winning contention for access to the unlicensed radio frequency spectrum band (e.g., a time of winning a UCCA, as described with reference to FIG. 3, 4, or 5), a time or times of a number of symbol period boundaries (e.g., a first symbol period boundary 1030, a second symbol period boundary 1035, a third symbol period boundary 1040, or a fourth symbol period boundary 1045), or a threshold time (T) 1065 before a next symbol period boundary following the time 1025 (e.g., a threshold time 1065 before the second symbol period boundary 1035). By way of example, there is shown a first symbol period 1050 bounded by the first symbol period boundary 1030 and the second symbol period boundary 1035, a second symbol period 1055 bounded by the second symbol period boundary 1035 and the third symbol period boundary 1040, and a third symbol period 1060 bounded by the third symbol period boundary 1040 and the fourth symbol period boundary 1045. The second symbol period 1055 follows the first symbol period 1050, and the third symbol period 1060 follows the second symbol period 1055. In some examples, each of the first symbol period 1050, the second symbol period 1055, and the third symbol period 1060 may be an OFDM symbol period. By way of example, the time 1025 of winning contention for access to the unlicensed radio frequency spectrum band is shown in FIG. 10 to occur during the first symbol period 1050, thereby defining a fractional period 1070 of the first symbol period 1050 (e.g., a fractional period 1070 bounded by the time 1025 and the second symbol period boundary 1035). The symbol period(s) or fractional period of a symbol period falling between the time 1025 and a next subframe boundary may define a preamble.

Turning to the first transmission 1005, the first transmission 1005 may include no transmission during the fractional period 1070 of the first symbol period 1050, and a transmission of instances of the second CUBS 1080 during each of the second symbol period 1055 and the third symbol period 1060.

Turning to the second transmission 1010, the second transmission 1010 may include a transmission of at least a portion of a first CUBS 1075 and at least a portion of the second CUBS 1080. The at least portion of the first CUBS 1075 may include the first CUBS 1075, which may be transmitted across the fractional period 1070 of the first symbol period 1050 and a first portion of the second symbol period 1055. The second CUBS 1080 may be time-aligned with the second symbol period 1055, and the at least portion of the second CUBS 1080 may include an ending portion 1085 of the time-aligned second CUBS 1080, which ending portion 1085 may be transmitted during a second portion of the second symbol period 1055. The at least portion of the second CUBS 1080 may also include an instance of the second CUBS 1080 transmitted during the third symbol period 1060. In this manner, the ending portion 1085 of the second CUBS 1080 may be considered a cyclically extended portion of the second CUBS 1080. In some examples, a windowing and overlap-and-add operation 1098 may be performed at a transmission juncture of the first CUBS 1075 and the ending portion 1085 of the second CUBS.

Turning to the third transmission 1015, the third transmission 1015 may include a transmission of at least a portion of the first CUBS 1075 and at least a portion of the second CUBS 1080. The at least portion of the first CUBS 1075 may include the first CUBS 1075, which may be transmitted across the fractional period 1070 of the first symbol period 1050 and a first portion of the second symbol period 1055. The at least portion of the first CUBS 1075 may also include a beginning portion 1090 of the first CUBS 1075, which beginning portion 1090 of the first CUBS 1075 may be transmitted during a second portion of the second symbol period 1055. In this manner, the beginning portion 1090 of the first CUBS 1075 may be considered a cyclically extended portion of the first CUBS 1075. The at least portion of the second CUBS 1080 may include an instance of the second CUBS 1080 transmitted during the third symbol period 1060.

Turning to the fourth transmission 1020, the fourth transmission 1020 may include a transmission of at least a portion of the first CUBS 1075 and at least a portion of the second CUBS 1080. The at least portion of the first CUBS 1075 may include an ending portion 1095 of the first CUBS 1075, which ending portion 1095 of the first CUBS 1075 may be transmitted during the fractional period 1070 of the first symbol period 1050. In some examples, the first CUBS 1075 may be generated, and the ending portion 1095 of the first CUBS 1075 may be selected, as described with reference to FIG. 11. For example, the first CUBS 1075 may be time-aligned with the first symbol period 1050, and a portion 1097 of the first CUBS 1075 occurring before the time 1025 may be zeroed out (or punctured out). In some examples, a windowing and overlap-and-add (e.g., a windowing and overlap-and-add with zero 1099) may be performed at a commencement of transmission of the ending portion 1095 of the first CUBS 1075 (e.g., at the time 1025). The at least portion of the second CUBS 1080 may include instances of the second CUBS 1080 transmitted during the second symbol period 1055 and the third symbol period 1060. In some examples, a windowing and overlap-and-add operation (e.g., a windowing and overlap-and-add with zero operation) may be performed at a commencement of transmission of the ending portion 1095 of the first CUBS 1075 (e.g., at the time 1025).

Each of the first CUBS 1075 and the second CUBS 1080 may have a duration of one symbol period and be generated with a normal IFFT. In some examples of the first transmission 1005, the second transmission 1010, the third transmission 1015, or the fourth transmission 1020, the second CUBS 1080 may include a copy of a signal included in a transmission to be made over the unlicensed radio frequency spectrum band subsequent to a transmission of at least a portion of a CUBS. In some examples, the signal included in the transmission to be made over the unlicensed radio frequency spectrum band subsequent to the transmission of the at least portion of the CUBS may include a DM-RS. In some examples, the transmission to be made over the unlicensed radio frequency spectrum band subsequent to the transmission of the at least portion of the CUBS may include a PUSCH, a PUCCH, a PRACH, an SRS, an SR, or a combination thereof.

In some examples of the first transmission 1005, the second transmission 1010, the third transmission 1015, or the fourth transmission 1020, the at least portion of the CUBS may be transmitted over the unlicensed radio frequency spectrum band using a same set of antenna ports and precoder used for a first transmission (e.g., a PUSCH, a PUCCH, a PRACH, an SRS, an SR, or a combination thereof) over the unlicensed radio frequency spectrum band subsequent to the transmission of the at least portion of the CUBS.

Figure 11:
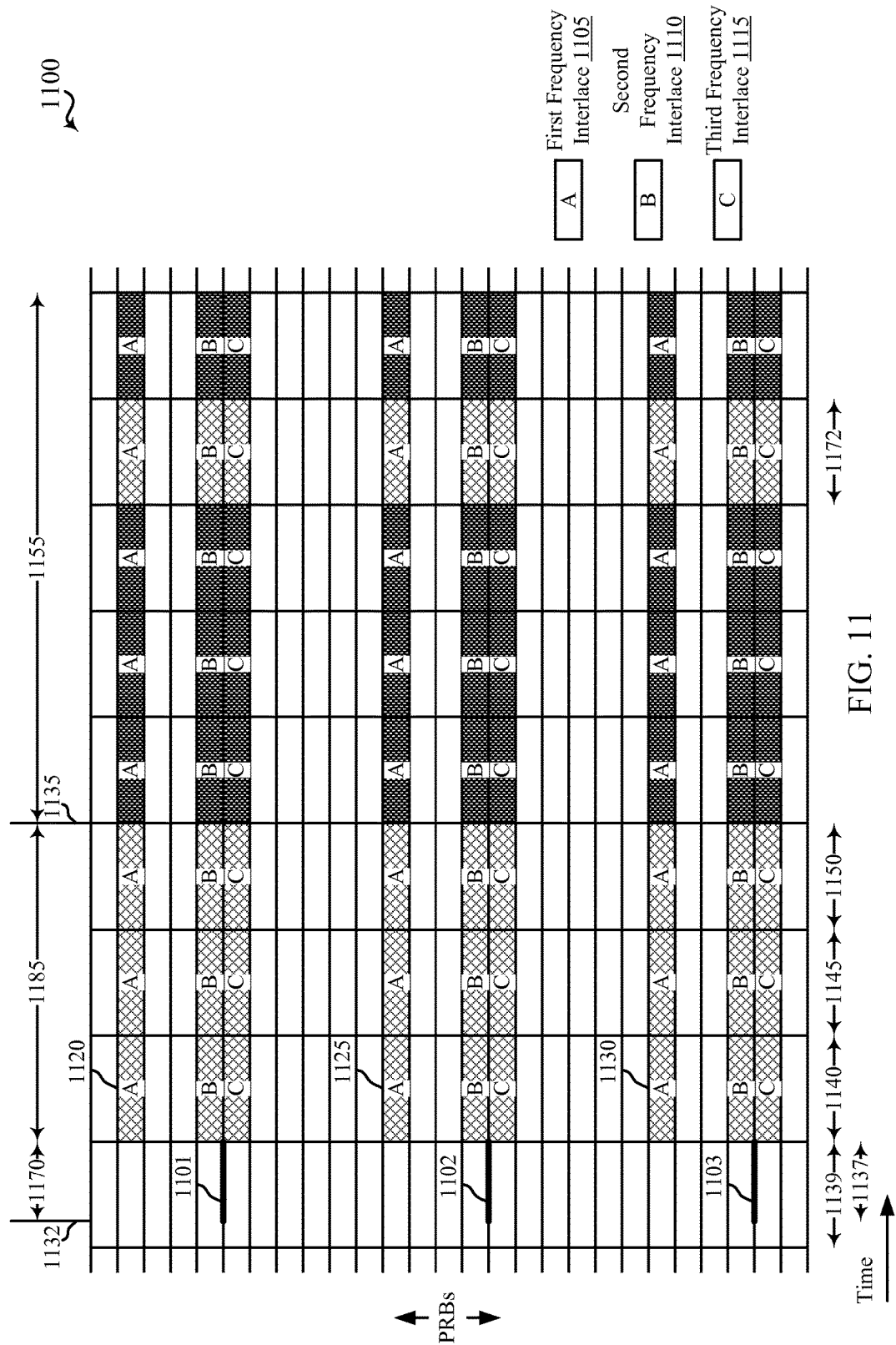
FIG. 11 is a timing diagram illustrating exemplary transmissions of CUBS over an unlicensed radio frequency spectrum band, in accordance with various aspects of the present disclosure.

FIG. 11 is a timing diagram illustrating exemplary transmissions of CUBS over an unlicensed radio frequency spectrum band, in accordance with various aspects of the present disclosure. The unlicensed radio frequency spectrum band may include a radio frequency spectrum band for which transmitting apparatuses may need to contend for access because the radio frequency spectrum band is available for unlicensed use, such as Wi-Fi use. In some examples, the transmissions may be made by a UE, such as one of the UEs 115, 215, 215-a, 215-b, or 215-c described with reference to FIG. 1 or 2.

In some examples a second CUBS 1185 may be transmitted over a first frequency interlace 1105 of the unlicensed radio frequency spectrum band, second frequency interlace 1110 of the unlicensed radio frequency spectrum band, and a third frequency interlace 1115 of the unlicensed radio frequency spectrum band. In some examples, each of the first frequency interlace 1105, the second frequency interlace 1110, and the third frequency interlace 1115 may be allocated to a single UE. Each frequency interlace may include a plurality of contemporaneously transmitted resource blocks, with at least two of the contemporaneously transmitted resource blocks (or at least two sets of the contemporaneously transmitted resource blocks) being non-contiguous in the unlicensed radio frequency spectrum band. In some examples, the contemporaneously transmitted resource blocks may be uniformly spaced in the unlicensed radio frequency spectrum band, as shown in FIG. 11. In other examples, the contemporaneously transmitted resource blocks may be non-uniformly spaced in the unlicensed radio frequency spectrum band. By way of example, each of the first frequency interlace 1105, the second frequency interlace 1110, and the third frequency interlace 1115 is shown to include three contemporaneously transmitted resource blocks (e.g., the first frequency interlace 1105 includes a contemporaneously transmitted first resource block 1120, second resource block 1125, and third resource block 1130). However, a frequency interlace may include more or fewer contemporaneously transmitted resource blocks. In some examples, a frequency interlace may include ten contemporaneously transmitted resource blocks.

A first CUBS 1170 and the second CUBS 1185 may be transmitted between a time 1132 of winning contention for access to the unlicensed radio frequency spectrum band (e.g., a time of winning a UCCA, as described with reference to FIG. 3, 4, or 5) and a subframe boundary 1135. By way of example, FIG. 11 shows the time period between the time 1132 and the subframe boundary 1135 to include a fractional period 1137 of a first symbol period 1139, a second symbol period 1140, a third symbol period 1145, and a fourth symbol period 1150 (e.g., OFDM symbol periods). The first CUBS 1170 may be transmitted during the fractional period 1137 of the first symbol period 1139, and the second CUBS 1185 may be transmitted during each of the second symbol period 1140, the third symbol period 1145, and the fourth symbol period 1150.

In some examples, the second CUBS 1185 may include a copy of a signal included in a transmission 1155 to be made over the unlicensed radio frequency spectrum band subsequent to the transmission of the first CUBS 1170 and the second CUBS 1185. In some examples, the signal included in the transmission 1155 may include a DM-RS. By way of example, a DM-RS is shown to be transmitted in a fourth symbol period 1172 of the transmission 1155. In some examples, a copy of the signal (e.g., the DM-RS) included in the transmission 1155 may be transmitted in each full symbol period (e.g., the second symbol period 1140, the third symbol period 1145, and the fourth symbol period 1150) falling between the time 1132 of winning contention for access to the unlicensed radio frequency spectrum band and the subframe boundary 1135. In some examples, the transmission 1155 may include a PUSCH, a PUCCH, a PRACH, an SRS, an SR, or a combination thereof.

In some examples, the second CUBS 1185 may be transmitted over the same set of physical resource blocks and tones as the transmission 1155. In this manner, the second CUBS 1185 may be transmitted orthogonal to other transmissions. In some examples, the second CUBS 1185 may be transmitted over the unlicensed radio frequency spectrum band using a same set of antenna ports and precoder used for the transmission 1155.

In some examples, the first CUBS 1170 may be configured to be transmitted over selected tones (e.g., tones including a first tone 1101, a second tone 1102, and a third tone 1103) used in the transmission 1155. For example, the first CUBS 1170 may be configured to be transmitted over tones (e.g., tone of resource blocks of the first frequency interlace 1105, the second frequency interlace 1110, and the third frequency interlace 1115) selected to maximize a distance (or distances) in the frequency spectrum between the selected tones and the nearest tones not allocated to the transmission 1155. In some examples, a selected tone may be a tone in the middle of a contiguous resource block cluster allocated to the transmission 1155 (e.g., one of adjacent tones #11 (in a resource block of the second frequency interlace 1110) and #0 (in a resource block of the third frequency interlace 1115) of a two resource block cluster in which each physical resource block has tones #0 to #11). In some examples, the total transmit power used for transmitting the first CUBS 1170 may be matched to the total transmit power used for transmitting the transmission 1155.

In one example of selecting tones for transmission of the first CUBS 1170, consider an unlicensed radio frequency spectrum band divided into 100 physical resource blocks in the frequency domain, with each of the physical resource blocks being contemporaneously transmitted during a single symbol period in the time domain. Also consider that the 100 physical resource blocks are uniformly distributed among ten frequency interlaces, and that each frequency interlace includes a physical resource block from each of ten resource block groups, where a resource block group includes ten contiguous physical resource blocks of the 100 physical resource blocks. Also consider that each physical resource block includes twelve tones numbered #0 to #11. In such an example, a method of selecting tones for transmitting the first CUBS 1170 may include the following operations. From the ten resource block groups, starting with a lowest frequency resource block group and a lowest frequency physical resource block, a largest cluster of contiguous physical resource blocks allocated to a first UE, which largest cluster of contiguous physical resource blocks includes at least one physical resource block in the lowest frequency resource block group, may be selected. A tone may then be selected from the middle of this largest cluster. If the cluster includes an even number of physical resource blocks, the selected tone may be the first or last tone of a physical resource block (e.g., tone #0 or #11). If the cluster includes an odd number of physical resource blocks, the selected tone may be tone #5 or #6 of a physical resource block. A similarly positioned tone may then be selected from each higher frequency resource block group, accounting for ambiguities so that the tones in the resulting selection of ten tones are uniformly spaced over the unlicensed radio frequency spectrum band.

With reference to FIG. 7, 8, 9, 10, or 11, and when the resource blocks of a frequency interlace allocated to a UE have a non-uniform spacing (e.g., resource blocks #0, #12, #20, #31, #41, #52, #60, #73, #82, and #91 of resource blocks #0 to #99) instead of a uniform spacing (e.g., resource blocks #0, #10, #20, #30, #40, #50, #60, #70, #80, and #90), then a portion of a first CUBS and a second CUBS should occupy the dithered interlace, and the example first transmission 805 described with reference to FIG. 8 may not be as desirable as the example second transmission 810.

Figure 12:
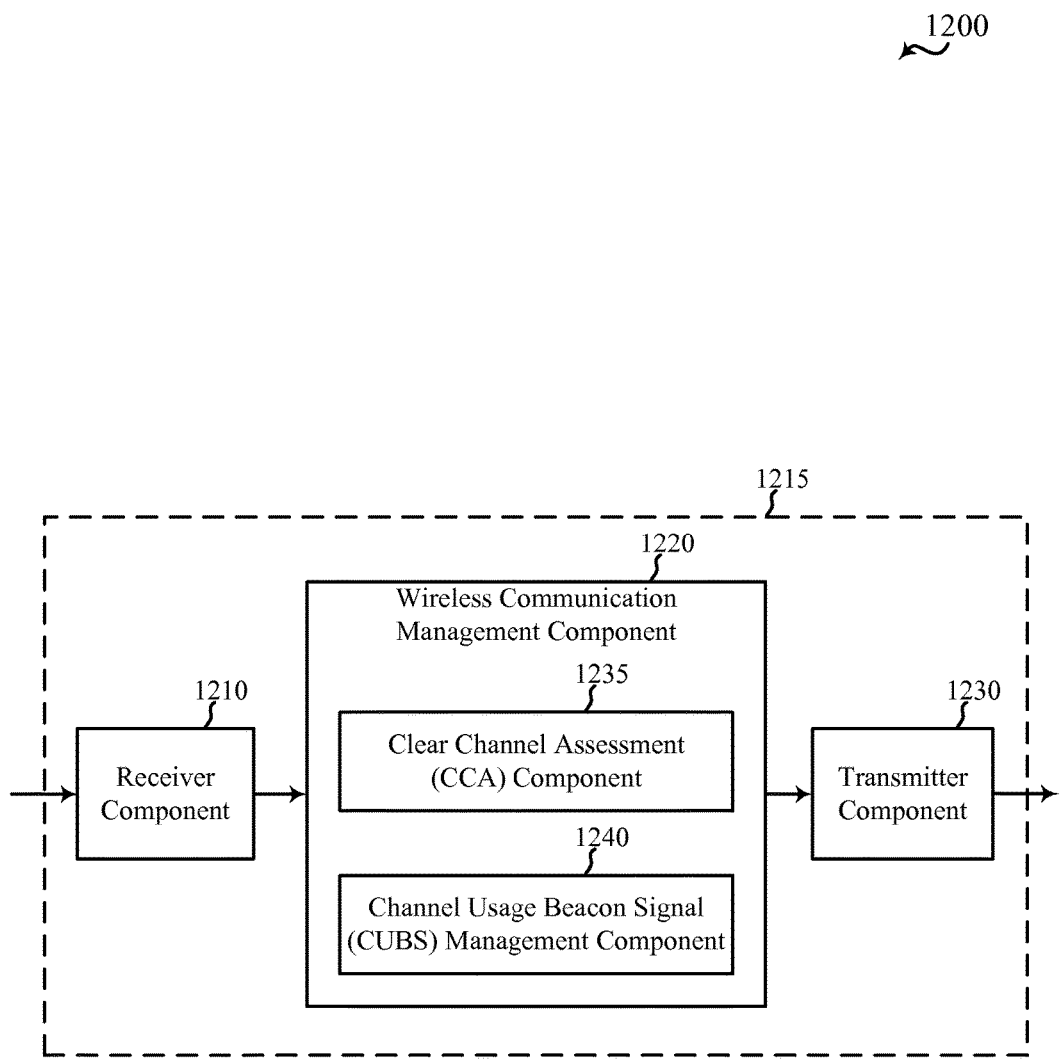
FIG. 12 shows a block diagram of an apparatus for use in wireless communication, in accordance with various aspects of the present disclosure.

FIG. 12 shows a block diagram 1200 of an apparatus 1215 for use in wireless communication, in accordance with various aspects of the present disclosure. The apparatus 1215 may be an example of aspects of one or more of the UEs 115, 215, 215-a, 215-b, or 215-c described with reference to FIG. 1 or 2. The apparatus 1215 may also be or include a processor. The apparatus 1215 may include a receiver component 1210, a wireless communication management component 1220, or a transmitter component 1230. Each of these components may be in communication with each other.

The components of the apparatus 1215 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each component may also be implemented, in whole or in part, with instructions embodied in a memory, formatted to be executed by one or more general or application-specific processors.

In some examples, the receiver component 1210 may include at least one radio frequency (RF) receiver, such as at least one RF receiver operable to receive transmissions over a licensed radio frequency spectrum band (e.g., a radio frequency spectrum band for which transmitting apparatuses may not contend for access because the radio frequency spectrum band is licensed to some users for various uses, such as a licensed radio frequency spectrum band usable for LTE/LTE-A communications) or an unlicensed radio frequency spectrum band (e.g., a radio frequency spectrum band for which transmitting apparatuses may need to contend for access because the radio frequency spectrum band is available for unlicensed use, such as Wi-Fi use). In some examples, the licensed radio frequency spectrum band or the unlicensed radio frequency spectrum band may be used for LTE/LTE-A communications, as described, for example, with reference to FIG. 1 or 2. The receiver component 1210 may be used to receive various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the transmitter component 1230 may include at least one RF transmitter, such as at least one RF transmitter operable to transmit over the licensed radio frequency spectrum band or the unlicensed radio frequency spectrum band. The transmitter component 1230 may be used to transmit various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the wireless communication management component 1220 may be used to manage one or more aspects of wireless communication for the apparatus 1215. In some examples, the wireless communication management component 1220 may include a CCA component 1235 or a CUBS management component 1240.

In some examples, the CCA component 1235 may contend for access to the unlicensed radio frequency spectrum band. In some examples, the CCA component 1235 may contend for access to the unlicensed radio frequency spectrum band by performing a UCCA, as described, for example, with reference to FIG. 3, 4, or 5. Upon winning a contention for access to the unlicensed radio frequency spectrum band, the CCA component 1235 may enable the CUBS management component 1240 to transmit a portion of at least one CUBS over the unlicensed radio frequency spectrum band.

In some examples, the CUBS management component 1240 may be used to transmit the at least portion of a CUBS over the unlicensed radio frequency spectrum band. The at least portion of the CUBS may be transmitted in a number of frequency interlaces (e.g., one or more frequency interlaces) of the unlicensed radio frequency spectrum band. Each frequency interlace may include a plurality of contemporaneously transmitted resource blocks, with at least two of the contemporaneously transmitted resource blocks (or at least two sets of the contemporaneously transmitted resource blocks) being non-contiguous in the unlicensed radio frequency spectrum band. In some examples, the contemporaneously transmitted resource blocks may be uniformly spaced in the unlicensed radio frequency spectrum band. In other examples, the contemporaneously transmitted resource blocks may be non-uniformly spaced in the unlicensed radio frequency spectrum band.

In some examples, the at least portion of the CUBS transmitted using the CUBS management component 1240 may include at least a portion of a first CUBS and at least a portion of a second CUBS. The first CUBS may be different from the second CUBS. In some examples, the CUBS management component 1240 may transmit the at least portion of the first CUBS and the at least portion of the second CUBS during a preamble including at least a fractional period of a first symbol period. In some examples, the preamble may also include one or more symbol periods following the fractional period of the first symbol period, such as a second symbol period following the first symbol period, or a third symbol period following the second symbol period. In some examples, each of the first symbol period, the second symbol period, and the third symbol period may be an OFDM symbol period.

In some examples, the CUBS transmitted using the CUBS management component 1240 may include a copy of a signal, which signal is to be included in a transmission to be made over the unlicensed radio frequency spectrum band subsequent to a transmission of the at least portion of the CUBS. In some examples, the signal included in the transmission to be made over the unlicensed radio frequency spectrum band subsequent to the transmission of the at least portion of the CUBS may include a DM-RS. In some examples, the transmission to be made over the unlicensed radio frequency spectrum band subsequent to the transmission of the at least portion of the CUBS may include a PUSCH, a PUCCH, a PRACH, an SRS, an SR, or a combination thereof.

Figure 13:
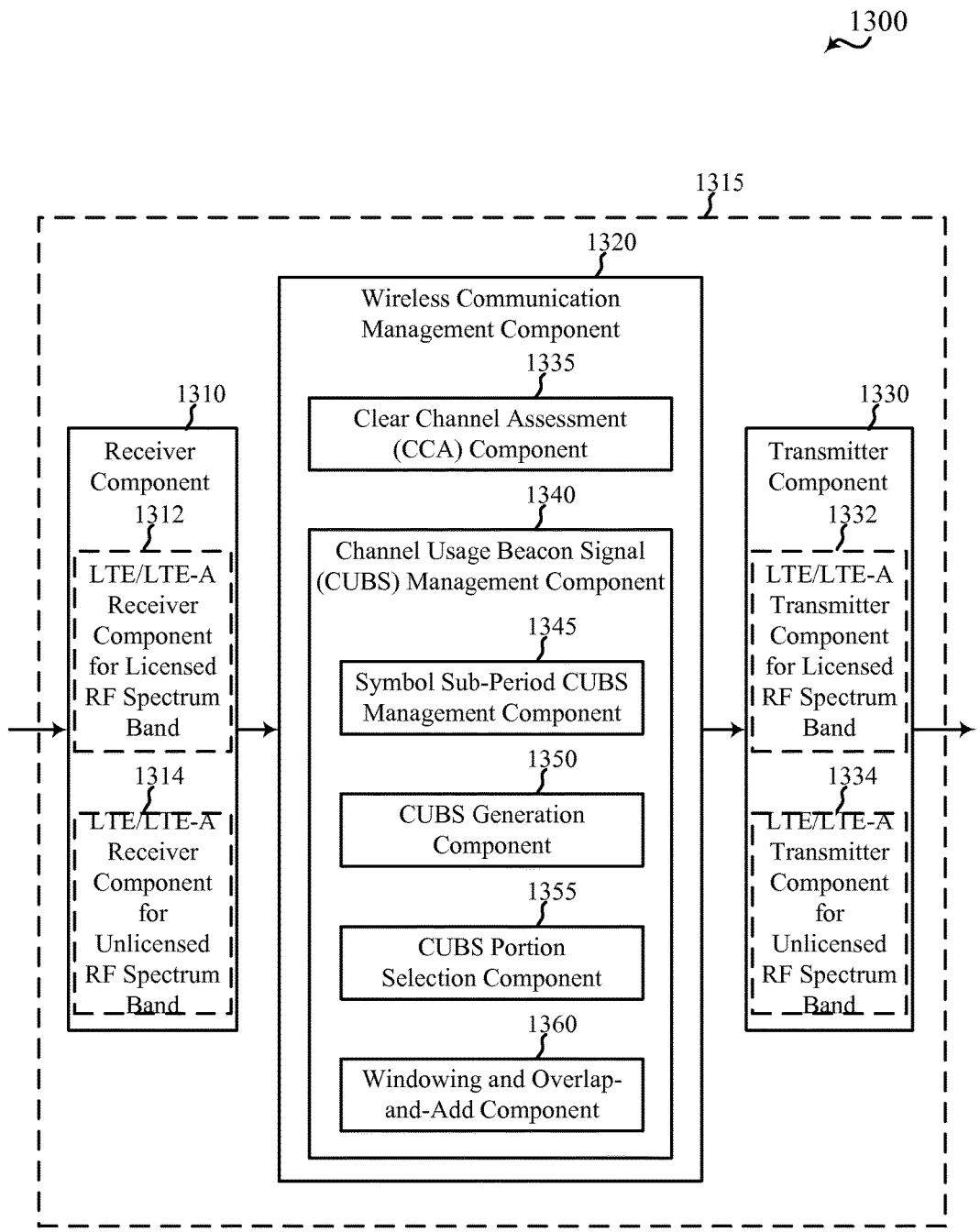
FIG. 13 shows a block diagram of an apparatus for use in wireless communication, in accordance with various aspects of the present disclosure.

FIG. 13 shows a block diagram 1300 of an apparatus 1315 for use in wireless communication, in accordance with various aspects of the present disclosure. The apparatus 1315 may be an example of aspects of one or more of the UEs 115, 215, 215-a, 215-b, or 215-c described with reference to FIG. 1 or 2, or aspects of the apparatus 1215 described with reference to FIG. 12. The apparatus 1315 may also be or include a processor. The apparatus 1315 may include a receiver component 1310, a wireless communication management component 1320, or a transmitter component 1330. Each of these components may be in communication with each other.

The components of the apparatus 1315 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors.

In some examples, the receiver component 1310 may include at least one RF receiver, such as at least one RF receiver operable to receive transmissions over a licensed radio frequency spectrum band (e.g., a radio frequency spectrum band for which transmitting apparatuses may not contend for access because the radio frequency spectrum band is licensed to some users for various uses, such as a licensed radio frequency spectrum band usable for LTE/LTE-A communications) or an unlicensed radio frequency spectrum band (e.g., a radio frequency spectrum band for which transmitting apparatuses may need to contend for access because the radio frequency spectrum band is available for unlicensed use, such as Wi-Fi use). In some examples, the licensed radio frequency spectrum band or the unlicensed radio frequency spectrum band may be used for LTE/LTE-A communications, as described, for example, with reference to FIG. 1 or 2. The receiver component 1310 may in some cases include separate receivers for the licensed radio frequency spectrum band and the unlicensed radio frequency spectrum band. The separate receivers may, in some examples, take the form of an LTE/LTE-A receiver component for communicating over the licensed radio frequency spectrum band (e.g., LTE/LTE-A receiver component for licensed RF spectrum band 1312), and an LTE/LTE-A receiver component for communicating over the unlicensed radio frequency spectrum band (e.g., LTE/LTE-A receiver component for unlicensed RF spectrum band 1314). The receiver component 1310, including the LTE/LTE-A receiver component for licensed RF spectrum band 1312 or the LTE/LTE-A receiver component for unlicensed RF spectrum band 1314, may be used to receive various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the transmitter component 1330 may include at least one RF transmitter, such as at least one RF transmitter operable to transmit over the licensed radio frequency spectrum band or the unlicensed radio frequency spectrum band. The transmitter component 1330 may in some cases include separate transmitters for the licensed radio frequency spectrum band and the unlicensed radio frequency spectrum band. The separate transmitters may, in some examples, take the form of an LTE/LTE-A transmitter component for communicating over the licensed radio frequency spectrum band (e.g., LTE/LTE-A transmitter component for licensed RF spectrum band 1332), and an LTE/LTE-A transmitter component for communicating over the unlicensed radio frequency spectrum band (e.g., LTE/LTE-A transmitter component for unlicensed RF spectrum band 1334). The transmitter component 1330, including the LTE/LTE-A transmitter component for licensed RF spectrum band 1332 or the LTE/LTE-A transmitter component for unlicensed RF spectrum band 1334, may be used to transmit various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the wireless communication management component 1320 may be used to manage one or more aspects of wireless communication for the apparatus 1315. In some examples, the wireless communication management component 1320 may include a CCA component 1335 or a CUBS management component 1340.

In some examples, the CCA component 1335 may contend for access to the unlicensed radio frequency spectrum band. In some examples, the CCA component 1335 may contend for access to the unlicensed radio frequency spectrum band by performing a UCCA, as described, for example, with reference to FIG. 3, 4, or 5. Upon winning a contention for access to the unlicensed radio frequency spectrum band, the CCA component 1335 may enable the CUBS management component 1340 to transmit a portion of at least one CUBS over the unlicensed radio frequency spectrum band.

In some examples, the CUBS management component 1340 may be used to transmit the at least portion of a CUBS over the unlicensed radio frequency spectrum band. The at least portion of the CUBS may be transmitted in a number of frequency interlaces (e.g., one or more frequency interlaces) of the unlicensed radio frequency spectrum band. Each frequency interlace may include a plurality of contemporaneously transmitted resource blocks, with at least two of the contemporaneously transmitted resource blocks (or at least two sets of the contemporaneously transmitted resource blocks) being non-contiguous in the unlicensed radio frequency spectrum band. In some examples, the contemporaneously transmitted resource blocks may be uniformly spaced in the unlicensed radio frequency spectrum band. In other examples, the contemporaneously transmitted resource blocks may be non-uniformly spaced in the unlicensed radio frequency spectrum band.

In some examples, the at least portion of the CUBS transmitted using the CUBS management component 1340 may include at least a portion of a first CUBS and at least a portion of a second CUBS. The first CUBS may be different from the second CUBS. In some examples, the CUBS management component 1340 may transmit the at least portion of the first CUBS and the at least portion of the second CUBS during a preamble including at least a fractional period of a first symbol period. In some examples, the preamble may also include one or more symbol periods following the fractional period of the first symbol period, such as a second symbol period following the first symbol period or a third symbol period following the second symbol period. In some examples, each of the first symbol period, the second symbol period, and the third symbol period may be an OFDM symbol period.

In some examples, the CUBS management component 1340 may include a symbol sub-period CUBS management component 1345, a CUBS generation component 1350, a CUBS portion selection component 1355, or a windowing and overlap-and-add component 1360. In some examples, a symbol period may include a plurality of sub-periods, and the symbol sub-period CUBS management component 1345 may be used to determine a number of full sub-periods that follow a time of winning a contention for access to the unlicensed radio frequency spectrum band (e.g., a number of full sub-periods included in a fractional period of a symbol period following the time of winning the contention for access to the unlicensed radio frequency spectrum band). The symbol sub-period CUBS management component 1345 may also be used to transmit an instance of the first CUBS in each of the number of full sub-periods that follow the winning the contention for access to the unlicensed radio frequency spectrum band, as described, for example, with reference to FIG. 8. In some examples, the first CUBS may include a periodic zero crossing that provides smoothness in the time domain when the instance of the first CUBS is abutted to another instance of the first CUBS or the second CUBS.

In some examples, the CUBS generation component 1350 may be used to generate the first CUBS or the second CUBS. In some examples, the CUBS generation component 1350 may generate the first CUBS as described with reference to FIG. 27 or 28. In some examples, each of the first CUBS and the second CUBS may have a duration of one symbol period and be generated with a normal IFFT.

In some examples, the CUBS portion selection component 1355 may be used to time-align the first CUBS with the first symbol period, or time-align the second CUBS with the second symbol period. The CUBS portion selection component 1355 may also be used to select the portions of the first CUBS or second CUBS that are transmitted during a preamble.

In some examples, the CUBS portion selection component 1355 may be used to transmit a beginning portion of the first CUBS during a fractional period of the first symbol period, and to transmit the second CUBS during the second symbol period.

In some examples, the CUBS portion selection component 1355 may be used to transmit the first CUBS across the fractional period of the first symbol period and a first portion of the second symbol period, and to transmit an ending portion of the time-aligned second CUBS during a second portion of the second symbol period.

In some examples, the CUBS portion selection component 1355 may be used to transmit the first CUBS across the fractional period of the first symbol period and a first portion of the second symbol period; to transmit a beginning portion of the first CUBS during a second portion of the second symbol period; and to transmit the second CUBS during the third symbol period.

In some examples, the CUBS portion selection component 1355 may be used to transmit an ending portion of the time-aligned first CUBS during the fractional period of the first symbol period, and to transmit the second CUBS during the second symbol period.

In some examples, the windowing and overlap-and-add component 1360 may be used to perform a windowing and overlap-and-add operation at a transmission juncture of the at least portion of the first CUBS and the at least portion of the second CUBS. In some examples, the windowing and overlap-and-add component 1360 may be used to perform a windowing and overlap-and-add operation at a commencement of a transmission of the at least portion of the first CUBS.

In some examples, the CUBS transmitted using the CUBS management component 1340 may include a copy of a signal included in a transmission to be made over the unlicensed radio frequency spectrum band subsequent to a transmission of the at least portion of the first CUBS and the at least portion of the second CUBS. In some examples, the signal included in the transmission to be made over the unlicensed radio frequency spectrum band subsequent to the transmission of the at least portion of the first CUBS and the at least portion of the second CUBS may include a DM-RS. In some examples, the transmission to be made over the unlicensed radio frequency spectrum band subsequent to the transmission of the at least portion of the first CUBS and the at least portion of the second CUBS may include a PUSCH, a PUCCH, a PRACH, an SRS, an SR, or a combination thereof.

In some examples, the CUBS management component 1340 may be used to transmit the at least portion of the first CUBS and the at least portion of the second CUBS over the unlicensed radio frequency spectrum band using a same set of antenna ports and precoder used for a first transmission (e.g., a PUSCH, a PUCCH, a PRACH, an SRS, an SR, or a combination thereof) over the unlicensed radio frequency spectrum band subsequent to the transmission of the at least portion of the first CUBS and the at least portion of the second CUBS.

Figure 14:
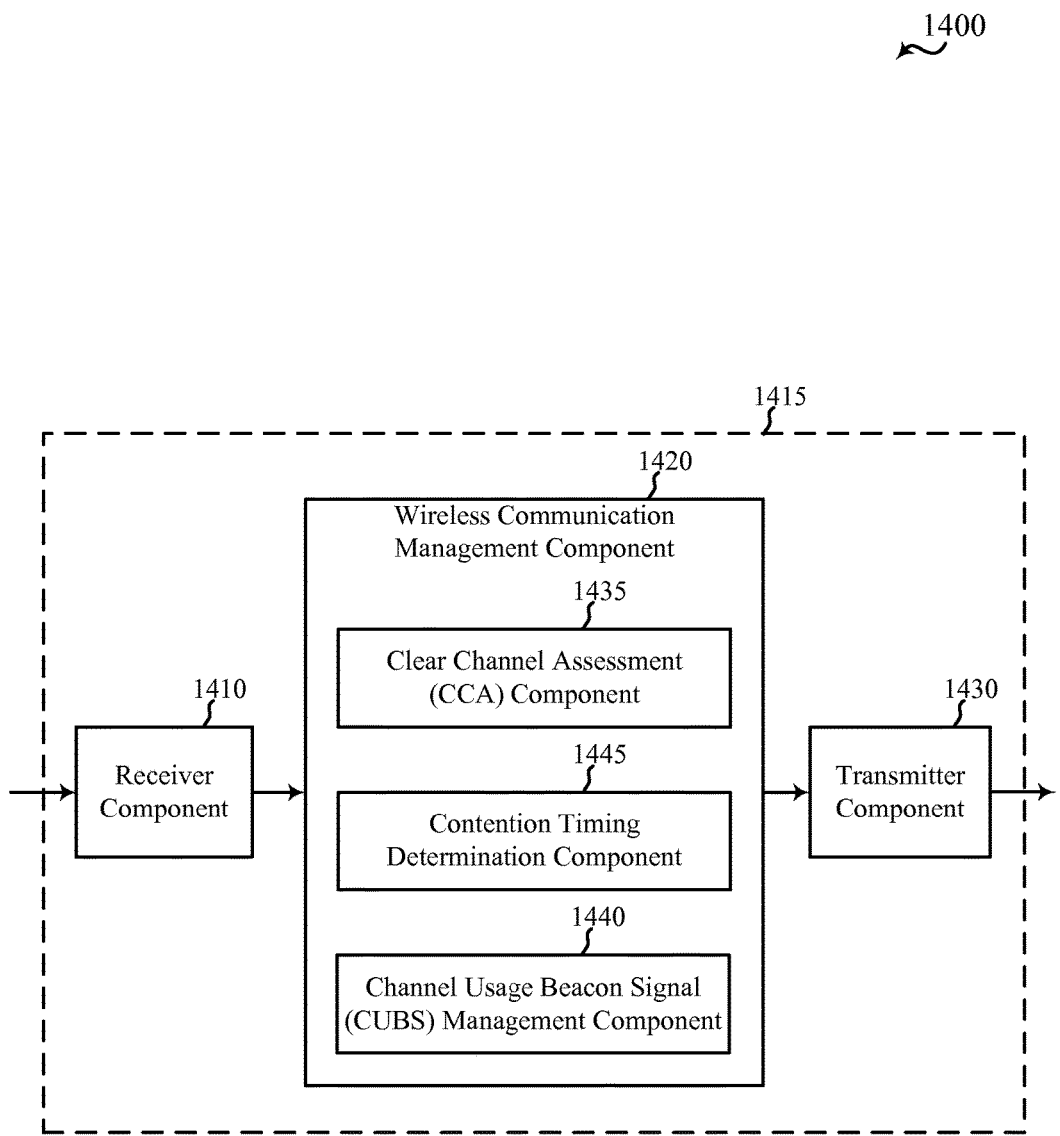
FIG. 14 shows a block diagram of an apparatus for use in wireless communication, in accordance with various aspects of the present disclosure.

FIG. 14 shows a block diagram 1400 of an apparatus 1415 for use in wireless communication, in accordance with various aspects of the present disclosure. The apparatus 1415 may be an example of aspects of one or more of the UEs 115, 215, 215-*a*, 215-*b*, or 215-*c* described with reference to FIG. 1 or 2, or aspects of the apparatus 1215 or 1315 described with reference to FIG. 12 or 13. The apparatus 1415 may also be or include a processor. The apparatus 1415 may include a receiver component 1410, a wireless communication management component 1420, or a transmitter component 1430. Each of these components may be in communication with each other.

The components of the apparatus 1415 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors.

In some examples, the receiver component 1410 may include at least one RF receiver, such as at least one RF receiver operable to receive transmissions over a licensed radio frequency spectrum band (e.g., a radio frequency spectrum band for which transmitting apparatuses may not contend for access because the radio frequency spectrum band is licensed to some users for various uses, such as a licensed radio frequency spectrum band usable for LTE/LTE-A communications) or an unlicensed radio frequency spectrum band (e.g., a radio frequency spectrum band for which transmitting apparatuses may need to contend for access because the radio frequency spectrum band is available for unlicensed use, such as Wi-Fi use). In some examples, the licensed radio frequency spectrum band or the unlicensed radio frequency spectrum band may be used for LTE/LTE-A communications, as described, for example, with reference to FIG. 1 or 2. The receiver component 1410 may be used to receive various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the transmitter component 1430 may include at least one RF transmitter, such as at least one RF transmitter operable to transmit over the licensed radio frequency spectrum band or the unlicensed radio frequency spectrum band. The transmitter component 1430 may be used to transmit various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the wireless communication management component 1420 may be used to manage one or more aspects of wireless communication for the apparatus 1415. In some examples, the wireless communication management component 1420 may include a CCA component 1435, a contention timing determination component 1445, or a CUBS management component 1440.

In some examples, the CCA component 1435 may contend for access to the unlicensed radio frequency spectrum band. In some examples, the CCA component 1435 may contend for access to the unlicensed radio frequency spectrum band by performing a UCCA, as described, for example, with reference to FIG. 3, 4, or 5. Upon winning a contention for access to the unlicensed radio frequency spectrum band, the CCA component 1435 may enable the CUBS management component 1440 to transmit a portion of at least one CUBS over the unlicensed radio frequency spectrum band.

In some examples, the contention timing determination component 1445 may be used to determine whether a contention won by the CCA component 1435 is won within a threshold time before a next symbol period boundary.

In some examples, the CUBS management component 1440 may be used to transmit the at least portion of a CUBS over the unlicensed radio frequency spectrum band. The at least portion of the CUBS may be based on the determination made by the contention timing determination component 1445. The at least portion of the CUBS may be transmitted in a number of frequency interlaces (e.g., one or more frequency interlaces) of the unlicensed radio frequency spectrum band. Each frequency interlace may include a plurality of contemporaneously transmitted resource blocks, with at least two of the contemporaneously transmitted resource blocks (or at least two sets of the contemporaneously transmitted resource blocks) being non-contiguous in the unlicensed radio frequency spectrum band. In some examples, the contemporaneously transmitted resource blocks may be uniformly spaced in the unlicensed radio frequency spectrum band. In other examples, the contemporaneously transmitted resource blocks may be non-uniformly spaced in the unlicensed radio frequency spectrum band.

In some examples, the at least portion of the CUBS transmitted using the CUBS management component 1440 may include at least a portion of a first CUBS and at least a portion of a second CUBS. The first CUBS may be different from the second CUBS. In some examples, the CUBS management component 1440 may transmit the at least portion of the CUBS, or the at least portion of the first CUBS and the at least portion of the second CUBS, during a preamble including at least a fractional period of a first symbol period. In some examples, the preamble may also include one or more symbol periods following the fractional period of the first symbol period, such as a second symbol period following the first symbol period or a third symbol period following the second symbol period. In some examples, each of the first symbol period, the second symbol period, and the third symbol period may be an OFDM symbol period.

Figure 15:
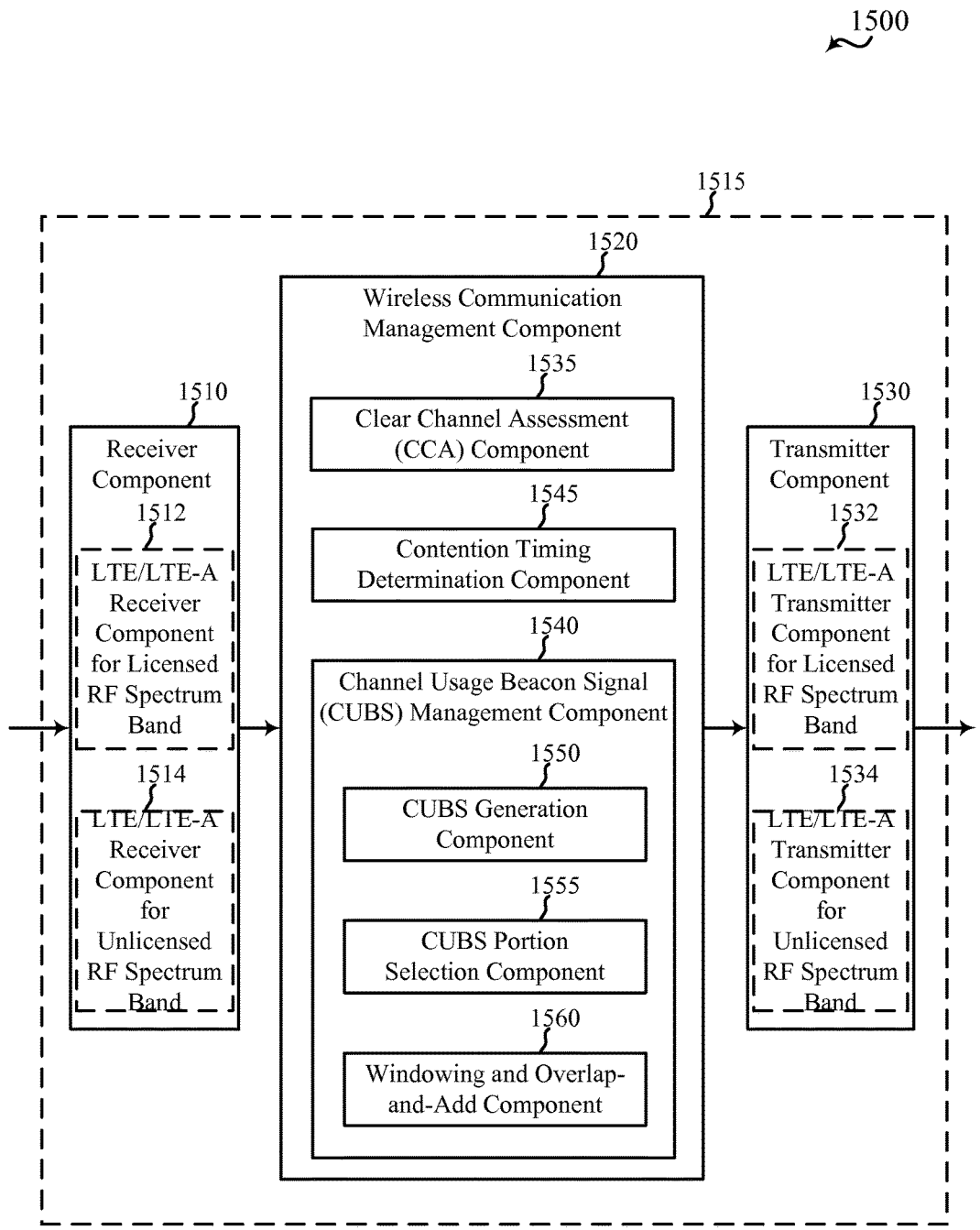
FIG. 15 shows a block diagram of an apparatus for use in wireless communication, in accordance with various aspects of the present disclosure.

FIG. 15 shows a block diagram 1500 of an apparatus 1515 for use in wireless communication, in accordance with various aspects of the present disclosure. The apparatus 1515 may be an example of aspects of one or more of the UEs 115, 215, 215-a, 215-b, or 215-c described with reference to FIG. 1 or 2, or aspects of the apparatus 1215, 1315, or 1415 described with reference to FIG. 12, 13, or 14. The apparatus 1515 may also be or include a processor. The apparatus 1515 may include a receiver component 1510, a wireless communication management component 1520, or a transmitter component 1530. Each of these components may be in communication with each other.

The components of the apparatus 1515 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors.

In some examples, the receiver component 1510 may include at least one RF receiver, such as at least one RF receiver operable to receive transmissions over a licensed radio frequency spectrum band (e.g., a radio frequency spectrum band for which transmitting apparatuses may not contend for access because the radio frequency spectrum band is licensed to some users for various uses, such as a licensed radio frequency spectrum band usable for LTE/LTE-A communications) or an unlicensed radio frequency spectrum band (e.g., a radio frequency spectrum band for which transmitting apparatuses may need to contend for access because the radio frequency spectrum band is available for unlicensed use, such as Wi-Fi use). In some examples, the licensed radio frequency spectrum band or the unlicensed radio frequency spectrum band may be used for LTE/LTE-A communications, as described, for example, with reference to FIG. 1 or 2. The receiver component 1510 may in some cases include separate receivers for the licensed radio frequency spectrum band and the unlicensed radio frequency spectrum band. The separate receivers may, in some examples, take the form of an LTE/LTE-A receiver component for communicating over the licensed radio frequency spectrum band (e.g., LTE/LTE-A receiver component for licensed RF spectrum band 1512), and an LTE/LTE-A receiver component for communicating over the unlicensed radio frequency spectrum band (e.g., LTE/LTE-A receiver component for unlicensed RF spectrum band 1514). The receiver component 1510, including the LTE/LTE-A receiver component for licensed RF spectrum band 1512 or the LTE/LTE-A receiver component for unlicensed RF spectrum band 1514, may be used to receive various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the transmitter component 1530 may include at least one RF transmitter, such as at least one RF transmitter operable to transmit over the licensed radio frequency spectrum band or the unlicensed radio frequency spectrum band. The transmitter component 1530 may in some cases include separate transmitters for the licensed radio frequency spectrum band and the unlicensed radio frequency spectrum band. The separate transmitters may, in some examples, take the form of an LTE/LTE-A transmitter component for communicating over the licensed radio frequency spectrum band (e.g., LTE/LTE-A transmitter component for licensed RF spectrum band 1532), and an LTE/LTE-A transmitter component for communicating over the unlicensed radio frequency spectrum band (e.g., LTE/LTE-A transmitter component for unlicensed RF spectrum band 1534). The transmitter component 1530, including the LTE/LTE-A transmitter component for licensed RF spectrum band 1532 or the LTE/LTE-A transmitter component for unlicensed RF spectrum band 1534, may be used to transmit various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the wireless communication management component 1520 may be used to manage one or more aspects of wireless communication for the apparatus 1515. In some examples, the wireless communication management component 1520 may include a CCA component 1535, a contention timing determination component 1545, or a CUBS management component 1540.

In some examples, the CCA component 1535 may contend for access to the unlicensed radio frequency spectrum band. In some examples, the CCA component 1535 may contend for access to the unlicensed radio frequency spectrum band by performing a UCCA, as described, for example, with reference to FIG. 3, 4, or 5. Upon winning a contention for access to the unlicensed radio frequency spectrum band, the CCA component 1535 may enable the CUBS management component 1540 to transmit a portion of at least one CUBS over the unlicensed radio frequency spectrum band.

In some examples, the contention timing determination component 1545 may be used to determine whether a contention won by the CCA component 1535 is won within a threshold time before a next symbol period boundary.

In some examples, the CUBS management component 1540 may be used to transmit the at least portion of a CUBS over the unlicensed radio frequency spectrum band. The at least portion of the CUBS may be based on the determination made by the contention timing determination component 1545. The at least portion of the CUBS may be transmitted in a number of frequency interlaces (e.g., one or more frequency interlaces) of the unlicensed radio frequency spectrum band. Each frequency interlace may include a plurality of contemporaneously transmitted resource blocks, with at least two of the contemporaneously transmitted resource blocks (or at least two sets of the contemporaneously transmitted resource blocks) being non-contiguous in the unlicensed radio frequency spectrum band. In some examples, the contemporaneously transmitted resource blocks may be uniformly spaced in the unlicensed radio frequency spectrum band. In other examples, the contemporaneously transmitted resource blocks may be non-uniformly spaced in the unlicensed radio frequency spectrum band.

In some examples, the at least portion of the CUBS transmitted using the CUBS management component 1540 may include at least a portion of a first CUBS and at least a portion of a second CUBS. The first CUBS may be different from the second CUBS. In some examples, the CUBS management component 1540 may transmit the at least portion of the CUBS, or the at least portion of the first CUBS and the at least portion of the second CUBS, during a preamble including at least a fractional period of a first symbol period. In some examples, the preamble may also include one or more symbol periods following the fractional period of the first symbol period, such as a second symbol period following the first symbol period or a third symbol period following the second symbol period. In some examples, each of the first symbol period, the second symbol period, and the third symbol period may be an OFDM symbol period.

In some examples, the CUBS management component 1540 may include a CUBS generation component 1550, a CUBS portion selection component 1555, or a windowing and overlap-and-add component 1560. In some examples, the CUBS generation component 1550 may be used to generate the first CUBS or the second CUBS. In some examples, the CUBS generation component 1550 may generate the first CUBS as described with reference to FIG. 27 or 28. In some examples, each of the first CUBS and the second CUBS may have a duration of one symbol period and be generated with a normal IFFT.

In some examples, the CUBS portion selection component 1555 may be used to time-align the first CUBS with the first symbol period, or time-align the second CUBS with the second symbol period. The CUBS portion selection component 1555 may also be used to select the portions of the first CUBS or second CUBS that are transmitted during a preamble.

In some examples, and when the contention timing determination component 1545 determines that a contention is won before the threshold time before the next symbol boundary, the CUBS portion selection component 1555 may be used to transmit a beginning portion of the first CUBS during a fractional period of the first symbol period, and to transmit the second CUBS during the second symbol period.

In some examples, and when the contention timing determination component 1545 determines that a contention is won within the threshold time before the next symbol boundary, the CUBS portion selection component 1555 may be used to transmit the second CUBS during the second symbol period, and to make no transmission during the fractional period of the first symbol period.

In some examples, and when the contention timing determination component 1545 determines that a contention is won within the threshold time before the next symbol boundary, the CUBS portion selection component 1555 may be used to transmit the first CUBS across the fractional period of the first symbol period and a first portion of the second symbol period, and to transmit an ending portion of the time-aligned second CUBS during a second portion of the second symbol period.

In some examples, and when the contention timing determination component 1545 determines that a contention is won within the threshold time before the next symbol boundary, the CUBS portion selection component 1555 may be used to transmit the first CUBS across the fractional period of the first symbol period and a first portion of the second symbol period; to transmit a beginning portion of the first CUBS during a second portion of the second symbol period; and to transmit the second CUBS during the third symbol period.

In some examples, and regardless of whether the contention timing determination component 1545 determines that a contention is won within the threshold time before the next symbol boundary, the CUBS portion selection component 1555 may be used to transmit an ending portion of the time-aligned first CUBS during the fractional period of the first symbol period, and to transmit the second CUBS during the second symbol period.

In some examples, the windowing and overlap-and-add component 1560 may be used to perform a windowing and overlap-and-add operation at a transmission juncture of the at least portion of the first CUBS and the at least portion of the second CUBS. In some examples, the windowing and overlap-and-add component 1360 may be used to perform a windowing and overlap-and-add operation at a commencement of a transmission of the at least portion of the first CUBS.

In some examples, the CUBS transmitted using the CUBS management component 1540 may include a copy of a signal included in a transmission to be made over the unlicensed radio frequency spectrum band subsequent to a transmission of the at least portion of the first CUBS and the at least portion of the second CUBS. In some examples, the signal included in the transmission to be made over the unlicensed radio frequency spectrum band subsequent to the transmission of the at least portion of the first CUBS and the at least portion of the second CUBS may include a DM-RS. In some examples, the transmission to be made over the unlicensed radio frequency spectrum band subsequent to the transmission of the at least portion of the first CUBS and the at least portion of the second CUBS may include a PUSCH, a PUCCH, a PRACH, an SRS, an SR, or a combination thereof.

In some examples, the CUBS management component 1540 may be used to transmit the at least portion of the first CUBS and the at least portion of the second CUBS over the unlicensed radio frequency spectrum band using a same set of antenna ports and precoder used for a first transmission (e.g., a PUSCH, a PUCCH, a PRACH, an SRS, an SR, or a combination thereof) over the unlicensed radio frequency spectrum band subsequent to the transmission of the at least portion of the first CUBS and the at least portion of the second CUBS.

Figure 16:
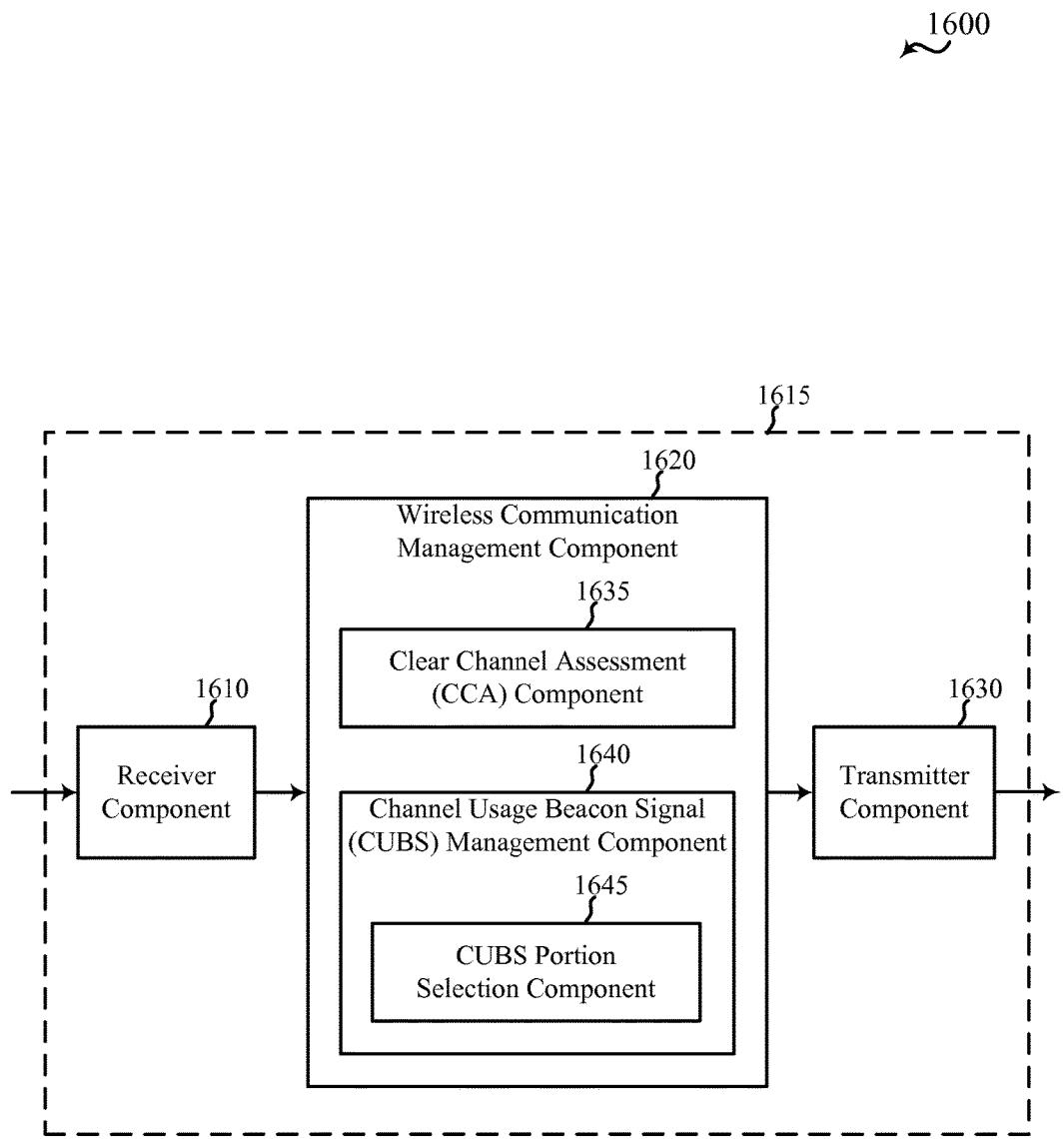
FIG. 16 shows a block diagram of an apparatus for use in wireless communication, in accordance with various aspects of the present disclosure.

FIG. 16 shows a block diagram 1600 of an apparatus 1615 for use in wireless communication, in accordance with various aspects of the present disclosure. The apparatus 1615 may be an example of aspects of one or more of the UEs 115, 215, 215-*a*, 215-*b*, or 215-*c* described with reference to FIG. 1 or 2, or aspects of the apparatus 1215, 1315, 1415, or 1515 described with reference to FIG. 12, 13, 14, or 15. The apparatus 1615 may also be or include a processor. The apparatus 1615 may include a receiver component 1610, a wireless communication management component 1620, or a transmitter component 1630. Each of these components may be in communication with each other.

The components of the apparatus 1615 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors.

In some examples, the receiver component 1610 may include at least one RF receiver, such as at least one RF receiver operable to receive transmissions over a licensed radio frequency spectrum band (e.g., a radio frequency spectrum band for which transmitting apparatuses may not contend for access because the radio frequency spectrum band is licensed to some users for various uses, such as a licensed radio frequency spectrum band usable for LTE/LTE-A communications) or an unlicensed radio frequency spectrum band (e.g., a radio frequency spectrum band for which transmitting apparatuses may need to contend for access because the radio frequency spectrum band is available for unlicensed use, such as Wi-Fi use). In some examples, the licensed radio frequency spectrum band or the unlicensed radio frequency spectrum band may be used for LTE/LTE-A communications, as described, for example, with reference to FIG. 1 or 2. The receiver component 1610 may be used to receive various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the transmitter component 1630 may include at least one RF transmitter, such as at least one RF transmitter operable to transmit over the licensed radio frequency spectrum band or the unlicensed radio frequency spectrum band. The transmitter component 1630 may be used to transmit various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the wireless communication management component 1620 may be used to manage one or more aspects of wireless communication for the apparatus 1615. In some examples, the wireless communication management component 1620 may include a CCA component 1635 or a CUBS management component 1640.

In some examples, the CCA component 1635 may contend for access to the unlicensed radio frequency spectrum band. In some examples, the CCA component 1635 may contend for access to the unlicensed radio frequency spectrum band by performing a UCCA, as described, for example, with reference to FIG. 3, 4, or 5. Upon winning a contention for access to the unlicensed radio frequency spectrum band, the CCA component 1635 may enable the CUBS management component 1640 to transmit a portion of a CUBS over the unlicensed radio frequency spectrum band.

In some examples, the CUBS management component 1640 may be used to transmit a portion of a CUBS over the unlicensed radio frequency spectrum band. In some examples, the CUBS management component 1640 may include a CUBS portion selection component 1645. In some examples, the CUBS portion selection component 1645 may be used to select the portion of the CUBS. The portion of the CUBS may be selected based at least in part on a timing of winning a contention for access to the unlicensed radio frequency spectrum band with reference to a next symbol period boundary.

In some examples, the CUBS management component 1640 may be used to transmit the portion of the CUBS in a number of frequency interlaces (e.g., one or more frequency interlaces) of the unlicensed radio frequency spectrum band. Each frequency interlace may include a plurality of contemporaneously transmitted resource blocks, with at least two of the contemporaneously transmitted resource blocks (or at least two sets of the contemporaneously transmitted resource blocks) being non-contiguous in the unlicensed radio frequency spectrum band. In some examples, the contemporaneously transmitted resource blocks may be uniformly spaced in the unlicensed radio frequency spectrum band. In other examples, the contemporaneously transmitted resource blocks may be non-uniformly spaced in the unlicensed radio frequency spectrum band.

In some examples, the CUBS management component 1640 may transmit the portion of the CUBS during a preamble including at least a fractional period of a first symbol period. In some examples, the preamble may also include one or more symbol periods following the fractional period of the first symbol period, such as a second symbol period following the first symbol period or a third symbol period following the second symbol period. In some examples, each of the first symbol period, the second symbol period, and the third symbol period may be an OFDM symbol period.

Figure 17:
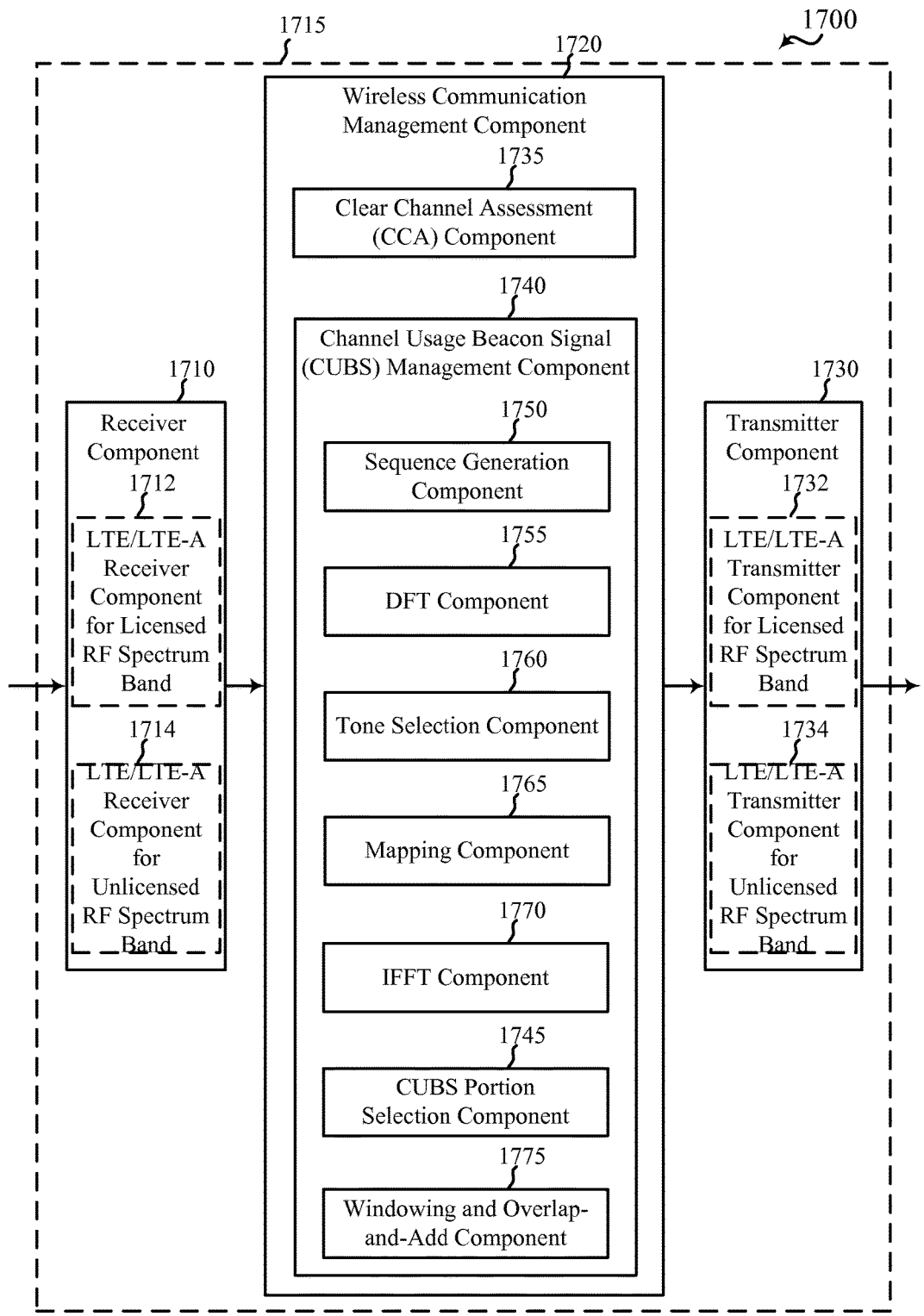
FIG. 17 shows a block diagram of an apparatus for use in wireless communication, in accordance with various aspects of the present disclosure.

FIG. 17 shows a block diagram 1700 of an apparatus 1715 for use in wireless communication, in accordance with various aspects of the present disclosure. The apparatus 1715 may be an example of aspects of one or more of the UEs 115, 215, 215-a, 215-b, or 215-c described with reference to FIG. 1 or 2, or aspects of the apparatus 1215,1315, 1415, 1515, or 1615 described with reference to FIG. 12, 13, 14, 15, or 16. The apparatus 1715 may also be or include a processor. The apparatus 1715 may include a receiver component 1710, a wireless communication management component 1720, or a transmitter component 1730. Each of these components may be in communication with each other.

The components of the apparatus 1715 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors.

In some examples, the receiver component 1710 may include at least one RF receiver, such as at least one RF receiver operable to receive transmissions over a licensed radio frequency spectrum band (e.g., a radio frequency spectrum band for which transmitting apparatuses may not contend for access because the radio frequency spectrum band is licensed to some users for various uses, such as a licensed radio frequency spectrum band usable for LTE/LTE-A communications) or an unlicensed radio frequency spectrum band (e.g., a radio frequency spectrum band for which transmitting apparatuses may need to contend for access because the radio frequency spectrum band is available for unlicensed use, such as Wi-Fi use). In some examples, the licensed radio frequency spectrum band or the unlicensed radio frequency spectrum band may be used for LTE/LTE-A communications, as described, for example, with reference to FIG. 1 or 2. The receiver component 1710 may in some cases include separate receivers for the licensed radio frequency spectrum band and the unlicensed radio frequency spectrum band. The separate receivers may, in some examples, take the form of an LTE/LTE-A receiver component for communicating over the licensed radio frequency spectrum band (e.g., LTE/LTE-A receiver component for licensed RF spectrum band 1712), and an LTE/LTE-A receiver component for communicating over the unlicensed radio frequency spectrum band (e.g., LTE/LTE-A receiver component for unlicensed RF spectrum band 1714). The receiver component 1710, including the LTE/LTE-A receiver component for licensed RF spectrum band 1712 or the LTE/LTE-A receiver component for unlicensed RF spectrum band 1714, may be used to receive various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the transmitter component 1730 may include at least one RF transmitter, such as at least one RF transmitter operable to transmit over the licensed radio frequency spectrum band or the unlicensed radio frequency spectrum band. The transmitter component 1730 may in some cases include separate transmitters for the licensed radio frequency spectrum band and the unlicensed radio frequency spectrum band. The separate transmitters may, in some examples, take the form of an LTE/LTE-A transmitter component for communicating over the licensed radio frequency spectrum band (e.g., LTE/LTE-A transmitter component for licensed RF spectrum band 1732), and an LTE/LTE-A transmitter component for communicating over the unlicensed radio frequency spectrum band (e.g., LTE/LTE-A transmitter component for unlicensed RF spectrum band 1734). The transmitter component 1730, including the LTE/LTE-A transmitter component for licensed RF spectrum band 1732 or the LTE/LTE-A transmitter component for unlicensed RF spectrum band 1734, may be used to transmit various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the wireless communication management component 1720 may be used to manage one or more aspects of wireless communication for the apparatus 1715. In some examples, the wireless communication management component 1720 may include a CCA component 1735 or a CUBS management component 1740.

In some examples, the CCA component 1735 may contend for access to the unlicensed radio frequency spectrum band. In some examples, the CCA component 1735 may contend for access to the unlicensed radio frequency spectrum band by performing a UCCA, as described, for example, with reference to FIG. 3, 4, or 5. Upon winning a contention for access to the unlicensed radio frequency spectrum band, the CCA component 1735 may enable the CUBS management component 1740 to transmit a portion of a CUBS over the unlicensed radio frequency spectrum band.

In some examples, the CUBS management component 1740 may be used to transmit a portion of a CUBS over the unlicensed radio frequency spectrum band. In some examples, the CUBS management component 1740 may include a sequence generation component 1750, a discrete Fourier transform (DFT) component 1755, a tone selection component 1760, a mapping component 1765, an IFFT component 1770, a CUBS portion selection component 1745, or a windowing and overlap-and-add component 1775.

In some examples, the sequence generation component 1750 may be used to generate a random sequence. In some examples, the random sequence may include a quadrature phase-shift keying (QPSK) sequence. In some examples, the random sequence may include a sequence in a set of Generalized Zadoff-Chu or chirp-like sequences. In some examples, the random sequence may include a polyphase sequence. In some examples, the random sequence may have a length of ten terms (e.g., one term for each transmit antenna port in a UE employing ten transmit antenna ports).

In some examples, the DFT component 1755 may be used to perform a DFT on the random sequence to generate a DFT output. In some examples, the DFT performed on the random sequence may have a length of ten. However, a length-10 DFT is not native to LTE/LTE-A. Therefore, in an alternative example, the operation(s) performed by the DFT component 1755 may include performing a DFT (e.g., a length-120 DFT) on the random sequence to generate an intermediate output, and down-sampling the intermediate output to generate the DFT output. In some examples, the output of sequence generation component 1750 or the DFT component 1755 may be pre-computed, stored, and used by the mapping component 1765.

In some examples, the tone selection component 1760 may be used to select a plurality of tones included in a transmission to be made over the unlicensed radio frequency spectrum band subsequent to a transmission of a portion of a CUBS. In some examples, the plurality of tones may have a uniform frequency spacing in the unlicensed radio frequency spectrum band. In some examples, the plurality of tones may have a non-uniform frequency spacing in the unlicensed radio frequency spectrum band. In some examples, the transmission to be made over the unlicensed radio frequency spectrum band subsequent to the transmission of the portion of the CUBS may include at least one of a PUSCH, a PUCCH, a PRACH, an SRS, or an SR. In some examples, a tone may be selected to maximize a distance (or distances), in the frequency spectrum, between the selected tone and a nearest tone (or tones) not allocated to the transmission to be made over the unlicensed radio frequency spectrum band subsequent to the transmission of the CUBS.

In some examples, the tone selection component 1760 may be used to select a tone in a middle of a resource block allocated to the transmission to be made over the unlicensed radio frequency spectrum band subsequent to the transmission of the portion of the CUBS. In some examples, the tone selection component 1760 may be used to select a tone in a middle of a contiguous resource block cluster allocated to the transmission to be made over the unlicensed radio frequency spectrum band subsequent to the transmission of the portion of the CUBS. Examples of tone selection are described in further detail with reference to FIG. 11.

In some examples, the mapping component 1765 may be used to map the DFT output generated by the DFT component 1755 to the plurality of tones selected by the tone selection component 1760.

In some examples, the IFFT component 1770 may be used to perform an IFFT on the plurality of tones to generate the CUBS.

In some examples, the CUBS portion selection component 1745 may be used to select the portion of the CUBS. The portion of the CUBS may be selected based at least in part on a timing of winning a contention for access to the unlicensed radio frequency spectrum band with reference to a next symbol period boundary. In some examples, the portion of the CUBS may include a beginning portion of the CUBS (e.g., the ending portion of the CUBS may be zeroed out (or punctured out) because the timing of winning the contention does not allow for transmission of the full CUBS prior to the next symbol period boundary). In some examples, the portion of the CUBS may include an ending portion of the CUBS (e.g., the beginning portion of the CUBS may be zeroed out (or punctured out) because the timing of winning the contention does not allow for transmission of the full CUBS prior to the next symbol period boundary). In some examples, the portion of the CUBS may be selected as described, for example, with reference to FIG. 8, 9, or 10.

In some examples, the windowing and overlap-and-add component 1775 may be used to perform a windowing and overlap-and-add operation for a commencement of transmission of the portion of the CUBS. For example, a windowing and overlap-and-add with zero may be applied to the commencement of transmission of the portion of the CUBS, thereby applying a power ramp to the portion of the CUBS. In some examples, the windowing and overlap-and-add component 1775 may be used to perform a windowing and overlap-and-add operation for a transmission juncture of the portion of the CUBS and a subsequently transmitted signal.

In some examples, the CUBS management component 1740 may be used to transmit the portion of the CUBS in a number of frequency interlaces (e.g., one or more frequency interlaces) of the unlicensed radio frequency spectrum band. Each frequency interlace may include a plurality of contemporaneously transmitted resource blocks, with at least two of the contemporaneously transmitted resource blocks (or at least two sets of the contemporaneously transmitted resource blocks) being non-contiguous in the unlicensed radio frequency spectrum band. In some examples, the contemporaneously transmitted resource blocks may be uniformly spaced in the unlicensed radio frequency spectrum band. In other examples, the contemporaneously transmitted resource blocks may be non-uniformly spaced in the unlicensed radio frequency spectrum band.

In some examples, the CUBS management component 1740 may transmit the portion of the CUBS during a preamble including at least a fractional period of a first symbol period. In some examples, the preamble may also include one or more symbol periods following the fractional period of the first symbol period, such as a second symbol period following the first symbol period or a third symbol period following the second symbol period. In some examples, each of the first symbol period, the second symbol period, and the third symbol period may be an OFDM symbol period.

Figure 18:
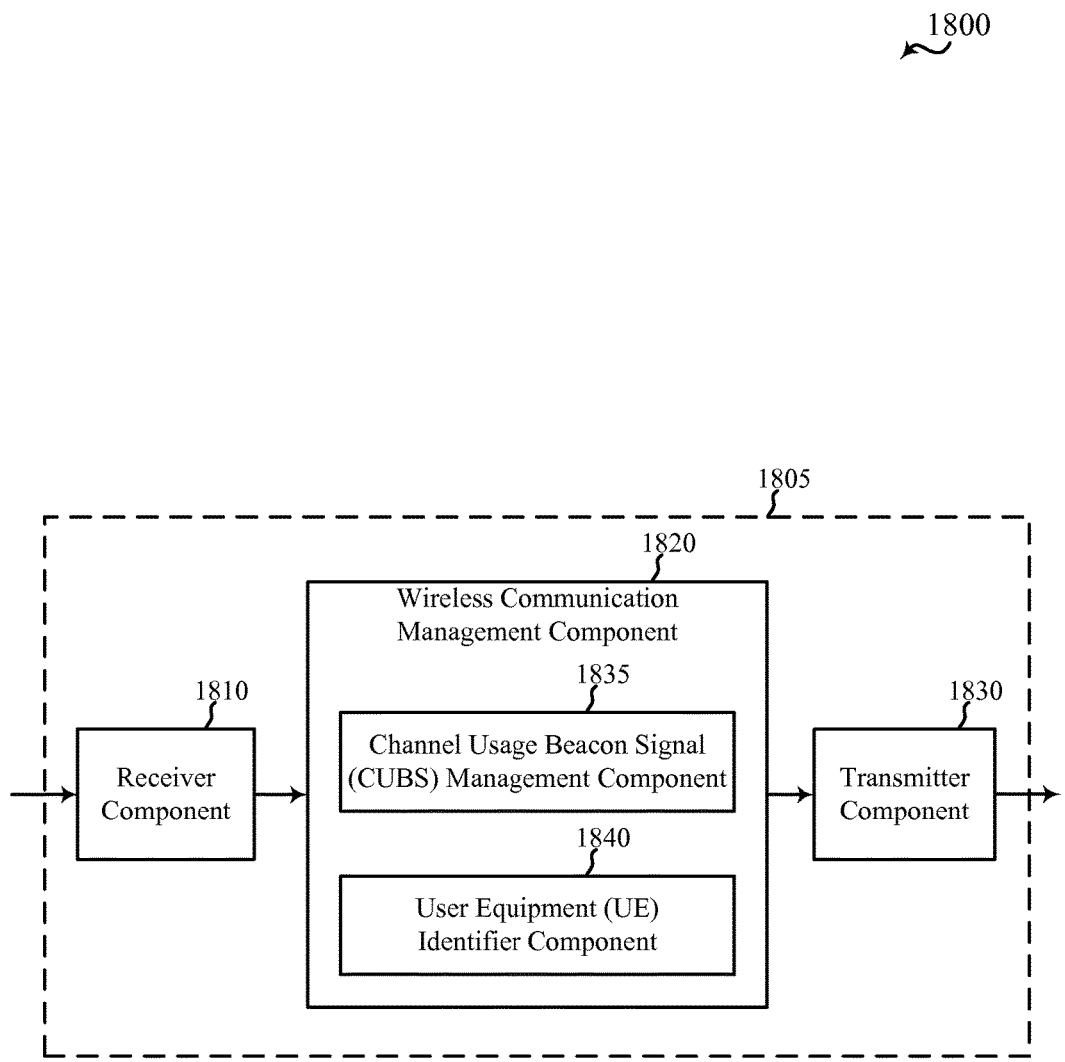
FIG. 18 shows a block diagram of an apparatus for use in wireless communication, in accordance with various aspects of the present disclosure.

FIG. 18 shows a block diagram 1800 of an apparatus 1805 for use in wireless communication, in accordance with various aspects of the present disclosure. The apparatus 1815 may be an example of aspects of one or more of the base stations 105, 205, or 205-*a* described with reference to FIG. 1 or 2. The apparatus 1805 may also be or include a processor. The apparatus 1805 may include a receiver component 1810, a wireless communication management component 1820, or a transmitter component 1830. Each of these components may be in communication with each other.

The components of the apparatus 1805 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors.

In some examples, the receiver component 1810 may include at least one RF receiver, such as at least one RF receiver operable to receive transmissions over a licensed radio frequency spectrum band (e.g., a radio frequency spectrum band for which transmitting apparatuses may not contend for access because the radio frequency spectrum band is licensed to some users for various uses, such as a licensed radio frequency spectrum band usable for LTE/LTE-A communications) or an unlicensed radio frequency spectrum band (e.g., a radio frequency spectrum band for which transmitting apparatuses may need to contend for access because the radio frequency spectrum band is available for unlicensed use, such as Wi-Fi use). In some examples, the licensed radio frequency spectrum band or the unlicensed radio frequency spectrum band may be used for LTE/LTE-A communications, as described, for example, with reference to FIG. 1 or 2. The receiver component 1810 may be used to receive various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the transmitter component 1830 may include at least one RF transmitter, such as at least one RF transmitter operable to transmit over the licensed radio frequency spectrum band or the unlicensed radio frequency spectrum band. The transmitter component 1830 may be used to transmit various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the wireless communication management component 1820 may be used to manage one or more aspects of wireless communication for the apparatus 1805. In some examples, the wireless communication management component 1820 may include a CUBS management component 1835 or a UE identifier component 1840.

In some examples, the CUBS management component 1835 may be used to receive CUBS from each of a number of UEs. Each CUBS may be received in one of a plurality of frequency interlaces of the unlicensed radio frequency spectrum band. In some examples, a structure of a first set of CUBS received from a first UE may differ from a structure of a second set of CUBS received from a second UE, as described, for example, with reference to FIG. 8, 9, or 10.

In some examples, the UE identifier component 1840 may be used to determine, from the received CUBS, an identifier of each of the number of UEs. In some examples, a portion of a first CUBS and a second CUBS may be received from a first UE, and an identifier of the first UE may be determined from the second CUBS.

Figure 19:
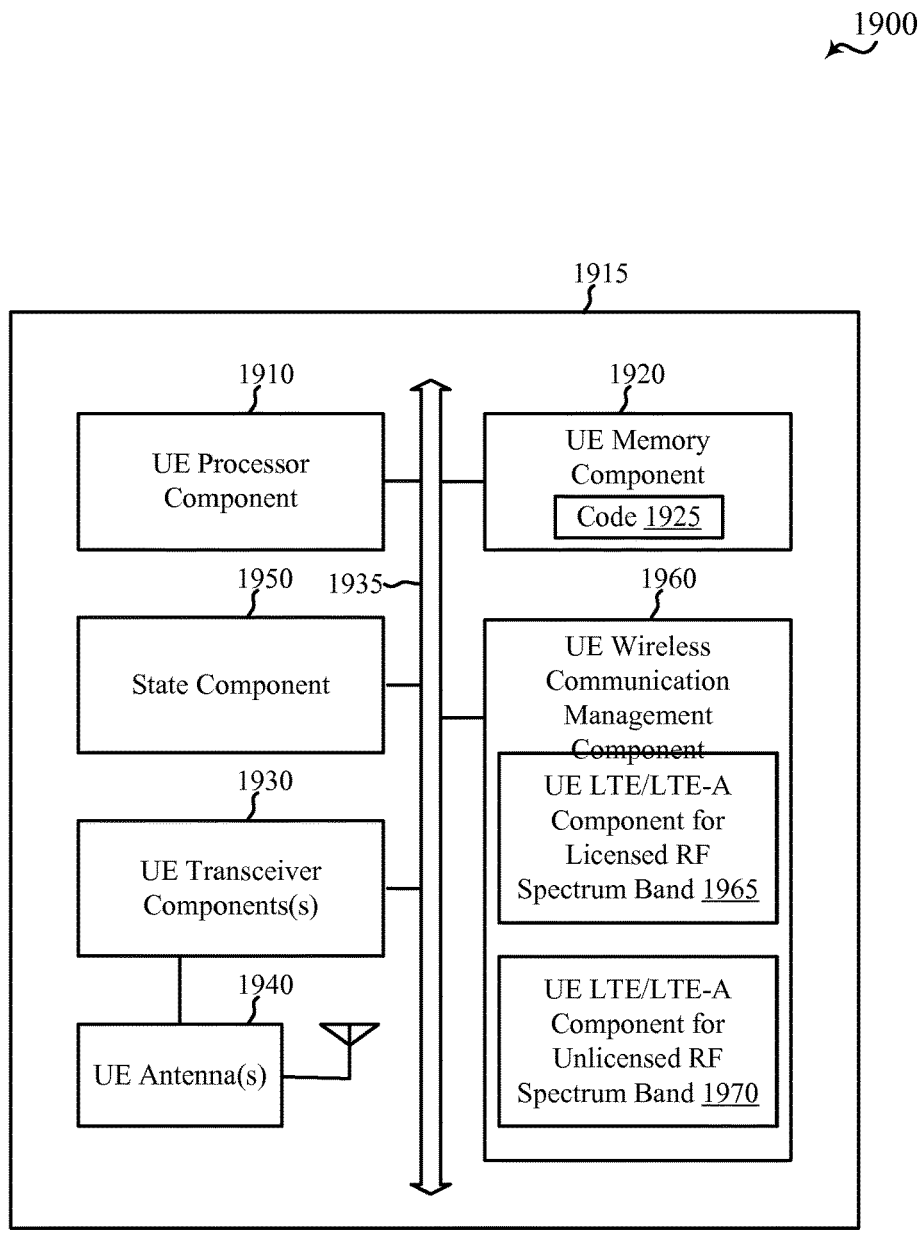
FIG. 19 shows a block diagram of a UE for use in wireless communication, in accordance with various aspects of the present disclosure.

FIG. 19 shows a block diagram 1900 of a UE 1915 for use in wireless communication, in accordance with various aspects of the present disclosure. The UE 1915 may have various examples and may be included or be part of a personal computer (e.g., a laptop computer, a netbook computer, a tablet computer, etc.), a cellular telephone, a PDA, a digital video recorder (DVR), an internet appliance, a gaming console, an e-reader, etc. The UE 1915 may, in some examples, have an internal power supply (not shown), such as a small battery, to facilitate mobile operation. In some examples, the UE 1915 may be an example of aspects of one or more of the UE 115, 215, 215-*a*, 215-*b*, or 215-*c* described with reference to FIG. 1 or 2, or aspects of one or more of the apparatuses 1215, 1315, 1415, 1515, 1615, or 1715 described with reference to FIG. 12, 13, 14, 15, 16, or 17. The UE 1915 may be configured to implement at least some of the UE or apparatus features and functions described with reference to FIG. 1, 2, 3, 4, 5, 6, 7, 8, 9, 10, 11, 12, 13, 14, 15, 16, or 17.

The UE 1915 may include a UE processor component 1910, a UE memory component 1920, at least one UE transceiver component (represented by UE transceiver component(s) 1930), at least one UE antenna (represented by UE antenna(s) 1940), or a UE wireless communication management component 1960. Each of these components may be in communication with each other, directly or indirectly, over one or more buses 1935.

The UE memory component 1920 may include random access memory (RAM) or read-only memory (ROM). The UE memory component 1920 may store computer-readable, computer-executable code 1925 containing instructions that are configured to, when executed, cause the UE processor component 1910 to perform various functions described herein related to wireless communication, including the transmission of CUBS. Alternatively, the code 1925 may not be directly executable by the UE processor component 1910 but be configured to cause the UE 1915 (e.g., when compiled and executed) to perform various of the functions described herein.

The UE processor component 1910 may include an intelligent hardware device, e.g., a central processing unit (CPU), a microcontroller, an ASIC, etc. The UE processor component 1910 may process information received through the UE transceiver component(s) 1930 or information to be sent to the UE transceiver component(s) 1930 for transmission through the UE antenna(s) 1940. The UE processor component 1910 may handle, alone or in connection with the UE wireless communication management component 1960, various aspects of communicating over (or managing communications over) a licensed radio frequency spectrum band (e.g., a radio frequency spectrum band for which apparatuses do not contend for access because the radio frequency spectrum band is licensed to some users for various uses, such as a licensed radio frequency spectrum band usable for LTE/LTE-A communications) or an unlicensed radio frequency spectrum band (e.g., a radio frequency spectrum band for which apparatuses may need to contend for access because the radio frequency spectrum band is available for unlicensed use, such as Wi-Fi use).

The UE transceiver component(s) 1930 may include a modem configured to modulate packets and provide the modulated packets to the UE antenna(s) 1940 for transmission, and to demodulate packets received from the UE antenna(s) 1940. The UE transceiver component(s) 1930 may, in some examples, be implemented as one or more UE transmitter components and one or more separate UE receiver components. The UE transceiver component(s) 1930 may support communications in the licensed radio frequency spectrum band or the unlicensed radio frequency spectrum band. The UE transceiver component(s) 1930 may be configured to communicate bi-directionally, via the UE antenna(s) 1940, with one or more of the base stations 105, 205, or 205-a described with reference to FIG. 1 or 2, or the apparatus 1805 described with reference to FIG. 18. While the UE 1915 may include a single UE antenna, there may be examples in which the UE 1915 may include multiple UE antennas 1940.

The UE state component 1950 may be used, for example, to manage transitions of the UE 1915 between an RRC idle state and an RRC connected state, and may be in communication with other components of the UE 1915, directly or indirectly, over the one or more buses 1935. The UE state component 1950, or portions of it, may include a processor, or some or all of the functions of the UE state component 1950 may be performed by the UE processor component 1910 or in connection with the UE processor component 1910.

The UE wireless communication management component 1960 may be configured to perform or control some or all of the UE or apparatus features or functions described with reference to FIG. 1, 2, 3, 4, 5, 6, 7, 8, 9, 10, 11, 12, 13, 14, 15, 16, or 17 related to wireless communication over a licensed radio frequency spectrum band or an unlicensed radio frequency spectrum band. For example, the UE wireless communication management component 1960 may be configured to support a supplemental downlink mode, a carrier aggregation mode, or a standalone mode using the licensed radio frequency spectrum band or the unlicensed radio frequency spectrum band. The UE wireless communication management component 1960 may include a UE LTE/LTE-A component for licensed RF spectrum band 1965 configured to handle LTE/LTE-A communications in the licensed radio frequency spectrum band, and a UE LTE/LTE-A component for unlicensed RF spectrum band 1970 configured to handle LTE/LTE-A communications in the unlicensed radio frequency spectrum band. The UE wireless communication management component 1960, or portions of it, may include a processor, or some or all of the functions of the UE wireless communication management component 1960 may be performed by the UE processor component 1910 or in connection with the UE processor component 1910. In some examples, the UE wireless communication management component 1960 may be an example of the wireless communication management component 1220, 1320, 1420, 1520, 1620, or 1720 described with reference to FIG. 12, 13, 14, 15, 16, or 17.

Figure 20:
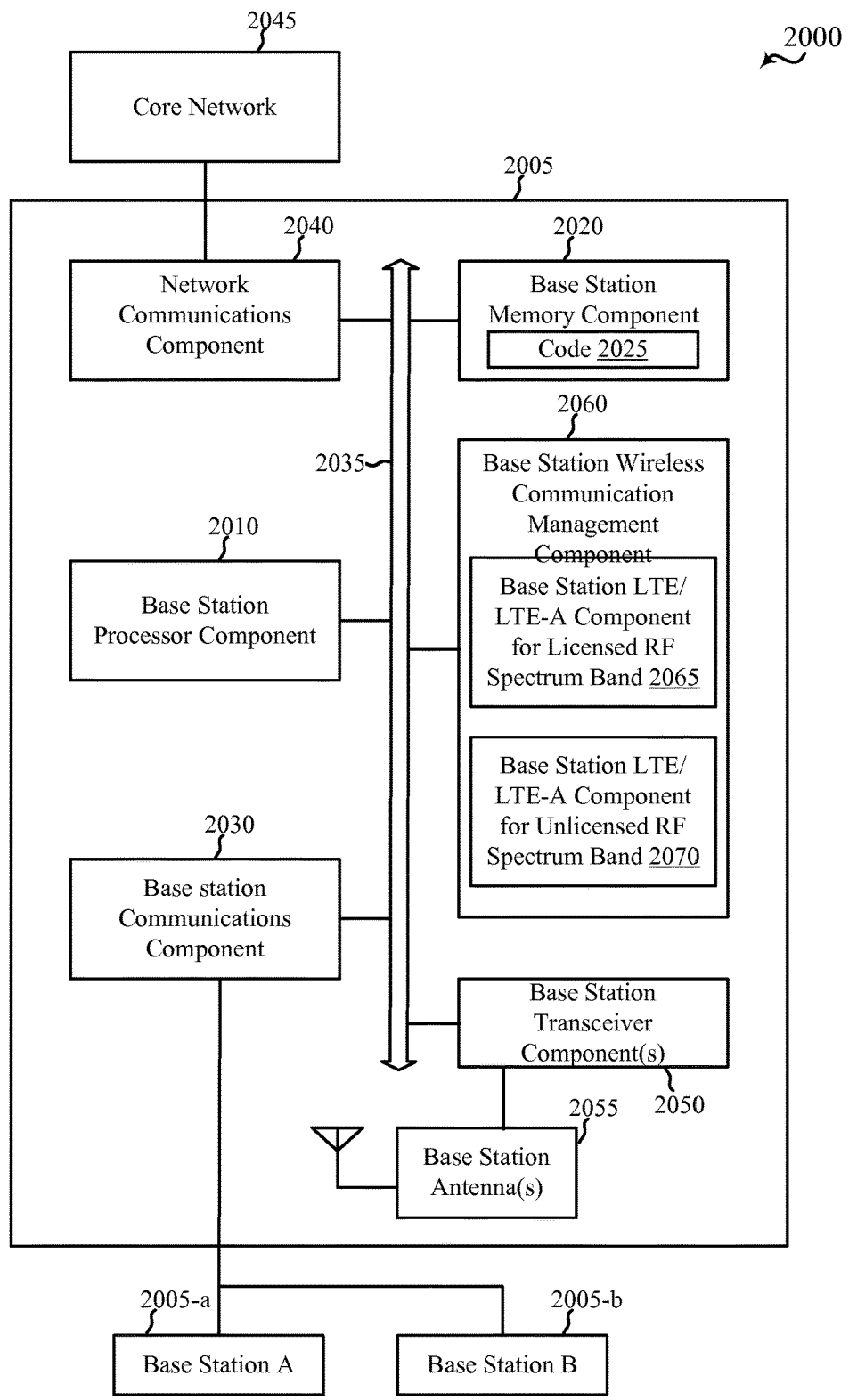
FIG. 20 shows a block diagram of a base station (e.g., a base station forming part or all of an eNB) for use in wireless communication, in accordance with various aspects of the present disclosure.

FIG. 20 shows a block diagram 2000 of a base station 2005 (e.g., a base station forming part or all of an eNB) for use in wireless communication, in accordance with various aspects of the present disclosure. In some examples, the base station 2005 may be an example of one or more aspects of the base station 105, 205, or 205-a described with reference to FIG. 1 or 2, or aspects of the apparatus 1805 described with reference to FIG. 18. The base station 2005 may be configured to implement or facilitate at least some of the base station features and functions described with reference to FIG. 1, 2, 3, 6, 7, 8, 9, 10, 11, or 17.

The base station 2005 may include a base station processor component 2010, a base station memory component 2020, at least one base station transceiver component (represented by base station transceiver component(s) 2050), at least one base station antenna (represented by base station antenna(s) 2055), or a base station wireless communication management component 2060. The base station 2005 may also include one or more of a base station communications component 2030 or a network communications component 2040. Each of these components may be in communication with each other, directly or indirectly, over one or more buses 2035.

The base station memory component 2020 may include RAM or ROM. The base station memory component 2020 may store computer-readable, computer-executable code 2025 containing instructions that are configured to, when executed, cause the base station processor component 2010 to perform various functions described herein related to wireless communication, including the reception of CUBS. Alternatively, the code 2025 may not be directly executable by the base station processor component 2010 but be configured to cause the base station 2005 (e.g., when compiled and executed) to perform various of the functions described herein.

The base station processor component 2010 may include an intelligent hardware device, e.g., a CPU, a microcontroller, an ASIC, etc. The base station processor component 2010 may process information received through the base station transceiver component(s) 2050, the base station communications component 2030, or the network communications component 2040. The base station processor component 2010 may also process information to be sent to the transceiver component(s) 2050 for transmission through the antenna(s) 2055, to the base station communications component 2030, for transmission to one or more other base stations 2005-a and 2005-b, or to the network communications component 2040 for transmission to a core network 2045, which may be an example of one or more aspects of the core network 130 described with reference to FIG. 1. The base station processor component 2010 may handle, alone or in connection with the base station wireless communication management component 2060, various aspects of communicating over (or managing communications over) a licensed radio frequency spectrum band (e.g., a radio frequency spectrum band for which apparatuses do not contend for access because the radio frequency spectrum band is licensed to some users for various uses, such as a licensed radio frequency spectrum band usable for LTE/LTE-A communications) or an unlicensed radio frequency spectrum band (e.g., a radio frequency spectrum band for which apparatuses may need to contend for access because the radio frequency spectrum band is available for unlicensed use, such as Wi-Fi use).

The base station transceiver component(s) 2050 may include a modem configured to modulate packets and provide the modulated packets to the base station antenna(s) 2055 for transmission, and to demodulate packets received from the base station antenna(s) 2055. The base station transceiver component(s) 2050 may, in some examples, be implemented as one or more base station transmitter components and one or more separate base station receiver components. The base station transceiver component(s) 2050 may support communications in the licensed radio frequency spectrum band or the unlicensed radio frequency spectrum band. The base station transceiver component(s) 2050 may be configured to communicate bi-directionally, via the antenna(s) 2055, with one or more UEs or apparatuses, such as one or more of the UEs 115, 215, 215-*a*, 215-*b*, 215-*c*, or 1915 described with reference to FIG. 1, 2, or 19, or one or more of the apparatuses 1215, 1315, 1415, 1515, 1615, or 1715 described with reference to FIG. 12, 13, 14, 15, 16, or 17. The base station 2005 may, for example, include multiple base station antennas 2055 (e.g., an antenna array). The base station 2005 may communicate with the core network 2045 through the network communications component 2040. The base station 2005 may also communicate with other base stations, such as the base stations 2005-*a* and 2005-*b*, using the base station communications component 2030.

The base station wireless communication management component 2060 may be configured to perform or control some or all of the features or functions described with reference to FIG. 1, 2, 3, 6, 7, 8, 9, 10, 11, or 17 related to wireless communication over a licensed radio frequency spectrum band or an unlicensed radio frequency spectrum band. For example, the base station wireless communication management component 2060 may be configured to support a supplemental downlink mode, a carrier aggregation mode, or a standalone mode using the licensed radio frequency spectrum band or the unlicensed radio frequency spectrum band. The base station wireless communication management component 2060 may include a base station LTE/LTE-A component for licensed RF spectrum band 2065 configured to handle LTE/LTE-A communications in the licensed radio frequency spectrum band, and a base station LTE/LTE-A component for unlicensed RF spectrum band 2070 configured to handle LTE/LTE-A communications in the unlicensed radio frequency spectrum band. The base station wireless communication management component 2060, or portions of it, may include a processor, or some or all of the functions of the base station wireless communication management component 2060 may be performed by the base station processor component 2010 or in connection with the base station processor component 2010. In some examples, the base station wireless communication management component 2060 may be an example of the wireless communication management component 1820 described with reference to FIG. 18.

Figure 21:
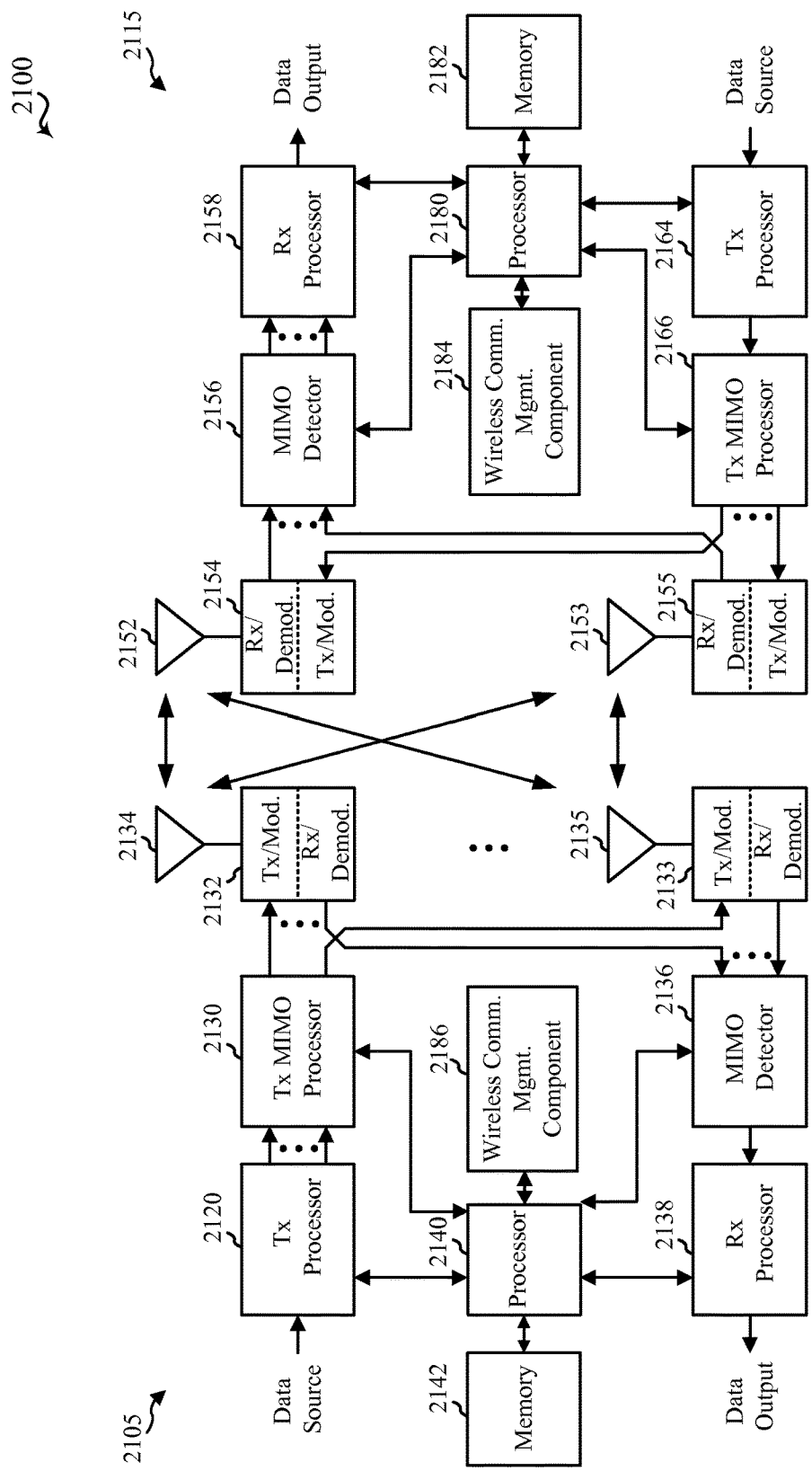
FIG. 21 is a block diagram of a multiple input/multiple output (MIMO) communication system including a base station and a UE, in accordance with various aspects of the present disclosure.

FIG. 21 is a block diagram of a multiple input/multiple output (MIMO) communication system 2100 including a base station 2105 and a UE 2115, in accordance with various aspects of the present disclosure. The MIMO communication system 2100 may illustrate aspects of the wireless communication system 100 or 200 described with reference to FIG. 1 or 2. The base station 2105 may be an example of aspects of the base station 105, 205, 205-*a*, or 2005 described with reference to FIG. 1, 2, or 20, or aspects of the apparatus 1805 described with reference to FIG. 18. The base station 2105 may be equipped with antennas 2134 through 2135, and the UE 2115 may be equipped with antennas 2152 through 2153. In the MIMO communication system 2100, the base station 2105 may be able to send data over multiple communication links at the same time. Each communication link may be called a "layer" and the "rank" of the communication link may indicate the number of layers used for communication. For example, in a 2×2 MIMO communications system where base station 2105 transmits two "layers," the rank of the communication link between the base station 2105 and the UE 2115 is two.

At the base station 2105, a transmit processor 2120 may receive data from a data source. The transmit processor 2120 may process the data. The transmit processor 2120 may also generate control symbols or reference symbols. A transmit (TX) MIMO processor 2130 may perform spatial processing (e.g., precoding) on data symbols, control symbols, or reference symbols, if applicable, and may provide output symbol streams to the transmit modulators 2132 through 2133. Each modulator 2132 through 2133 may process a respective output symbol stream (e.g., for OFDM, etc.) to obtain an output sample stream. Each modulator 2132 through 2133 may further process (e.g., convert to analog, amplify, filter, and upconvert) the output sample stream to obtain a DL signal. In one example, DL signals from modulators 2132 through 2133 may be transmitted via the antennas 2134 through 2135, respectively.

The UE 2115 may be an example of aspects of the UE 115, 215, 215-*a*, 215-*b*, 215-*c*, or 1915 described with reference to FIG. 1, 2, or 19, or aspects of the apparatus 1215, 1315, 1415, 1515, 1615, or 1715 described with reference to FIG. 12, 13, 14, 15, 16, or 17. At the UE 2115, the UE antennas 2152 through 2153 may receive the DL signals from the base station 2105 and may provide the received signals to the UE demodulators 2154 through 2155, respectively. Each UE demodulator 2154 through 2155 may condition (e.g., filter, amplify, downconvert, and digitize) a respective received signal to obtain input samples. Each UE demodulator 2154 through 2155 may further process the input samples (e.g., for OFDM, etc.) to obtain received symbols. A MIMO detector 2156 may obtain received symbols from all the UE demodulators 2154 through 2155, perform MIMO detection on the received symbols, if applicable, and provide detected symbols. A receive processor 2158 may process (e.g., demodulate, deinterleave, and decode) the detected symbols, providing decoded data for the UE 2115 to a data output, and provide decoded control information to a processor 2180, or memory 2182.

The processor 2180 may in some cases execute stored instructions to instantiate a wireless communication management component 2184. The wireless communication management component 2184 may be an example of aspects of the wireless communication management component 1220, 1320, 1420, 1520, 1620, 1720, or 1960 described with reference to FIG. 12, 13, 14, 15, 16, 17, or 19.

On the uplink (UL), at the UE 2115, a transmit processor 2164 may receive and process data from a data source. The transmit processor 2164 may also generate reference symbols for a reference signal. The symbols from the transmit processor 2164 may be precoded by a transmit MIMO processor 2166 if applicable, further processed by the modulators 2154 through 2155 (e.g., for SC-FDMA, etc.), and be transmitted to the base station 2105 in accordance with the transmission parameters received from the base station

2105. At the base station 2105, the UL signals from the UE 2115 may be received by the antennas 2134 through 2135, processed by the base station demodulators 2132 through 2133, detected by a MIMO detector 2136 if applicable, and further processed by a receive processor 2138. The receive processor 2138 may provide decoded data to a data output and to the processor 2140 or memory 2142.

The processor 2140 may in some cases execute stored instructions to instantiate a wireless communication management component 2186. The wireless communication management component 2186 may be an example of aspects of the wireless communication management component 1820 or 2060 described with reference to FIG. 18 or 20.

The components of the UE 2115 may, individually or collectively, be implemented with one or more ASICs adapted to perform some or all of the applicable functions in hardware. Each of the noted components may be a means for performing one or more functions related to operation of the MIMO communication system 2100. Similarly, the components of the base station 2105 may, individually or collectively, be implemented with one or more ASICs adapted to perform some or all of the applicable functions in hardware. Each of the noted components may be a means for performing one or more functions related to operation of the MIMO communication system 2100.

Figure 22:
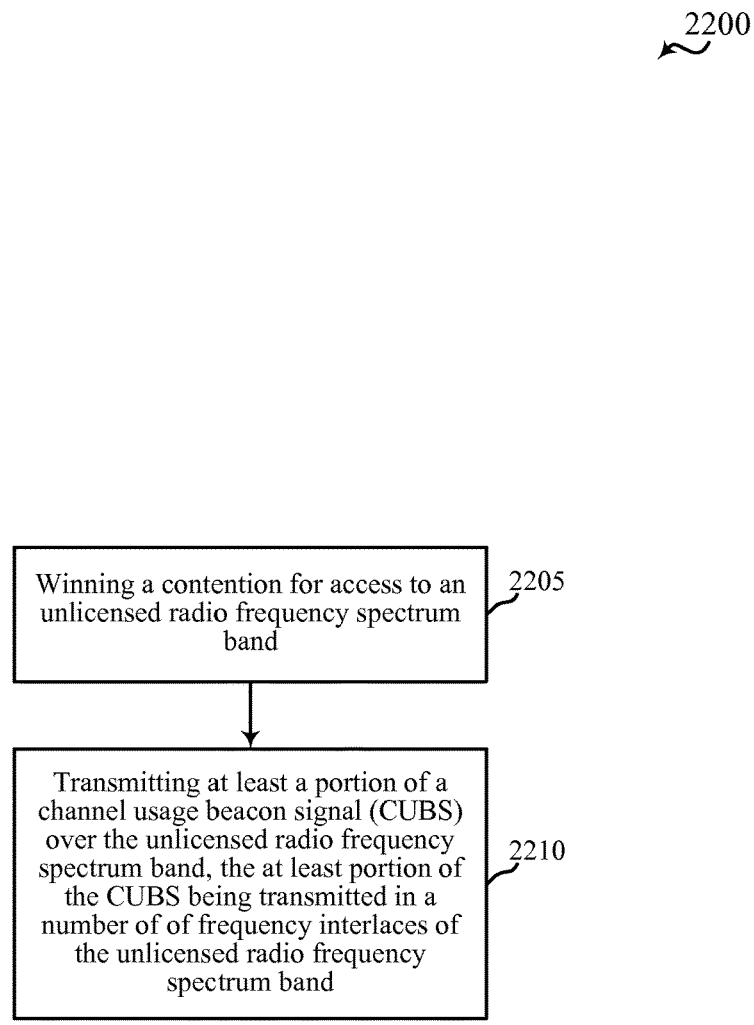
FIG. 22 is a flow chart illustrating an example of a method for wireless communication, in accordance with various aspects of the present disclosure.

FIG. 22 is a flow chart illustrating an example of a method 2200 for wireless communication, in accordance with various aspects of the present disclosure. For clarity, the method 2200 is described below with reference to aspects of one or more of the UEs 115, 215, 215-*a*, 215-*b*, 215-*c*, 1915, or 2115 described with reference to FIG. 1, 2, 19, or 21, or aspects of one or more of the apparatuses 1215, 1315, 1415, 1515, 1615, or 1715 described with reference to FIG. 12, 13, 14, 15, 16, or 17. In some examples, a UE or apparatus may execute one or more sets of codes to control the functional elements of the UE or apparatus to perform the functions described below. Additionally or alternatively, the UE or apparatus may perform one or more of the functions described below using special-purpose hardware.

At block 2205, the method 2200 may include winning a contention for access to an unlicensed radio frequency spectrum band. The unlicensed radio frequency spectrum band may include a radio frequency spectrum band for which transmitting apparatuses may need to contend for access because the radio frequency spectrum band is available for unlicensed use, such as Wi-Fi use. The operation(s) at block 2205 may be performed using the wireless communication management component 1220, 1320, 1420, 1520, 1620, 1720, 1960, or 2184 described with reference to FIG. 12, 13, 14, 15, 16, 17, 19, or 21, or the CCA component 1235, 1335, 1435, 1535, 1635, or 1735 described with reference to FIG. 12, 13, 14, 15, 16, or 17.

At block 2210, the method 2200 may include transmitting at least a portion of a CUBS over the unlicensed radio frequency spectrum band. The at least portion of the CUBS may be transmitted in a number of frequency interlaces (e.g., one or more frequency interlaces) of the unlicensed radio frequency spectrum band. Each frequency interlace may include a plurality of contemporaneously transmitted resource blocks, with at least two of the contemporaneously transmitted resource blocks (or at least two sets of the contemporaneously transmitted resource blocks) being non-contiguous in the unlicensed radio frequency spectrum band. In some examples, the contemporaneously transmitted resource blocks may be uniformly spaced in the unlicensed radio frequency spectrum band. In other examples, the contemporaneously transmitted resource blocks may be non-uniformly spaced in the unlicensed radio frequency spectrum band. In some examples, the at least portion of the CUBS may include at least a portion of a first CUBS and at least a portion of a second CUBS. The operation(s) at block 2210 may be performed using the wireless communication management component 1220, 1320, 1420, 1520, 1620, 1720, 1960, or 2184 described with reference to FIG. 12, 13, 14, 15, 16, 17, 19, or 21, or the CUBS management component 1240, 1340, 1440, 1540, 1640, or 1740 described with reference to FIG. 12, 13, 14, 15, 16, or 17.

In some examples of the method 2200, the CUBS may include a copy of a signal included in a transmission to be made over the unlicensed radio frequency spectrum band subsequent to a transmission of the at least portion of the CUBS. In some examples, the signal included in the transmission to be made over the unlicensed radio frequency spectrum band subsequent to the transmission of the at least portion of the CUBS may include a DM-RS. In some examples, the transmission to be made over the unlicensed radio frequency spectrum band subsequent to the transmission of the at least portion of the CUBS may include a PUSCH, a PUCCH, a PRACH, an SRS, an SR, or a combination thereof.

Thus, the method 2200 may provide for wireless communication. It should be noted that the method 2200 is just one implementation and that the operations of the method 2200 may be rearranged or otherwise modified such that other implementations are possible.

Figure 23:
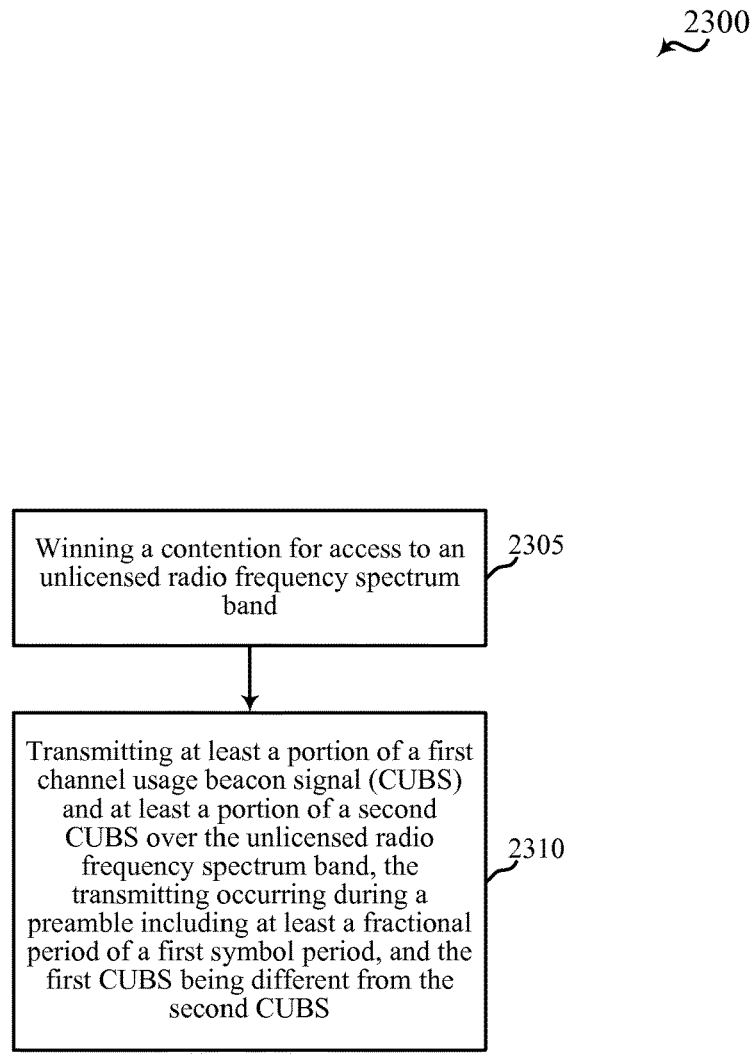
FIG. 23 is a flow chart illustrating an example of a method for wireless communication, in accordance with various aspects of the present disclosure.

FIG. 23 is a flow chart illustrating an example of a method 2300 for wireless communication, in accordance with various aspects of the present disclosure. For clarity, the method 2300 is described below with reference to aspects of one or more of the UEs 115, 215, 215-*a*, 215-*b*, 215-*c*, 1915, or 2115 described with reference to FIG. 1, 2, 19, or 21, or aspects of one or more of the apparatuses 1215, 1315, 1415, 1515, 1615, or 1715 described with reference to FIG. 12, 13, 14, 15, 16, or 17. In some examples, a UE or apparatus may execute one or more sets of codes to control the functional elements of the UE or apparatus to perform the functions described below. Additionally or alternatively, the UE or apparatus may perform one or more of the functions described below using special-purpose hardware.

At block 2305, the method 2300 may include winning a contention for access to an unlicensed radio frequency spectrum band. The unlicensed radio frequency spectrum band may include a radio frequency spectrum band for which transmitting apparatuses may need to contend for access because the radio frequency spectrum band is available for unlicensed use, such as Wi-Fi use. The operation(s) at block 2305 may be performed using the wireless communication management component 1220, 1320, 1420, 1520, 1620, 1720, 1960, or 2184 described with reference to FIG. 12, 13, 14, 15, 16, 17, 19, or 21, or the CCA component 1235, 1335, 1435, 1535, 1635, or 1735 described with reference to FIG. 12, 13, 14, 15, 16, or 17.

At block 2310, the method 2300 may include transmitting at least a portion of a first CUBS and at least a portion of a second CUBS over the unlicensed radio frequency spectrum band, with the first CUBS being different from the second CUBS. The transmitting may occur during a preamble including at least a fractional period of a first symbol period. The at least portion of the first CUBS and at least portion of the second CUBS may be transmitted in a number of frequency interlaces (e.g., one or more frequency interlaces) of the unlicensed radio frequency spectrum band. Each frequency interlace may include a plurality of contemporaneously transmitted resource blocks, with at least two of the contemporaneously transmitted resource blocks (or at least two sets of the contemporaneously transmitted resource blocks) being non-contiguous in the unlicensed radio frequency spectrum band. In some examples, the contemporaneously transmitted resource blocks may be uniformly spaced in the unlicensed radio frequency spectrum band. In other examples, the contemporaneously transmitted resource blocks may be non-uniformly spaced in the unlicensed radio frequency spectrum band. The operation(s) at block 2310 may be performed using the wireless communication management component 1220, 1320, 1420, 1520, 1620, 1720, 1960, or 2184 described with reference to FIG. 12, 13, 14, 15, 16, 17, 19, or 21, or the CUBS management component 1240, 1340, 1440, 1540, 1640, or 1740 described with reference to FIG. 12, 13, 14, 15, 16, or 17.

In some examples of the method 2300, the first symbol period may include a plurality of sub-periods. In these examples, the transmitting performed at block 2310 may include transmitting an instance of the first CUBS in each of a number of full sub-periods that follow the winning the contention for access to the unlicensed radio frequency spectrum band, as described, for example, with reference to FIG. 8. In some examples, the first CUBS may include a periodic zero crossing that provides smoothness in the time domain when the instance of the first CUBS is abutted to another instance of the first CUBS or the second CUBS. The operation(s) described in this paragraph may be performed using the wireless communication management component 1220, 1320, 1420, 1520, 1620, 1720, 1960, or 2184 described with reference to FIG. 12, 13, 14, 15, 16, 17, 19, or 21, the CUBS management component 1340, 1440, 1540, 1640, or 1740 described with reference to FIG. 13, 14, 15, 16, or 17, or the symbol sub-period cubs management component 1345 described with reference to FIG. 13.

In some examples of the method 2300, the preamble may include one or more symbol periods following the first symbol period, such as a second symbol period following the first symbol period or a third symbol period following the second symbol period. In some examples, each of the first symbol period, the second symbol period, and the third symbol period may be an OFDM symbol period.

In some examples, the method 2300 may include performing a windowing and overlap-and-add operation at a transmission juncture of the at least portion of the first CUBS and the at least portion of the second CUBS. In some examples, the method 2300 may include performing a windowing and overlap-and-add operation at a commencement of a transmission of the at least portion of the first CUBS. The operation(s) described in this paragraph may be performed using the wireless communication management component 1220, 1320, 1420, 1520, 1620, 1720, 1960, or 2184 described with reference to FIG. 12, 13, 14, 15, 16, 17, 19, or 21, the CUBS management component 1340, 1440, 1540, 1640, or 1740 described with reference to FIG. 13, 14, 15, 16, or 17, or the windowing and overlap-and-add component 1360, 1560, or 1775 described with reference to FIG. 13, 15, or 17.

In some examples of the method 2300, each of the first CUBS and the second CUBS may have a duration of one symbol period and be generated with a normal IFFT. In some examples of the method 2300, the second CUBS may include a copy of a signal included in a transmission to be made over the unlicensed radio frequency spectrum band subsequent to a transmission of the at least portion of the first CUBS and the at least portion of the second CUBS. In some examples, the signal included in the transmission to be made over the unlicensed radio frequency spectrum band subsequent to the transmission of the at least portion of the first CUBS and the at least portion of the second CUBS may include a DM-RS. In some examples, the transmission to be made over the unlicensed radio frequency spectrum band subsequent to the transmission of the at least portion of the first CUBS and the at least portion of the second CUBS may include a PUSCH, a PUCCH, a PRACH, an SRS, an SR, or a combination thereof.

In some examples of the method 2300, the at least portion of the first CUBS and the at least portion of the second CUBS may be transmitted over the unlicensed radio frequency spectrum band using a same set of antenna ports and precoder used for a first transmission (e.g., a PUSCH, a PUCCH, a PRACH, an SRS, an SR, or a combination thereof) over the unlicensed radio frequency spectrum band subsequent to the transmission of the at least portion of the first CUBS and the at least portion of the second CUBS.

Thus, the method 2300 may provide for wireless communication. It should be noted that the method 2300 is just one implementation and that the operations of the method 2300 may be rearranged or otherwise modified such that other implementations are possible.

Figure 24:
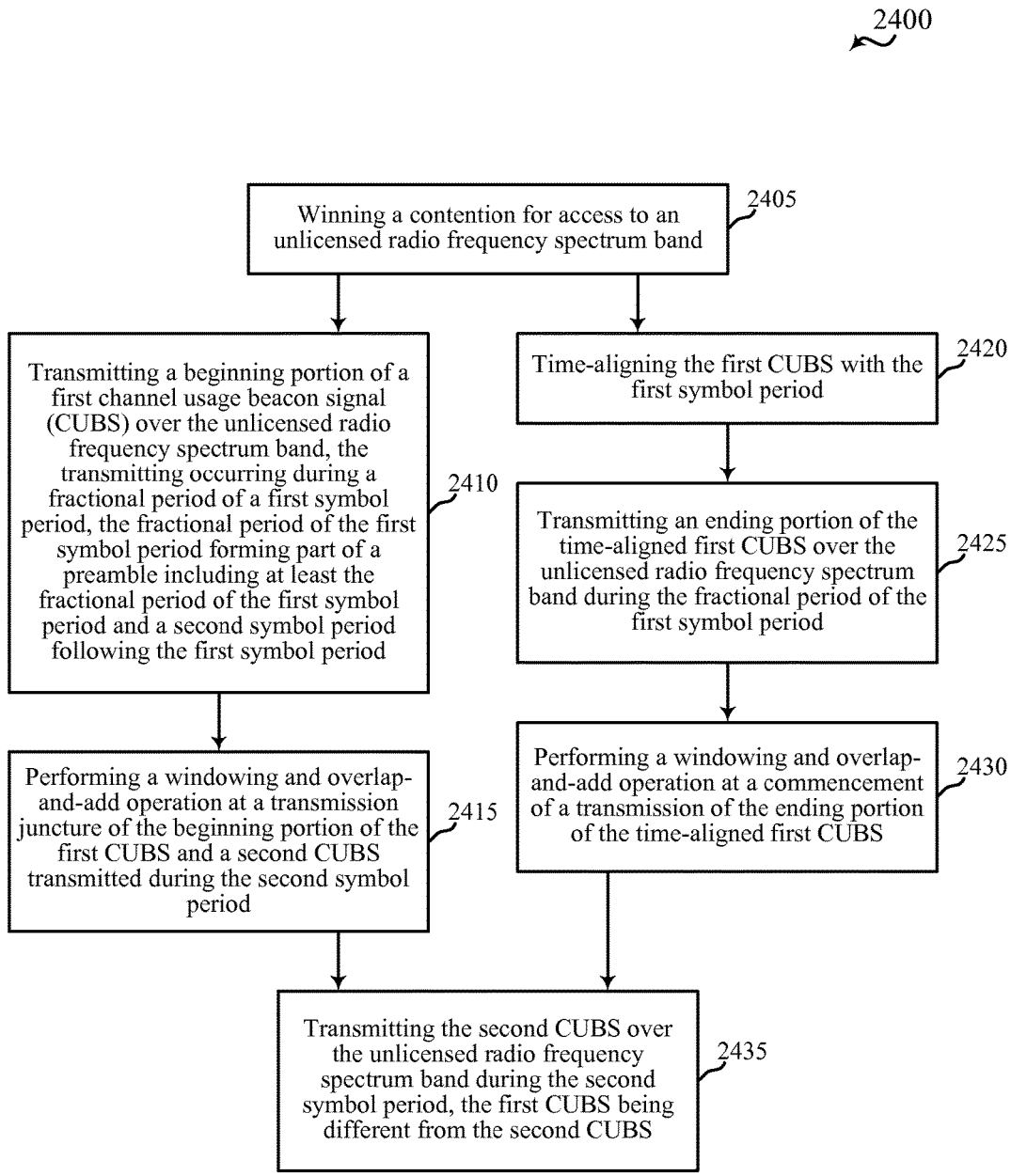
FIG. 24 is a flow chart illustrating an example of a method for wireless communication, in accordance with various aspects of the present disclosure.

FIG. 24 is a flow chart illustrating an example of a method 2400 for wireless communication, in accordance with various aspects of the present disclosure. For clarity, the method 2400 is described below with reference to aspects of one or more of the UEs 115, 215, 215-a, 215-b, 215-c, 1915, or 2115 described with reference to FIG. 1, 2, 19, or 21, or aspects of one or more of the apparatuses 1215, 1315, 1415, 1515, 1615, or 1715 described with reference to FIG. 12, 13, 14, 15, 16, or 17. In some examples, a UE or apparatus may execute one or more sets of codes to control the functional elements of the UE or apparatus to perform the functions described below. Additionally or alternatively, the UE or apparatus may perform one or more of the functions described below using special-purpose hardware.

At block 2405, the method 2400 may include winning a contention for access to an unlicensed radio frequency spectrum band. The unlicensed radio frequency spectrum band may include a radio frequency spectrum band for which transmitting apparatuses may need to contend for access because the radio frequency spectrum band is available for unlicensed use, such as Wi-Fi use. The operation(s) at block 2405 may be performed using the wireless communication management component 1220, 1320, 1420, 1520, 1620, 1720, 1960, or 2184 described with reference to FIG. 12, 13, 14, 15, 16, 17, 19, or 21, or the CCA component 1235, 1335, 1435, 1535, 1635, or 1735 described with reference to FIG. 12, 13, 14, 15, 16, or 17.

Following the operation(s) at block 2405, the method 2400 may continue at block 2410 or block 2420, depending on the configuration of a UE or apparatus performing the method 2400. At block 2410, the method 2400 may include transmitting a beginning portion of a first CUBS over the unlicensed radio frequency spectrum band. The transmitting may occur during fractional period of a first symbol period, which first symbol period forms part of a preamble including at least the fractional period of the first symbol period, and a second symbol period following the first symbol period. The operation(s) at block 2410 may be performed using the wireless communication management component 1220, 1320, 1420, 1520, 1620, 1720, 1960, or 2184 described with reference to FIG. 12, 13, 14, 15, 16, 17, 19, or 21, the CUBS management component 1340, 1440, 1540, 1640, or 1740 described with reference to FIG. 13, 14, 15, 16, or 17, or the CUBS portion selection component 1355, 1555, 1645, or 1745 described with reference to FIG. 13, 15, 16, or 17.

At block 2415, the method 2400 may include performing a windowing and overlap-and-add operation at a transmission juncture of the beginning portion of the first CUBS and a second CUBS, which second CUBS is transmitted during the second symbol period. In some examples, each of the first symbol period and the second symbol period may be an OFDM symbol period. The operation(s) at block 2415 may be performed using the wireless communication management component 1220, 1320, 1420, 1520, 1620, 1720, 1960, or 2184 described with reference to FIG. 12, 13, 14, 15, 16, 17, 19, or 21, the CUBS management component 1340, 1440, 1540, 1640, or 1740 described with reference to FIG. 13, 14, 15, 16, or 17, or the windowing and overlap-and-add component 1360, 1560, or 1775 described with reference to FIG. 13, 15, or 17.

At block 2420, the method 2400 may include time-aligning the first CUBS with the first symbol period, and at block 2425, the method 2400 may include transmitting an ending portion of the time-aligned first CUBS during the fractional period of the first symbol period. The operation(s) at block 2420 and/or 2425 may be performed using the wireless communication management component 1220, 1320, 1420, 1520, 1620, 1720, 1960, or 2184 described with reference to FIG. 12, 13, 14, 15, 16, 17, 19, or 21, the CUBS management component 1340, 1440, 1540, 1640, or 1740 described with reference to FIG. 13, 14, 15, 16, or 17, or the CUBS portion selection component 1355, 1555, 1645, or 1745 described with reference to FIG. 13, 15, 16, or 17.

At block 2430, the method 2400 may include performing a windowing and overlap-and-add operation at a commencement of a transmission of the ending portion of the time-aligned first CUBS. The operation(s) described in this paragraph may be performed using the wireless communication management component 1220, 1320, 1420, 1520, 1620, 1720, 1960, or 2184 described with reference to FIG. 12, 13, 14, 15, 16, 17, 19, or 21, the CUBS management component 1340, 1440, 1540, 1640, or 1740 described with reference to FIG. 13, 14, 15, 16, or 17, or the windowing and overlap-and-add component 1360, 1560, or 1775 described with reference to FIG. 13, 15, or 17.

At block 2435, the method 2400 may include transmitting the second CUBS during the second symbol period. The operation(s) at block 2435 may be performed using the wireless communication management component 1220, 1320, 1420, 1520, 1620, 1720, 1960, or 2184 described with reference to FIG. 12, 13, 14, 15, 16, 17, 19, or 21, or the CUBS management component 1340, 1440, 1540, 1640, or 1740 described with reference to FIG. 13, 14, 15, 16, or 17.

The beginning portion of the first CUBS and the second CUBS (transmitted at blocks 2410 and 2435) or the time-aligned ending portion of the first CUBS and the second CUBS (transmitted at blocks 2425 and 2435) may be transmitted in a number of frequency interlaces (e.g., one or more frequency interlaces) of the unlicensed radio frequency spectrum band. Each frequency interlace may include a plurality of contemporaneously transmitted resource blocks, with at least two of the contemporaneously transmitted resource blocks (or at least two sets of the contemporaneously transmitted resource blocks) being non-contiguous in the unlicensed radio frequency spectrum band. In some examples, the contemporaneously transmitted resource blocks may be uniformly spaced in the unlicensed radio frequency spectrum band. In other examples, the contemporaneously transmitted resource blocks may be non-uniformly spaced in the unlicensed radio frequency spectrum band.

In some examples of the method 2400, each of the first CUBS and the second CUBS may have a duration of one symbol period and be generated with a normal IFFT. In some examples of the method 2400, the second CUBS may include a copy of a signal included in a transmission to be made over the unlicensed radio frequency spectrum band subsequent to a transmission of at least a portion of the first CUBS and the second CUBS. In some examples, the signal included in the transmission to be made over the unlicensed radio frequency spectrum band subsequent to the transmission of the at least portion of the first CUBS and the second CUBS may include a DM-RS. In some examples, the transmission to be made over the unlicensed radio frequency spectrum band subsequent to the transmission of the at least portion of the first CUBS and the second CUBS may include a PUSCH, a PUCCH, a PRACH, an SRS, an SR, or a combination thereof.

In some examples of the method 2400, the at least portion of the first CUBS and the second CUBS may be transmitted over the unlicensed radio frequency spectrum band using a same set of antenna ports and precoder used for a first transmission (e.g., a PUSCH, a PUCCH, a PRACH, an SRS, an SR, or a combination thereof) over the unlicensed radio frequency spectrum band subsequent to the transmission of the at least portion of the first CUBS and the second CUBS.

Thus, the method 2400 may provide for wireless communication. It should be noted that the method 2400 is just one implementation and that the operations of the method 2400 may be rearranged or otherwise modified such that other implementations are possible.

Figure 25:
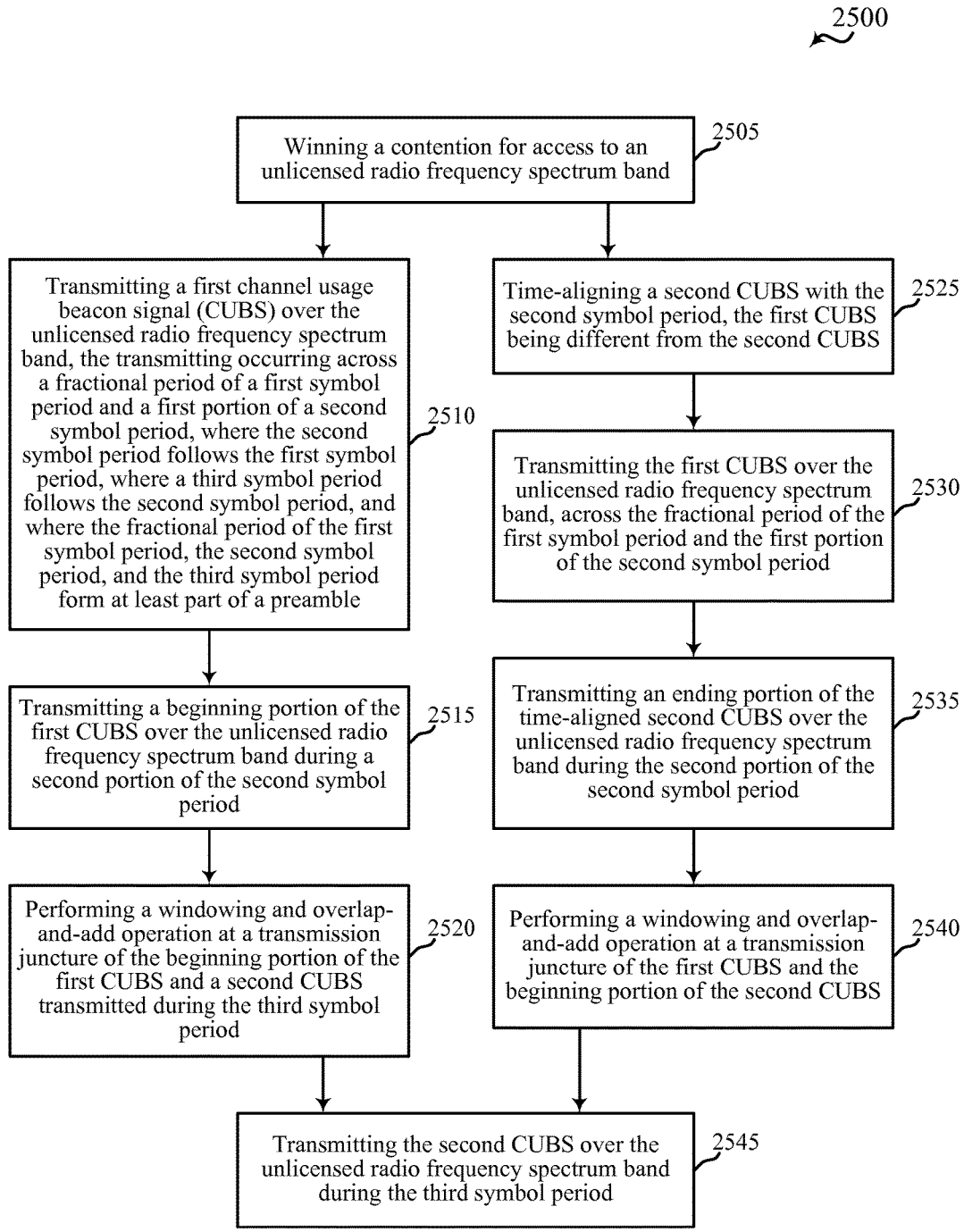
FIG. 25 is a flow chart illustrating an example of a method for wireless communication, in accordance with various aspects of the present disclosure.

FIG. 25 is a flow chart illustrating an example of a method 2500 for wireless communication, in accordance with various aspects of the present disclosure. For clarity, the method 2500 is described below with reference to aspects of one or more of the UEs 115, 215, 215-a, 215-b, 215-c, 1915, or 2115 described with reference to FIG. 1, 2, 19, or 21, or aspects of one or more of the apparatuses 1215, 1315, 1415, 1515, 1615, or 1715 described with reference to FIG. 12, 13, 14, 15, 16, or 17. In some examples, a UE or apparatus may execute one or more sets of codes to control the functional elements of the UE or apparatus to perform the functions described below. Additionally or alternatively, the UE or apparatus may perform one or more of the functions described below using special-purpose hardware.

At block 2505, the method 2500 may include winning a contention for access to an unlicensed radio frequency spectrum band. The unlicensed radio frequency spectrum band may include a radio frequency spectrum band for which transmitting apparatuses may need to contend for access because the radio frequency spectrum band is available for unlicensed use, such as Wi-Fi use. The operation(s) at block 2505 may be performed using the wireless communication management component 1220, 1320, 1420, 1520, 1620, 1720, 1960, or 2184 described with reference to FIG. 12, 13, 14, 15, 16, 17, 19, or 21, or the CCA component 1235, 1335, 1435, 1535, 1635, or 1735 described with reference to FIG. 12, 13, 14, 15, 16, or 17.

Following the operation(s) at block 2505, the method 2500 may continue at block 2510 or block 2525, depending on the example of a UE or apparatus performing the method 2500. At block 2510, the method 2500 may include transmitting a first CUBS over the unlicensed radio frequency spectrum band. The transmitting may occur across a fractional period of a first symbol period and a second symbol period. The second symbol period may follow the first symbol period, and a third symbol period may follow the second symbol period. The fractional period of the first symbol period, the second symbol period, and the third symbol period may form at least part of a preamble. In some examples, each of the first symbol period, the second symbol period, and the third symbol period may be an OFDM symbol period.

At block 2515, the method 2500 may include transmitting a beginning portion of the first CUBS over the unlicensed radio frequency spectrum band during a second portion of the second symbol period.

The operation(s) at block 2510 and/or 2515 may be performed using the wireless communication management component 1220, 1320, 1420, 1520, 1620, 1720, 1960, or 2184 described with reference to FIG. 12, 13, 14, 15, 16, 17, 19, or 21, the CUBS management component 1340, 1440, 1540, 1640, or 1740 described with reference to FIG. 13, 14, 15, 16, or 17, or the CUBS portion selection component 1355, 1555, 1645, or 1745 described with reference to FIG. 13, 15, 16, or 17.

At block 2520, the method 2500 may include performing a windowing and overlap-and-add operation at a transmission juncture of the beginning portion of the first CUBS and a second CUBS, which second CUBS is transmitted during the third symbol period. The operation(s) at block 2520 may be performed using the wireless communication management component 1220, 1320, 1420, 1520, 1620, 1720, 1960, or 2184 described with reference to FIG. 12, 13, 14, 15, 16, 17, 19, or 21, the CUBS management component 1340, 1440, 1540, 1640, or 1740 described with reference to FIG. 13, 14, 15, 16, or 17, or the windowing and overlap-and-add component 1360, 1560, or 1775 described with reference to FIG. 13, 15, or 17.

At block 2525, the method 2500 may include time-aligning the second CUBS with the second symbol period, and at block 2530, the method 2500 may include transmitting the first CUBS across the fractional period of the first symbol period and the first portion of the second symbol period.

At block 2535, the method 2500 may include transmitting an ending portion of the time-aligned second CUBS over the unlicensed radio frequency spectrum band during the second portion of the second symbol period.

The operation(s) at block 2525, 2530, and/or 2535 may be performed using the wireless communication management component 1220, 1320, 1420, 1520, 1620, 1720, 1960, or 2184 described with reference to FIG. 12, 13, 14, 15, 16, 17, 19, or 21, the CUBS management component 1340, 1440, 1540, 1640, or 1740 described with reference to FIG. 13, 14, 15, 16, or 17, or the CUBS portion selection component 1355, 1555, 1645, or 1745 described with reference to FIG. 13, 15, 16, or 17.

At block 2540, the method 2500 may include performing a windowing and overlap-and-add operation at a transmission juncture of the first CUBS and the ending portion of the time-aligned second CUBS. The operation(s) at block 2540 may be performed using the wireless communication management component 1220, 1320, 1420, 1520, 1620, 1720, 1960, or 2184 described with reference to FIG. 12, 13, 14, 15, 16, 17, 19, or 21, the CUBS management component 1340, 1440, 1540, 1640, or 1740 described with reference to FIG. 13, 14, 15, 16, or 17, or the windowing and overlap-and-add component 1360, 1560, or 1775 described with reference to FIG. 13, 15, or 17.

At block 2545, the method 2500 may include transmitting the second CUBS during the third symbol period. The operation(s) at block 2545 may be performed using the wireless communication management component 1220, 1320, 1420, 1520, 1620, 1720, 1960, or 2184 described with reference to FIG. 12, 13, 14, 15, 16, 17, 19, or 21, or the CUBS management component 1340, 1440, 1540, 1640, or 1740 described with reference to FIG. 13, 14, 15, 16, or 17.

The first CUBS, the beginning portion of the first CUBS, and the second CUBS (transmitted at blocks 2510, 2515, and 2545) or the first CUBS, the ending portion of the time-aligned second CUBS, and the second CUBS (transmitted at blocks 2525, 2535, and 2545) may be transmitted in a number of frequency interlaces (e.g., one or more frequency interlaces) of the unlicensed radio frequency spectrum band. Each frequency interlace may include a plurality of contemporaneously transmitted resource blocks, with at least two of the contemporaneously transmitted resource blocks (or at least two sets of the contemporaneously transmitted resource blocks) being non-contiguous in the unlicensed radio frequency spectrum band. In some examples, the contemporaneously transmitted resource blocks may be uniformly spaced in the unlicensed radio frequency spectrum band. In other examples, the contemporaneously transmitted resource blocks may be non-uniformly spaced in the unlicensed radio frequency spectrum band.

In some examples of the method 2500, each of the first CUBS and the second CUBS may have a duration of one symbol period and be generated with a normal IFFT. In some examples of the method 2500, the second CUBS may include a copy of a signal included in a transmission to be made over the unlicensed radio frequency spectrum band subsequent to a transmission of at least a portion of the first CUBS and the second CUBS. In some examples, the signal included in the transmission to be made over the unlicensed radio frequency spectrum band subsequent to the transmission of the at least portion of the first CUBS and the second CUBS may include a DM-RS. In some examples, the transmission to be made over the unlicensed radio frequency spectrum band subsequent to the transmission of the at least portion of the first CUBS and the second CUBS may include a PUSCH, a PUCCH, a PRACH, an SRS, an SR, or a combination thereof.

In some examples of the method 2500, the at least portion of the first CUBS and the second CUBS may be transmitted over the unlicensed radio frequency spectrum band using a same set of antenna ports and precoder used for a first transmission (e.g., a PUSCH, a PUCCH, a PRACH, an SRS, an SR, or a combination thereof) over the unlicensed radio frequency spectrum band subsequent to the transmission of the at least portion of the first CUBS and the second CUBS.

Thus, the method 2500 may provide for wireless communication. It should be noted that the method 2500 is just one implementation and that the operations of the method 2500 may be rearranged or otherwise modified such that other implementations are possible.

Figure 26:
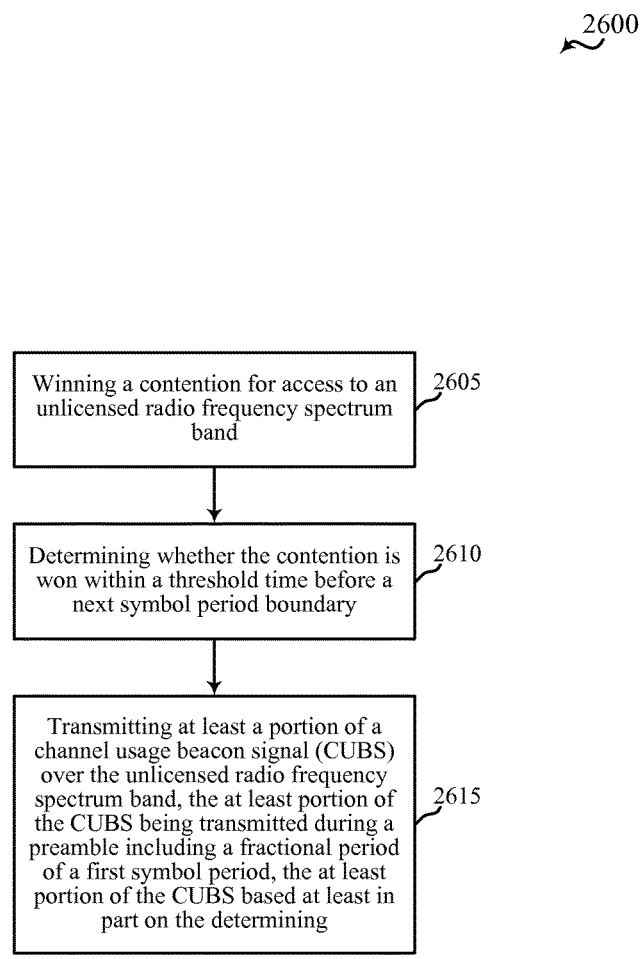
FIG. 26 is a flow chart illustrating an example of a method for wireless communication, in accordance with various aspects of the present disclosure.

FIG. 26 is a flow chart illustrating an example of a method 2600 for wireless communication, in accordance with various aspects of the present disclosure. For clarity, the method 2600 is described below with reference to aspects of one or more of the UEs 115, 215, 215-*a*, 215-*b*, 215-*c*, 1915, or 2115 described with reference to FIG. 1, 2, 19, or 21, or aspects of one or more of the apparatuses 1215, 1315, 1415, 1515, 1615, or 1715 described with reference to FIG. 12, 13, 14, 15, 16, or 17. In some examples, a UE or apparatus may execute one or more sets of codes to control the functional elements of the UE or apparatus to perform the functions described below. Additionally or alternatively, the UE or apparatus may perform one or more of the functions described below using special-purpose hardware.

At block 2605, the method 2600 may include winning a contention for access to an unlicensed radio frequency spectrum band. The unlicensed radio frequency spectrum band may include a radio frequency spectrum band for which transmitting apparatuses may need to contend for access because the radio frequency spectrum band is available for unlicensed use, such as Wi-Fi use. The operation(s) at block 2605 may be performed using the wireless communication management component 1220, 1320, 1420, 1520, 1620, 1720, 1960, or 2184 described with reference to FIG. 12, 13, 14, 15, 16, 17, 19, or 21, or the CCA component 1235, 1335, 1435, 1535, 1635, or 1735 described with reference to FIG. 12, 13, 14, 15, 16, or 17.

At block 2610, the method 2600 may include determining whether the contention is won within a threshold time before a next symbol period boundary. The operation(s) at block 2610 may be performed using the wireless communication management component 1220, 1320, 1420, 1520, 1620, 1720, 1960, or 2184 described with reference to FIG. 12, 13, 14, 15, 16, 17, 19, or 21, or the contention timing determination component 1445 or 1545 described with reference to FIG. 14 or 15.

At block 2615, the method 2600 may include transmitting at least a portion of a CUBS over the unlicensed radio frequency spectrum band. The at least portion of the CUBS may be transmitted during a preamble including a fractional period of a first symbol period, and may be based at least in part on the determination made at block 2610. In some examples, the at least portion of the CUBS may be transmitted in a number of frequency interlaces (e.g., one or more frequency interlaces) of the unlicensed radio frequency spectrum band. Each frequency interlace may include a plurality of contemporaneously transmitted resource blocks, with at least two of the contemporaneously transmitted resource blocks (or at least two sets of the contemporaneously transmitted resource blocks) being non-contiguous in the unlicensed radio frequency spectrum band. In some examples, the contemporaneously transmitted resource blocks may be uniformly spaced in the unlicensed radio frequency spectrum band. In other examples, the contemporaneously transmitted resource blocks may be non-uniformly spaced in the unlicensed radio frequency spectrum band. In some examples, the at least portion of the CUBS may include at least a portion of a first CUBS and at least a portion of a second CUBS. The operation(s) at block 2615 may be performed using the wireless communication management component 1220, 1320, 1420, 1520, 1620, 1720, 1960, or 2184 described with reference to FIG. 12, 13, 14, 15, 16, 17, 19, or 21, or the CUBS management component 1240, 1340, 1440, 1540, 1640, or 1740 described with reference to FIG. 12, 13, 14, 15, 16, or 17.

In some examples of the method 2600, the preamble may include one or more symbol periods following the first symbol period, such as a second symbol period following the first symbol period or a third symbol period following the second symbol period. In some examples, each of the first symbol period, the second symbol period, and the third symbol period may be an OFDM symbol period.

In some examples of the method 2600, it may be determined at block 2610 that the contention is won within the threshold time before the next symbol period boundary. In some of these examples, the at least portion of the CUBS may be transmitted during the second symbol period, and nothing may be transmitted during the fractional period of the first symbol period. The operation(s) described in this paragraph may be performed using the wireless communication management component 1220, 1320, 1420, 1520, 1620, 1720, 1960, or 2184 described with reference to FIG. 12, 13, 14, 15, 16, 17, 19, or 21, the CUBS management component 1340, 1440, 1540, 1640, or 1740 described with reference to FIG. 13, 14, 15, 16, or 17, or the CUBS portion selection component 1355, 1555, 1645, or 1745 described with reference to FIG. 13, 15, 16, or 17.

In some examples in which the at least portion of the CUBS includes at least a portion of a first CUBS and at least a portion of a second CUBS, and when it is determined at block 2610 that the contention is won within the threshold time before the next symbol period boundary, the method 2600 may include time-aligning the second CUBS with the second symbol period. In some of these examples, the transmitting performed at block 2615 may include transmitting the first CUBS across the fractional period of the first symbol period and a first portion of the second symbol period, and transmitting an ending portion of the time-aligned second CUBS during a second portion of the second symbol period. The operation(s) described in this paragraph may be performed using the wireless communication management component 1220, 1320, 1420, 1520, 1620, 1720, 1960, or 2184 described with reference to FIG. 12, 13, 14, 15, 16, 17, 19, or 21, the CUBS management component 1340, 1440, 1540, 1640, or 1740 described with reference to FIG. 13, 14, 15, 16, or 17, or the CUBS portion selection component 1355, 1555, 1645, or 1745 described with reference to FIG. 13, 15, 16, or 17.

In some examples in which the at least portion of the CUBS includes at least a portion of a first CUBS and at least a portion of a second CUBS, and when it is determined at block 2610 that the contention is won within the threshold time before the next symbol period boundary, the transmitting performed at block 2615 may include transmitting the first CUBS across the fractional period of the first symbol period and a first portion of the second symbol period; transmitting a beginning portion of the first CUBS during a second portion of the second symbol period; and transmitting the second CUBS during the third symbol period. The operation(s) described in this paragraph may be performed using the wireless communication management component 1220, 1320, 1420, 1520, 1620, 1720, 1960, or 2184 described with reference to FIG. 12, 13, 14, 15, 16, 17, 19, or 21, the CUBS management component 1340, 1440, 1540, 1640, or 1740 described with reference to FIG. 13, 14, 15, 16, or 17, or the CUBS portion selection component 1355, 1555, 1645, or 1745 described with reference to FIG. 13, 15, 16, or 17.

In some examples in which the at least portion of the CUBS includes at least a portion of a first CUBS and at least a portion of a second CUBS, and when it is determined at block 2610 that the contention is won within the threshold time before the next symbol period boundary, the method 2600 may include time-aligning the first CUBS with the first symbol period. In some of these examples, the transmitting performed at block 2615 may include transmitting an ending portion of the time-aligned first CUBS during the fractional period of the first symbol period, and transmitting the second CUBS during the second symbol period. The operation(s) described in this paragraph may be performed using the wireless communication management component 1220, 1320, 1420, 1520, 1620, 1720, 1960, or 2184 described with reference to FIG. 12, 13, 14, 15, 16, 17, 19, or 21, the CUBS management component 1340, 1440, 1540, 1640, or 1740 described with reference to FIG. 13, 14, 15, 16, or 17, or the CUBS portion selection component 1355, 1555, 1645, or 1745 described with reference to FIG. 13, 15, 16, or 17.

In some examples, the method 2600 may include performing a windowing and overlap-and-add operation at a transmission juncture of the at least portion of the first CUBS and the at least portion of the second CUBS. In some examples, the method 2600 may include performing a windowing and overlap-and-add operation at a commencement of a transmission of the at least portion of the first CUBS. The operation(s) described in this paragraph may be performed using the wireless communication management component 1220, 1320, 1420, 1520, 1620, 1720, 1960, or 2184 described with reference to FIG. 12, 13, 14, 15, 16, 17, 19, or 21, the CUBS management component 1340, 1440, 1540, 1640, or 1740 described with reference to FIG. 13, 14, 15, 16, or 17, or the windowing and overlap-and-add component 1360, 1560, or 1775 described with reference to FIG. 13, 15, or 17.

In some examples of the method 2600, each of the first CUBS and the second CUBS may have a duration of one symbol period and be generated with a normal IFFT. In some examples of the method 2600, the CUBS (or the second CUBS) may include a copy of a signal included in a transmission to be made over the unlicensed radio frequency spectrum band subsequent to a transmission of the at least portion of the CUBS (or subsequent to a transmission of the at least portion of the first CUBS and the at least portion of the second CUBS). In some examples, the signal included in the transmission to be made over the unlicensed radio frequency spectrum band subsequent to the transmission of the at least portion of the CUBS (or subsequent to the transmission of the at least portion of the first CUBS and the at least portion of the second CUBS) may include a DM-RS. In some examples, the transmission to be made over the unlicensed radio frequency spectrum band subsequent to the transmission of the at least portion of the CUBS (or subsequent to the transmission of the at least portion of the first CUBS and the at least portion of the second CUBS) may include a PUSCH, a PUCCH, a PRACH, an SRS, an SR, or a combination thereof.

In some examples of the method 2600, the at least portion of the CUBS (or the at least portion of the first CUBS and the at least portion of the second CUBS) may be transmitted over the unlicensed radio frequency spectrum band using a same set of antenna ports and precoder used for a first transmission (e.g., a PUSCH, a PUCCH, a PRACH, an SRS, an SR, or a combination thereof) over the unlicensed radio frequency spectrum band subsequent to the transmission of the at least portion of the CUBS (or the at least portion of the first CUBS and the at least portion of the second CUBS).

Thus, the method 2600 may provide for wireless communication. It should be noted that the method 2600 is just one implementation and that the operations of the method 2600 may be rearranged or otherwise modified such that other implementations are possible.

Figure 27:
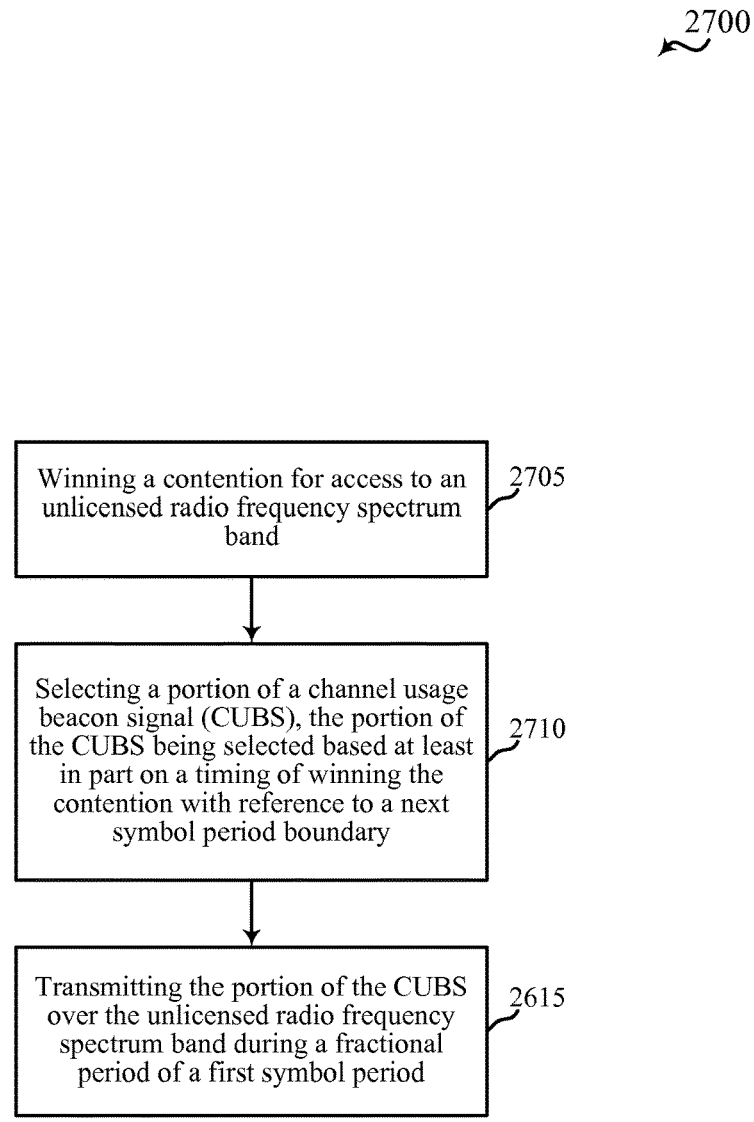
FIG. 27 is a flow chart illustrating an example of a method for wireless communication, in accordance with various aspects of the present disclosure.

FIG. 27 is a flow chart illustrating an example of a method 2700 for wireless communication, in accordance with various aspects of the present disclosure. For clarity, the method 2700 is described below with reference to aspects of one or more of the UEs 115, 215, 215-a, 215-b, 215-c, 1915, or 2115 described with reference to FIG. 1, 2, 19, or 21, or aspects of one or more of the apparatuses 1215, 1315, 1415, 1515, 1615, or 1715 described with reference to FIG. 12, 13, 14, 15, 16, or 17. In some examples, a UE or apparatus may execute one or more sets of codes to control the functional elements of the UE or apparatus to perform the functions described below. Additionally or alternatively, the UE or apparatus may perform one or more of the functions described below using special-purpose hardware.

At block 2705, the method 2700 may include winning a contention for access to an unlicensed radio frequency spectrum band. The unlicensed radio frequency spectrum band may include a radio frequency spectrum band for which transmitting apparatuses may need to contend for access because the radio frequency spectrum band is available for unlicensed use, such as Wi-Fi use. The operation(s) at block 2705 may be performed using the wireless communication management component 1220, 1320, 1420, 1520, 1620, 1720, 1960, or 2184 described with reference to FIG. 12, 13, 14, 15, 16, 17, 19, or 21, or the CCA component 1235, 1335, 1435, 1535, 1635, or 1735 described with reference to FIG. 12, 13, 14, 15, 16, or 17.

At block 2710, the method 2700 may include selecting a portion of a CUBS. The portion of the CUBS may be selected based at least in part on a timing of winning the contention with reference to a next symbol period boundary. The operation(s) at block 2710 may be performed using the wireless communication management component 1220, 1320, 1420, 1520, 1620, 1720, 1960, or 2184 described with reference to FIG. 12, 13, 14, 15, 16, 17, 19, or 21, the CUBS management component 1340, 1440, 1540, 1640, or 1740 described with reference to FIG. 13, 14, 15, 16, or 17, or the CUBS portion selection component 1355, 1555, 1645, or 1745 described with reference to FIG. 13, 15, 16, or 17.

At block 2715, the method 2700 may include transmitting the portion of the CUBS over the unlicensed radio frequency spectrum band during a fractional period of a symbol period. In some examples, the portion of the CUBS may be transmitted in a number of frequency interlaces (e.g., one or more frequency interlaces) of the unlicensed radio frequency spectrum band. Each frequency interlace may include a plurality of contemporaneously transmitted resource blocks, with at least two of the contemporaneously transmitted resource blocks (or at least two sets of the contemporaneously transmitted resource blocks) being non-contiguous in the unlicensed radio frequency spectrum band. In some examples, the contemporaneously transmitted resource blocks may be uniformly spaced in the unlicensed radio frequency spectrum band. In other examples, the contemporaneously transmitted resource blocks may be non-uniformly spaced in the unlicensed radio frequency spectrum band. The operation(s) at block 2715 may be performed using the wireless communication management component 1220, 1320, 1420, 1520, 1620, 1720, 1960, or 2184 described with reference to FIG. 12, 13, 14, 15, 16, 17, 19, or 21, or the CUBS management component 1240, 1340, 1440, 1540, 1640, or 1740 described with reference to FIG. 12, 13, 14, 15, 16, or 17.

Thus, the method 2700 may provide for wireless communication. It should be noted that the method 2700 is just one implementation and that the operations of the method 2700 may be rearranged or otherwise modified such that other implementations are possible.

Figure 28:
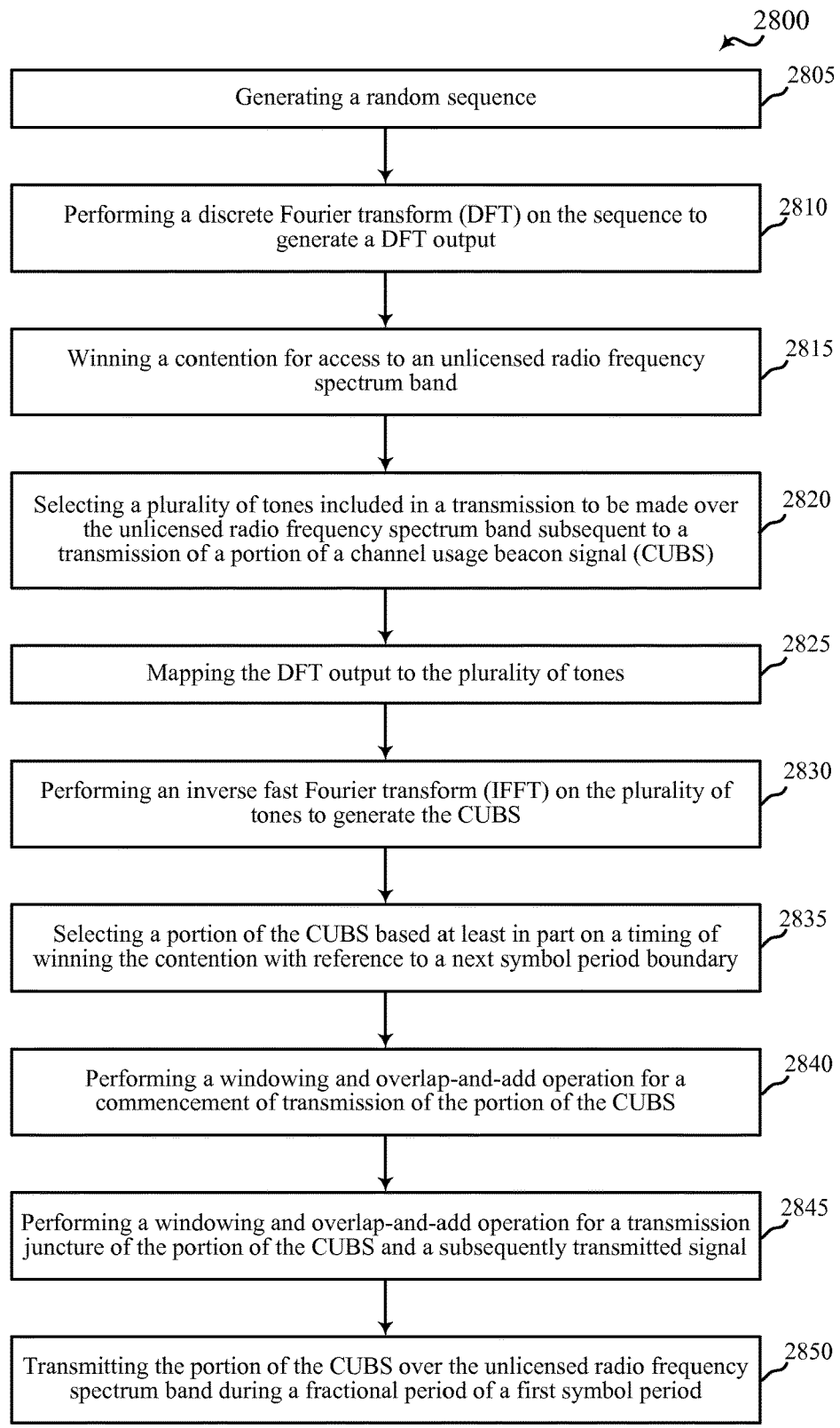
FIG. 28 is a flow chart illustrating an example of a method for wireless communication, in accordance with various aspects of the present disclosure.

FIG. 28 is a flow chart illustrating an example of a method 2800 for wireless communication, in accordance with various aspects of the present disclosure. For clarity, the method 2800 is described below with reference to aspects of one or more of the UEs 115, 215, 215-a, 215-b, 215-c, 1915, or 2115 described with reference to FIG. 1, 2, 19, or 21, or aspects of one or more of the apparatuses 1215, 1315, 1415, 1515, 1615, or 1715 described with reference to FIG. 12, 13, 14, 15, 16, or 17. In some examples, a UE or apparatus may execute one or more sets of codes to control the functional elements of the UE or apparatus to perform the functions described below. Additionally or alternatively, the UE or apparatus may perform one or more of the functions described below using special-purpose hardware.

At block 2805, the method 2800 may include generating a random sequence. In some examples, the random sequence may include a QPSK sequence. In some examples, the random sequence may include a sequence in a set of Generalized Zadoff-Chu or chirp-like sequences. In some examples, the random sequence may include a polyphase sequence. In some examples, the random sequence may have a length of ten terms (e.g., one term for each transmit antenna port in a UE employing ten transmit antenna ports). The operation(s) at block 2805 may be performed using the wireless communication management component 1220, 1320, 1420, 1520, 1620, 1720, 1960, or 2184 described with reference to FIG. 12, 13, 14, 15, 16, 17, 19, or 21, the CUBS management component 1340, 1440, 1540, 1640, or 1740 described with reference to FIG. 13, 14, 15, 16, or 17, or the sequence generation component 1750 described with reference to FIG. 17.

At block 2810, the method 2800 may include performing a DFT on the random sequence to generate a DFT output. In some examples, the DFT performed on the random sequence may have a length of ten. However, a length-10 DFT is not native to LTE/LTE-A. Therefore, in an alternative example of the method 2800, the operation(s) performed at block 2810 may include performing a DFT (e.g., a length-120 DFT) on the random sequence to generate an intermediate output, and down-sampling the intermediate output to generate the DFT output. In some examples of the method 2800, the output of block 2805 or 2810 may be pre-computed, stored, and used by the method 2800 at block 2825. The operation(s) at block 2810 may be performed using the wireless communication management component 1220, 1320, 1420, 1520, 1620, 1720, 1960, or 2184 described with reference to FIG. 12, 13, 14, 15, 16, 17, 19, or 21, the CUBS management component 1340, 1440, 1540, 1640, or 1740 described with reference to FIG. 13, 14, 15, 16, or 17, or the DFT component 1755 described with reference to FIG. 17.

At block 2815, the method 2800 may include winning a contention for access to an unlicensed radio frequency spectrum band. The unlicensed radio frequency spectrum band may include a radio frequency spectrum band for which transmitting apparatuses may need to contend for access because the radio frequency spectrum band is available for unlicensed use, such as Wi-Fi use. The operation(s) at block 2815 may be performed using the wireless communication management component 1220, 1320, 1420, 1520, 1620, 1720, 1960, or 2184 described with reference to FIG. 12, 13, 14, 15, 16, 17, 19, or 21, or the CCA component 1235, 1335, 1435, 1535, 1635, or 1735 described with reference to FIG. 12, 13, 14, 15, 16, or 17.

At block 2820, the method 2800 may include selecting a plurality of tones included in a transmission to be made over the unlicensed radio frequency spectrum band subsequent to a transmission of a portion of a CUBS. In some examples, the plurality of tones may have a uniform frequency spacing in the unlicensed radio frequency spectrum band. In some examples, the plurality of tones may have a non-uniform frequency spacing in the unlicensed radio frequency spectrum band. In some examples, the transmission to be made over the unlicensed radio frequency spectrum band subsequent to the transmission of the portion of the CUBS may include at least one of a PUSCH, a PUCCH, a PRACH, an SRS, or an SR. In some examples, a tone may be selected to maximize a distance (or distances), in the frequency spectrum, between the selected tone and a nearest tone (or tones) not allocated to the transmission to be made over the unlicensed radio frequency spectrum band subsequent to the transmission of the CUBS.

In some examples of the method 2800, selecting the plurality of tones at block 2820 may include selecting a tone in a middle of a resource block allocated to the transmission to be made over the unlicensed radio frequency spectrum band subsequent to the transmission of the portion of the CUBS. In some examples of the method 2800, selecting the plurality of tones at block 2820 may include selecting a tone in a middle of a contiguous resource block cluster allocated to the transmission to be made over the unlicensed radio frequency spectrum band subsequent to the transmission of the portion of the CUBS. Examples of tone selection are described in further detail with reference to FIG. 11.

The operation(s) at block 2820 may be performed using the wireless communication management component 1220, 1320, 1420, 1520, 1620, 1720, 1960, or 2184 described with reference to FIG. 12, 13, 14, 15, 16, 17, 19, or 21, the CUBS management component 1340, 1440, 1540, 1640, or 1740 described with reference to FIG. 13, 14, 15, 16, or 17, or the tone selection component 1760 described with reference to FIG. 17.

At block 2825, the method 2800 may include mapping the DFT output generated at block 2810 to the plurality of tones selected at block 2820. The operation(s) at block 2825 may be performed using the wireless communication management component 1220, 1320, 1420, 1520, 1620, 1720, 1960, or 2184 described with reference to FIG. 12, 13, 14, 15, 16, 17, 19, or 21, the CUBS management component 1340, 1440, 1540, 1640, or 1740 described with reference to FIG. 13, 14, 15, 16, or 17, or the mapping component 1765 described with reference to FIG. 17.

At block 2830, the method 2800 may include performing an IFFT on the plurality of tones to generate the CUBS. The operation(s) at block 2830 may be performed using the wireless communication management component 1220, 1320, 1420, 1520, 1620, 1720, 1960, or 2184 described with reference to FIG. 12, 13, 14, 15, 16, 17, 19, or 21, the CUBS management component 1340, 1440, 1540, 1640, or 1740 described with reference to FIG. 13, 14, 15, 16, or 17, or the IFFT component 1770 described with reference to FIG. 17.

At block 2835, the method 2800 may include selecting the portion of the CUBS. The portion of the CUBS may be selected based at least in part on a timing of winning the contention with reference to a next symbol period boundary. In some examples, the portion of the CUBS may include a beginning portion of the CUBS (e.g., the ending portion of the CUBS may be zeroed out (or punctured out) because the timing of winning the contention does not allow for transmission of the full CUBS prior to the next symbol period boundary). In some examples, the portion of the CUBS may include an ending portion of the CUBS (e.g., the beginning portion of the CUBS may be zeroed out (or punctured out) because the timing of winning the contention does not allow for transmission of the full CUBS prior to the next symbol period boundary). In some examples, the portion of the CUBS may be selected as described, for example, with reference to FIG. 7, 9, or 10. The operation(s) at block 2835 may be performed using the wireless communication management component 1220, 1320, 1420, 1520, 1620, 1720, 1960, or 2184 described with reference to FIG. 12, 13, 14, 15, 16, 17, 19, or 21, the CUBS management component 1340, 1440, 1540, 1640, or 1740 described with reference to FIG. 13, 14, 15, 16, or 17, or the CUBS portion selection component 1355, 1555, 1645, or 1745 described with reference to FIG. 13, 15, 16, or 17.

At block 2840, the method 2800 may include performing a windowing and overlap-and-add operation for a commencement of transmission of the portion of the CUBS. For example, a windowing and overlap-and-add with zero may be applied to the commencement of transmission of the portion of the CUBS, thereby applying a power ramp to the portion of the CUBS.

At block 2845, the method 2800 may include performing a windowing and overlap-and-add operation for a transmission juncture of the portion of the CUBS and a subsequently transmitted signal.

The operation(s) at block 2840 or 2845 may be performed using the wireless communication management component 1220, 1320, 1420, 1520, 1620, 1720, 1960, or 2184 described with reference to FIG. 12, 13, 14, 15, 16, 17, 19, or 21, the CUBS management component 1340, 1440, 1540, 1640, or 1740 described with reference to FIG. 13, 14, 15, 16, or 17, or the windowing and overlap-and-add component 1775 described with reference to FIG. 17.

At block 2850, the method 2800 may include transmitting the portion of the CUBS over the unlicensed radio frequency spectrum band during a fractional period of a symbol period. In some examples, the portion of the CUBS may be transmitted in a number of frequency interlaces (e.g., one or more frequency interlaces) of the unlicensed radio frequency spectrum band. Each frequency interlace may include a plurality of contemporaneously transmitted resource blocks, with at least two of the contemporaneously transmitted resource blocks (or at least two sets of the contemporaneously transmitted resource blocks) being non-contiguous in the unlicensed radio frequency spectrum band. In some examples, the contemporaneously transmitted resource blocks may be uniformly spaced in the unlicensed radio frequency spectrum band. In other examples, the contemporaneously transmitted resource blocks may be non-uniformly spaced in the unlicensed radio frequency spectrum band. The operation(s) at block 2850 may be performed using the wireless communication management component 1220, 1320, 1420, 1520, 1620, 1720, 1960, or 2184 described with reference to FIG. 12, 13, 14, 15, 16, 17, 19, or 21, or the CUBS management component 1240, 1340, 1440, 1540, 1640, or 1740 described with reference to FIG. 12, 13, 14, 15, 16, or 17.

Thus, the method 2800 may provide for wireless communication. It should be noted that the method 2800 is just one implementation and that the operations of the method 2800 may be rearranged or otherwise modified such that other implementations are possible.

In some examples, aspects of one or more of the methods 2200, 2300, 2400, 2500, 2600, 2700, or 2800 described with reference to FIG. 22, 23, 24, 25, 26, 27, or 28 may be combined.

Figure 29:
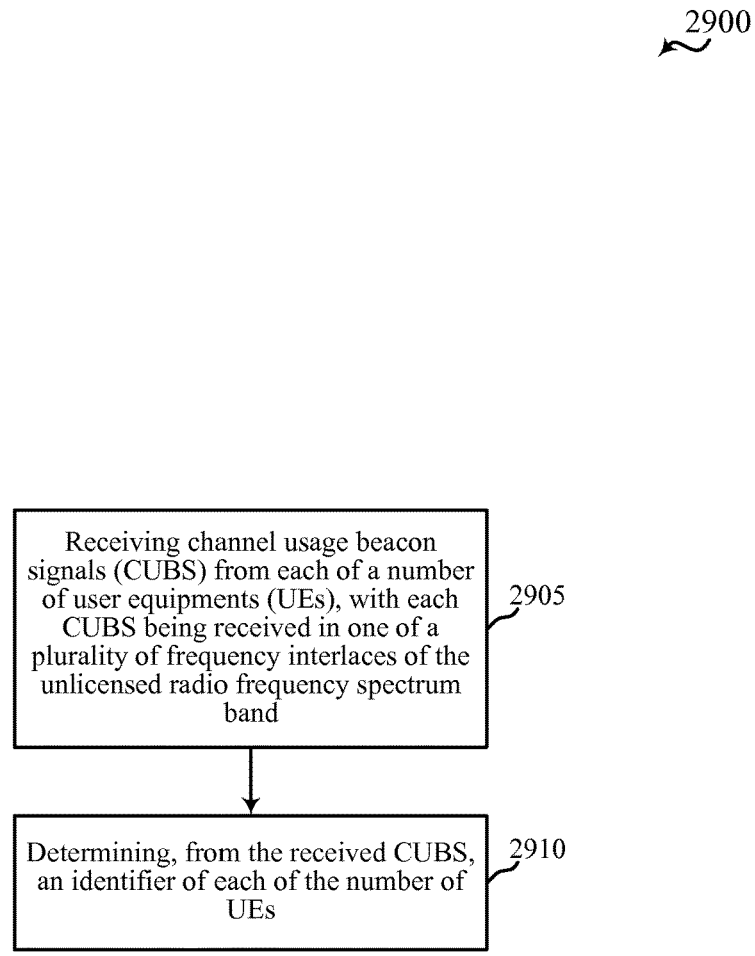
FIG. 29 is a flow chart illustrating an example of a method for wireless communication, in accordance with various aspects of the present disclosure.

FIG. 29 is a flow chart illustrating an example of a method 2900 for wireless communication, in accordance with various aspects of the present disclosure. For clarity, the method 2900 is described below with reference to aspects of one or more of the base stations 105, 205, 205-a, 2005, or 2105 described with reference to FIG. 1, 2, 20, or 21, or aspects of the apparatus 1805 described with reference to FIG. 18. In some examples, a base station or apparatus may execute one or more sets of codes to control the functional elements of the base station or apparatus to perform the functions described below. Additionally or alternatively, the base station or apparatus may perform one or more of the functions described below using special-purpose hardware.

At block 2905, the method 2900 may include receiving CUBS from each of a number of UEs. Each CUBS may be received in one of a plurality of frequency interlaces of the unlicensed radio frequency spectrum band. The operation(s) at block 2905 may be performed using the wireless communication management component 1820, 2060, or 2186 described with reference to FIG. 18, 20, or 21, or the CUBS management component 1835 described with reference to FIG. 18.

At block 2910, the method 2900 may include determining, from the received CUBS, an identifier of each of the number of UEs. In some examples of the method 2900, a portion of a first CUBS and a second CUBS may be received from a first UE, and an identifier of the first UE may be determined from the second CUBS. The operation(s) at block 2910 may be performed using the wireless communication management component 1820, 2060, or 2186 described with reference to FIG. 18, 20, or 21, or the UE identifier component 1840 described with reference to FIG. 18.

Thus, the method 2900 may provide for wireless communication. It should be noted that the method 2900 is just one implementation and that the operations of the method 2900 may be rearranged or otherwise modified such that other implementations are possible.

Figure 30:
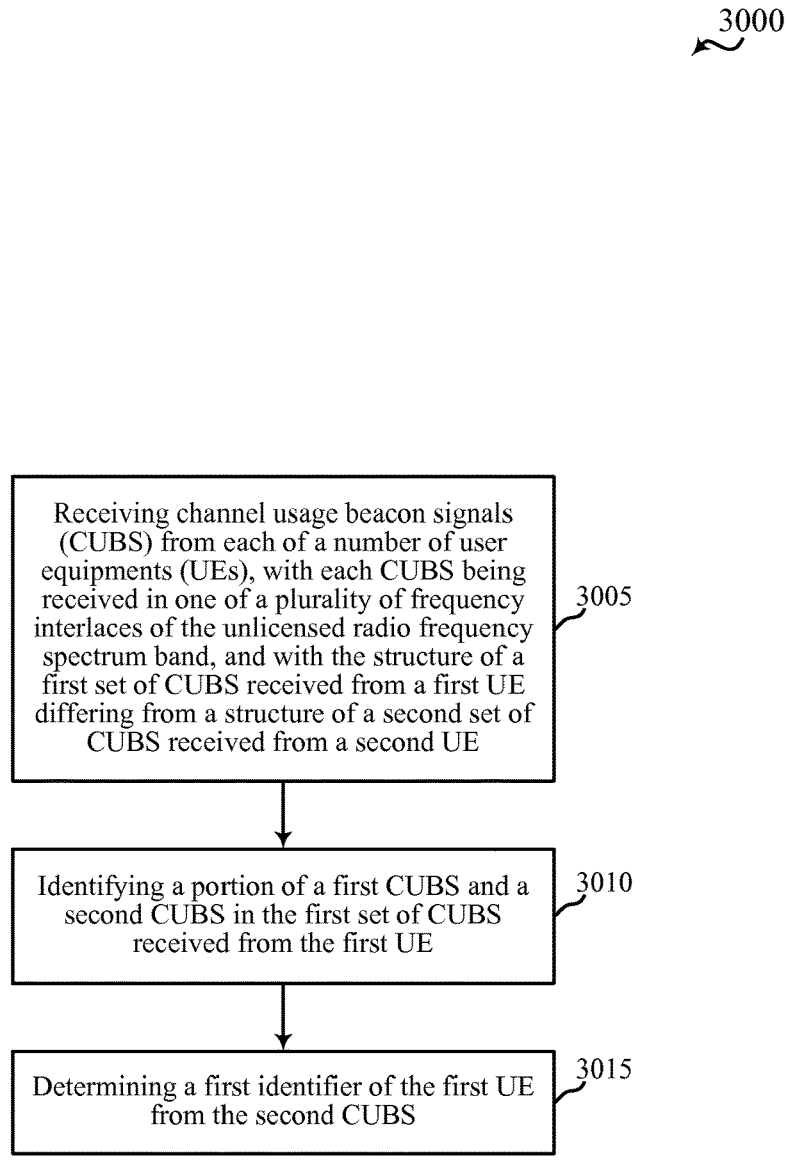
FIG. 30 is a flow chart illustrating an example of a method for wireless communication, in accordance with various aspects of the present disclosure.

FIG. 30 is a flow chart illustrating an example of a method 3000 for wireless communication, in accordance with various aspects of the present disclosure. For clarity, the method 3000 is described below with reference to aspects of one or more of the base stations 105, 205, 205-a, 2005, or 2105 described with reference to FIG. 1, 2, 20, or 21, or aspects of the apparatus 1805 described with reference to FIG. 18. In some examples, a base station or apparatus may execute one or more sets of codes to control the functional elements of the base station or apparatus to perform the functions described below. Additionally or alternatively, the base station or apparatus may perform one or more of the functions described below using special-purpose hardware.

At block 3005, the method 3000 may include receiving CUBS from each of a number of UEs. Each CUBS may be received in one of a plurality of frequency interlaces of the unlicensed radio frequency spectrum band. In some examples, a structure of a first set of CUBS received from a first UE may differ from a structure of a second set of CUBS received from a second UE, as described, for example, with reference to FIG. 8, 9, or 10. The operation(s) at block 3005 may be performed using the wireless communication management component 1820, 2060, or 2186 described with reference to FIG. 18, 20, or 21, or the CUBS management component 1835 described with reference to FIG. 18.

At block 3010, the method 3000 may include identifying a portion of a first CUBS and a second CUBS in the first set of CUBS received from the first UE. The operation(s) at block 3010 may be performed using the wireless communication management component 1820, 2060, or 2186 described with reference to FIG. 18, 20, or 21, or the CUBS management component 1835 described with reference to FIG. 18.

At block 3015, the method 3000 may include determining a first identifier of the first UE from the second CUBS. The operation(s) at block 3015 may be performed using the wireless communication management component 1820, 2060, or 2186 described with reference to FIG. 18, 20, or 21, or the UE identifier component 1840 described with reference to FIG. 18.

Thus, the method 3000 may provide for wireless communication. It should be noted that the method 3000 is just one implementation and that the operations of the method 3000 may be rearranged or otherwise modified such that other implementations are possible.

In some examples, aspects of the methods 2900 and 3000 described with reference to FIGS. 29 and 30 may be combined.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such example.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
winning, by a user equipment (UE), a contention for access to an unlicensed radio frequency spectrum band; and
transmitting, by the UE, at least a portion of a first channel usage beacon signal (CUBS) and at least a portion of a second CUBS over the unlicensed radio frequency spectrum band, the at least a portion of the first CUBS and the at least a portion of the second CUBS being transmitted in a number of frequency interlaces of the unlicensed radio frequency spectrum band, wherein the first CUBS is different from the second CUBS.

2. The method of claim 1, wherein the transmitting occurs during a preamble comprising at least a fractional period of a first symbol period.

3. The method of claim 2, wherein the first symbol period comprises a plurality of sub-periods, and wherein the transmitting comprises:
transmitting an instance of the first CUBS in each of a number of full sub-periods that follow the winning the contention for access to the unlicensed radio frequency spectrum band.

4. The method of claim 3, wherein the first CUBS comprises a periodic zero crossing that provides smoothness in time domain when the instance of the first CUBS is abutted to another instance of the first CUBS or the second CUBS.

5. The method of claim 2, wherein the preamble comprises a second symbol period following the first symbol period, and wherein the transmitting comprises:
transmitting a beginning portion of the first CUBS during the fractional period of the first symbol period; and
transmitting the second CUBS during the second symbol period.

6. The method of claim 2, wherein the preamble comprises a second symbol period following the first symbol period, the method further comprising:
time-aligning the second CUBS with the second symbol period;
wherein the transmitting comprises:
transmitting the first CUBS across the fractional period of the first symbol period and a first portion of the second symbol period; and
transmitting an ending portion of the time-aligned second CUBS during a second portion of the second symbol period.

7. The method of claim 2, wherein the preamble comprises a second symbol period following the first symbol period and a third symbol period following the second symbol period, and wherein the transmitting comprises:
transmitting the first CUBS across the fractional period of the first symbol period and a first portion of the second symbol period;
transmitting a beginning portion of the first CUBS during a second portion of the second symbol period; and
transmitting the second CUBS during the third symbol period.

8. The method of claim 2, wherein the preamble comprises a second symbol period following the first symbol period, the method further comprising:
time-aligning the first CUBS with the first symbol period;
wherein the transmitting comprises:
transmitting an ending portion of the time-aligned first CUBS during the fractional period of the first symbol period; and
transmitting the second CUBS during the second symbol period.

9. The method of claim 2, further comprising:
performing a windowing and overlap-and-add operation at a transmission juncture of the at least portion of the first CUBS and the at least portion of the second CUBS.

10. The method of claim 2, further comprising:
performing a windowing and overlap-and-add operation at a commencement of transmission of the at least portion of the first CUBS.

11. The method of claim 2, wherein each of the first CUBS and the second CUBS comprises a duration of one symbol period.

12. The method of claim 2, wherein the second CUBS comprises a copy of a signal included in a transmission to be made over the unlicensed radio frequency spectrum band subsequent to the transmission of the at least portion of the first CUBS and the at least portion of the second CUBS.

13. The method of claim 12, wherein the signal comprises a demodulation reference signal (DM-RS).

14. The method of claim 12, wherein the transmission comprises at least one of:
a physical uplink shared channel (PUSCH), a physical uplink control channel (PUCCH), a physical random access channel (PRACH), a sounding reference signal (SRS), a scheduling request (SR), or a combination thereof.

15. The method of claim 2, wherein the at least portion of the first CUBS and the at least portion of the second CUBS are transmitted over the unlicensed radio frequency spectrum band using a same set of antenna ports and precoder used for a first transmission over the unlicensed radio frequency spectrum band subsequent to the transmission of the at least portion of the first CUBS and the at least portion of the second CUBS.

16. An apparatus for wireless communication, comprising:
means for winning, by a user equipment (UE), a contention for access to an unlicensed radio frequency spectrum band; and
means for transmitting, by the UE, at least a portion of a first channel usage beacon signal (CUBS) and at least a portion of a second CUBS over the unlicensed radio frequency spectrum band, the at least a portion of the first CUBS and the at least a portion of the second CUBS being transmitted in a number of frequency interlaces of the unlicensed radio frequency spectrum band, wherein the first CUBS is different from the second CUBS.

17. The apparatus of claim 16, wherein the transmitting occurs during a preamble comprising at least a fractional period of a first symbol period.

18. The apparatus of claim 17, wherein the first symbol period comprises a plurality of sub-periods, and wherein the means for transmitting comprises:
means for transmitting an instance of the first CUBS in each of a number of full sub-periods that follow the winning the contention for access to the unlicensed radio frequency spectrum band.

19. The apparatus of claim 18, wherein the first CUBS comprises a periodic zero crossing that provides smoothness in time domain when the instance of the first CUBS is abutted to another instance of the first CUBS or the second CUBS.

20. The apparatus of claim 17, wherein the preamble comprises a second symbol period following the first symbol period, and wherein the means for transmitting comprises:
means for transmitting a beginning portion of the first CUBS during the fractional period of the first symbol period; and
means for transmitting the second CUBS during the second symbol period.

21. The apparatus of claim 17, wherein the preamble comprises a second symbol period following the first symbol period, the apparatus further comprising:
means for time-aligning the second CUBS with the second symbol period;
wherein the means for transmitting comprises:
means for transmitting the first CUBS across the fractional period of the first symbol period and a first portion of the second symbol period; and
means for transmitting an ending portion of the time-aligned second CUBS during a second portion of the second symbol period.

22. The apparatus of claim 17, wherein the preamble comprises a second symbol period following the first symbol period and a third symbol period following the second symbol period, and wherein the means for transmitting comprises:
means for transmitting the first CUBS across the fractional period of the first symbol period and a first portion of the second symbol period;
means for transmitting a beginning portion of the first CUBS during a second portion of the second symbol period; and
means for transmitting the second CUBS during the third symbol period.

23. The apparatus of claim 17, wherein the preamble comprises a second symbol period following the first symbol period, the apparatus further comprising:
means for time-aligning the first CUBS with the first symbol period;
wherein the means for transmitting comprises:
means for transmitting an ending portion of the time-aligned first CUBS during the fractional period of the first symbol period; and
means for transmitting the second CUBS during the second symbol period.

24. The apparatus of claim 17, further comprising:
means for performing a windowing and overlap-and-add operation at a transmission juncture of the at least portion of the first CUBS and the at least portion of the second CUBS.

25. The apparatus of claim 17, further comprising:
means for performing a windowing and overlap-and-add operation at a commencement of transmission of the at least portion of the first CUBS.

26. The apparatus of claim 17, wherein each of the first CUBS and the second CUBS comprises a duration of one symbol period.

27. The apparatus of claim 17, wherein the second CUBS comprises a copy of a signal included in a transmission to be made over the unlicensed radio frequency spectrum band subsequent to the transmission of the at least portion of the first CUBS and the at least portion of the second CUBS.

28. The apparatus of claim 27, wherein the signal comprises a demodulation reference signal (DM-RS).

29. The apparatus of claim 27, wherein the transmission comprises at least one of:
a physical uplink shared channel (PUSCH), a physical uplink control channel (PUCCH), a physical random access channel (PRACH), a sounding reference signal (SRS), a scheduling request (SR), or a combination thereof.

30. The apparatus of claim 17, wherein the at least portion of the first CUBS and the at least portion of the second CUBS are transmitted over the unlicensed radio frequency spectrum band using a same set of antenna ports and precoder used for a first transmission over the unlicensed radio frequency spectrum band subsequent to the transmission of the at least portion of the first CUBS and the at least portion of the second CUBS.

31. The apparatus of claim 17, wherein the apparatus comprises the UE.

32. An apparatus for wireless communication, comprising:
a processor;
memory in electronic communication with the processor; and
the processor and memory configured to:
win, by a user equipment (UE), a contention for access to an unlicensed radio frequency spectrum band; and
transmit, by the UE, at least a portion of a first channel usage beacon signal (CUBS) and at least a portion of a second CUBS over the unlicensed radio frequency spectrum band, the at least a portion of the first CUBS and the at least a portion of the second CUBS being transmitted in a number of frequency interlaces of the unlicensed radio frequency spectrum band, wherein the first CUBS is different from the second CUBS.

33. The apparatus of claim 32, wherein the transmitting occurs during a preamble comprising at least a fractional period of a first symbol period.

34. The apparatus of claim 33, wherein the first symbol period comprises a plurality of sub-periods, and wherein the processor and memory configured to transmit comprise instructions executable by the processor to:
transmit an instance of the first CUBS in each of a number of full sub-periods that follow the winning the contention for access to the unlicensed radio frequency spectrum band.

35. The apparatus of claim 34, wherein the first CUBS comprises a periodic zero crossing that provides smoothness in the time domain when the instance of the first CUBS is abutted to another instance of the first CUBS or the second CUBS.

36. The apparatus of claim 33, wherein the preamble comprises a second symbol period following the first symbol period, and wherein the processor and memory configured to transmit comprise instructions executable by the processor to:
transmit a beginning portion of the first CUBS during the fractional period of the first symbol period; and
transmit the second CUBS during the second symbol period.

37. The apparatus of claim 33, wherein the preamble comprises a second symbol period following the first symbol period, and wherein the processor and memory are configured to:
time-align the first CUBS with the first symbol period;
wherein the instructions executable by the processor to transmit comprise instructions executable by the processor to:
transmit an ending portion of the time-aligned first CUBS during the fractional period of the first symbol period; and
transmit the second CUBS during the second symbol period.

38. The apparatus of claim 33, wherein the processor and memory are configured to:
perform a windowing and overlap-and-add operation at a transmission juncture of the at least portion of the first CUBS and the at least portion of the second CUBS.

39. The apparatus of claim 33, wherein processor and memory are configured to:
perform a windowing and overlap-and-add operation at a commencement of transmission of the at least portion of the first CUBS.

40. The apparatus of claim 33, wherein the apparatus comprises the UE.

41. A non-transitory computer-readable medium storing computer-executable code for wireless communications, the code executable by a processor to:
win, by a user equipment (UE), a contention for access to an unlicensed radio frequency spectrum band; and
transmit, by the UE, at least a portion of a first channel usage beacon signal (CUBS) and at least a portion of a second CUBS over the unlicensed radio frequency spectrum band, the at least a portion of the first CUBS and the at least a portion of the second CUBS being transmitted in a number of frequency interlaces of the unlicensed radio frequency spectrum band, wherein the first CUBS is different from the second CUBS.

42. The non-transitory computer-readable medium of claim 41, wherein the transmitting occurs during a preamble comprising at least a fractional period of a first symbol period.

43. The non-transitory computer-readable medium of claim 42, wherein the first symbol period comprises a plurality of sub-periods, and wherein the code executable by the processor to transmit comprises code executable by the processor to:
transmit an instance of the first CUBS in each of a number of full sub-periods that follow the winning the contention for access to the unlicensed radio frequency spectrum band.

44. The non-transitory computer-readable medium of claim 42, wherein the preamble comprises a second symbol period following the first symbol period, and wherein the code executable by the processor to transmit comprises code executable by the processor to:
transmit a beginning portion of the first CUBS during the fractional period of the first symbol period; and
transmit the second CUBS during the second symbol period.

45. The non-transitory computer-readable medium of claim 42, wherein the preamble comprises a second symbol period following the first symbol period, and wherein the code is executable by the processor to:
time-align the first CUBS with the first symbol period;
wherein the code executable by the processor to transmit comprises code executable by the processor to:
transmit an ending portion of the time-aligned first CUBS during the fractional period of the first symbol period; and
transmit the second CUBS during the second symbol period.

46. A method for wireless communication, comprising:
winning, by a user equipment (UE), a contention for access to an unlicensed radio frequency spectrum band;
determining, by the UE, whether the contention is won outside of a threshold time before a next symbol period boundary of the unlicensed radio spectrum band or within the threshold time before the next symbol period boundary; and
transmitting, by the UE, at least a portion of a channel usage beacon signal (CUBS) over the unlicensed radio frequency spectrum band, the at least portion of the CUBS being transmitted during a preamble comprising a fractional period of a first symbol period, the at least portion of the CUBS based at least in part on the determining.

47. The method of claim 46, wherein:
the contention is won within the threshold time before the next symbol period boundary;
the preamble comprises a second symbol period following the fractional period of the first symbol period; and
the at least portion of the CUBS is transmitted during the second symbol period.

48. The method of claim 46, wherein:
the contention is won within the threshold time before the next symbol period boundary;
the preamble comprises a second symbol period following the fractional period of the first symbol period; and
the at least portion of the CUBS comprises a first CUBS transmitted across the fractional period of the first symbol period and a first portion of the second symbol period; the method further comprising:
time-aligning a second CUBS with the second symbol period; and
transmitting an ending portion of the time-aligned second CUBS over the unlicensed radio frequency spectrum band during a second portion of the second symbol period.

49. The method of claim 46, wherein:
the contention is won within the threshold time before the next symbol period boundary;
the preamble comprises a second symbol period and a third symbol period following the fractional period of the first symbol period; and
the at least portion of the CUBS comprises a first CUBS transmitted across the fractional period of the first symbol period and a first portion of the second symbol period; the method further comprising:
transmitting a beginning portion of the first CUBS over the unlicensed radio frequency spectrum band during a second portion of the second symbol period; and
transmitting a second CUBS over the unlicensed radio frequency spectrum band during the third symbol period.

50. The method of claim 46, wherein:
the contention is won within the threshold time before the next symbol period boundary;
the preamble comprises a second symbol period following the fractional period of the first symbol period;
the CUBS comprises a first CUBS; the method further comprising:
time-aligning the first CUBS with the first symbol period;
transmitting an ending portion of the time-aligned first CUBS over the unlicensed radio frequency spectrum band during the fractional period of the first symbol period; and
transmitting a second CUBS over the unlicensed radio frequency spectrum band during the second symbol period.

51. An apparatus for wireless communication, comprising:
means for winning, by a user equipment (UE), a contention for access to an unlicensed radio frequency spectrum band;
means for determining, by the UE, whether the contention is won outside of a threshold time before a next symbol period boundary of the unlicensed radio frequency spectrum band or within the threshold time before the next symbol period boundary; and means for transmitting, by the UE, at least a portion of a channel usage beacon signal (CUBS) over the unlicensed radio frequency spectrum band, the at least portion of the CUBS being transmitted during a preamble comprising a fractional period of a first symbol period, the at least portion of the CUBS based at least in part on the determining.

52. The apparatus of claim 51, wherein:
the contention is won within the threshold time before the next symbol period boundary;
the preamble comprises a second symbol period following the fractional period of the first symbol period; and
the at least portion of the CUBS is transmitted during the second symbol period.

53. The apparatus of claim 51, wherein:
the contention is won within the threshold time before the next symbol period boundary;
the preamble comprises a second symbol period following the fractional period of the first symbol period; and
the at least portion of the CUBS comprises a first CUBS transmitted across the fractional period of the first symbol period and a first portion of the second symbol period; the apparatus further comprising:
means for time-aligning a second CUBS with the second symbol period; and
means for transmitting an ending portion of the time-aligned second CUBS over the unlicensed radio frequency spectrum band during a second portion of the second symbol period.

54. The apparatus of claim 51, wherein:
the contention is won within the threshold time before the next symbol period boundary;
the preamble comprises a second symbol period and a third symbol period following the fractional period of the first symbol period; and
the at least portion of the CUBS comprises a first CUBS transmitted across the fractional period of the first symbol period and a first portion of the second symbol period; the apparatus further comprising:
means for transmitting a beginning portion of the first CUBS over the unlicensed radio frequency spectrum band during a second portion of the second symbol period; and
means for transmitting a second CUBS over the unlicensed radio frequency spectrum band during the third symbol period.

55. The apparatus of claim 51, wherein:
the contention is won within the threshold time before the next symbol period boundary;
the preamble comprises a second symbol period following the fractional period of the first symbol period;
the CUBS comprises a first CUBS; the apparatus further comprising:
means for time-aligning the first CUBS with the first symbol period;
means for transmitting an ending portion of the time-aligned first CUBS over the unlicensed radio frequency spectrum band during the fractional period of the first symbol period; and
means for transmitting a second CUBS over the unlicensed radio frequency spectrum band during the second symbol period.

56. The apparatus of claim 51, wherein the apparatus comprises the UE.

57. An apparatus for wireless communication, comprising:
a processor;
memory in electronic communication with the processor; and
the processor and memory configured to:
win, by a user equipment (UE), a contention for access to an unlicensed radio frequency spectrum band;
determine, by the UE, whether the contention is won outside of a threshold time before a next symbol period boundary of the unlicensed radio frequency spectrum band or within the threshold time before the next symbol period boundary; and
transmit, by the UE, at least a portion of a channel usage beacon signal (CUBS) over the unlicensed radio frequency spectrum band, the at least portion of the CUBS being transmitted during a preamble comprising a fractional period of a first symbol period, the at least portion of the CUBS based at least in part on the determining.

58. The apparatus of claim 57, wherein:
the contention is won within the threshold time before the next symbol period boundary;
the preamble comprises a second symbol period following the fractional period of the first symbol period; and
the at least portion of the CUBS comprises a first CUBS transmitted across the fractional period of the first symbol period and a first portion of the second symbol period;
wherein the processor and memory are configured to:
time-align a second CUBS with the second symbol period; and
transmit an ending portion of the time-aligned second CUBS over the unlicensed radio frequency spectrum band during a second portion of the second symbol period.

59. The apparatus of claim 57, wherein:
the contention is won within the threshold time before the next symbol period boundary;
the preamble comprises a second symbol period and a third symbol period following the fractional period of the first symbol period; and
the at least portion of the CUBS comprises a first CUBS transmitted across the fractional period of the first symbol period and a first portion of the second symbol period;
wherein the processor and memory are configured to:
transmit a beginning portion of the first CUBS over the unlicensed radio frequency spectrum band during a second portion of the second symbol period; and
transmit a second CUBS over the unlicensed radio frequency spectrum band during the third symbol period.

60. The apparatus of claim 57, wherein:
the contention is won within the threshold time before the next symbol period boundary;
the preamble comprises a second symbol period following the fractional period of the first symbol period;
the CUBS comprises a first CUBS; wherein the processor and memory are configured to:
time-align the first CUBS with the first symbol period;
transmit an ending portion of the time-aligned first CUBS over the unlicensed radio frequency spectrum band during the fractional period of the first symbol period; and
transmit a second CUBS over the unlicensed radio frequency spectrum band during the second symbol period.

61. A non-transitory computer-readable medium storing computer-executable code for wireless communications, the code executable by a processor to:
- win, by a user equipment (UE), a contention for access to an unlicensed radio frequency spectrum band;
- determine, by the UE, whether the contention is won outside of a threshold time before a next symbol period boundary of the unlicensed radio frequency spectrum band or within the threshold time before the next symbol period boundary; and
- transmit, by the UE, at least a portion of a channel usage beacon signal (CUBS) over the unlicensed radio frequency spectrum band, the at least portion of the CUBS being transmitted during a preamble comprising a fractional period of a first symbol period, the at least portion of the CUBS based at least in part on the determining.

62. The non-transitory computer-readable medium of claim 61, wherein:
- the contention is won within the threshold time before the next symbol period boundary;
- the preamble comprises a second symbol period following the fractional period of the first symbol period; and
- the at least portion of the CUBS comprises a first CUBS transmitted across the fractional period of the first symbol period and a first portion of the second symbol period;

wherein the code is executable by the processor to:
- time-align a second CUBS with the second symbol period; and
- transmit an ending portion of the time-aligned second CUBS over the unlicensed radio frequency spectrum band during a second portion of the second symbol period.

63. The non-transitory computer-readable medium of claim 61, wherein:
- the contention is won within the threshold time before the next symbol period boundary;
- the preamble comprises a second symbol period and a third symbol period following the fractional period of the first symbol period; and
- the at least portion of the CUBS comprises a first CUBS transmitted across the fractional period of the first symbol period and a first portion of the second symbol period;

wherein the code is executable by the processor to:
- transmit a beginning portion of the first CUBS over the unlicensed radio frequency spectrum band during a second portion of the second symbol period; and
- transmit a second CUBS over the unlicensed radio frequency spectrum band during the third symbol period.

64. The non-transitory computer-readable medium of claim 61, wherein:
- the contention is won within the threshold time before the next symbol period boundary;
- the preamble comprises a second symbol period following the fractional period of the first symbol period;
- the CUBS comprises a first CUBS; wherein the code is executable by the processor to:
- time-align the first CUBS with the first symbol period;
- transmit an ending portion of the time-aligned first CUBS over the unlicensed radio frequency spectrum band during the fractional period of the first symbol period; and
- transmit a second CUBS over the unlicensed radio frequency spectrum band during the second symbol period.

65. A method for wireless communication, comprising:
- winning, by a user equipment (UE), a contention for access to an unlicensed radio frequency spectrum band;
- selecting, by the UE, a portion of a channel usage beacon signal (CUBS), the portion of the CUBS being selected based at least in part on a timing of winning the contention with reference to a next symbol period boundary of the unlicensed radio frequency spectrum band;
- performing, by the UE, a windowing and overlap-and-add operation for the portion of the CUBS; and
- transmitting, by the UE, the portion of the CUBS over the unlicensed radio frequency spectrum band during a fractional period of a symbol period based at least in part on the windowing and overlap-and-add operation.

66. The method of claim 65, further comprising:
- selecting, by the UE, a plurality of tones included in a transmission to be made over the unlicensed radio frequency spectrum band subsequent to a transmission of the at least portion of the CUBS;
- mapping a discrete Fourier transform (DFT) output to the plurality of tones; and
- performing an inverse fast Fourier transform (IFFT) on the plurality of tones to generate the CUBS.

67. The method of claim 66, further comprising:
generating a random sequence; and
performing a DFT on the random sequence to generate the DFT output.

68. The method of claim 67, wherein the random sequence comprises a quadrature phase-shift keying (QPSK) sequence.

69. The method of claim 67, wherein the random sequence comprises a sequence in a set of Generalized Zadoff-Chu or chirp-like sequences.

70. The method of claim 67, wherein the random sequence comprises a polyphase sequence.

71. The method of claim 67, wherein the plurality of tones includes ten tones, wherein the random sequence has a length of ten terms, and wherein the DFT performed on the random sequence has a length of ten.

72. The method of claim 66, further comprising:
generating a random sequence;
performing a DFT on the random sequence to generate an intermediate output; and
down-sampling the intermediate output to generate the DFT output.

73. The method of claim 66, wherein the transmission to be made over the unlicensed radio frequency spectrum band subsequent to the transmission of the portion of the CUBS comprises at least one of:
a physical uplink shared channel (PUSCH), a physical uplink control channel (PUCCH), a physical random access channel (PRACH), a sounding reference signal (SRS), or a scheduling request (SR).

74. The method of claim 66, wherein selecting the plurality of tones comprises:
selecting a tone in a middle of a resource block allocated to the transmission to be made over the unlicensed radio frequency spectrum band subsequent to the transmission of the portion of the CUBS.

75. The method of claim 66, wherein selecting the plurality of tones comprises:
selecting a tone in a middle of a contiguous resource block cluster allocated to the transmission to be made over the unlicensed radio frequency spectrum band subsequent to the transmission of the portion of the CUBS.

76. The method of claim 66, wherein the plurality of tones has a uniform frequency spacing in the unlicensed radio frequency spectrum band.

77. The method of claim 66, wherein the plurality of tones has a non-uniform frequency spacing in the unlicensed radio frequency spectrum band.

78. The method of claim 65, wherein performing the windowing and overlap-and-add operation further comprises:
performing a windowing and overlap-and-add operation for a transmission juncture of the portion of the CUBS and a subsequently transmitted signal.

79. The method of claim 65, wherein performing the windowing and overlap-and-add operation further comprises:
performing a windowing and overlap-and-add operation for a commencement of transmission of the portion of the CUBS.

80. The method of claim 65, wherein the portion of the CUBS comprises a beginning portion of the CUBS.

81. The method of claim 65, wherein the portion of the CUBS comprises an ending portion of the CUBS.

82. An apparatus for wireless communication, comprising:
means for winning, by a user equipment (UE), a contention for access to an unlicensed radio frequency spectrum band;
means for selecting, by the UE, a portion of a channel usage beacon signal (CUBS), the portion of the CUBS being selected based at least in part on a timing of winning the contention with reference to a next symbol period boundary of the unlicensed radio frequency spectrum band;
means for performing, by the UE, a windowing and overlap-and-add operation for the portion of the CUBS; and
means for transmitting, by the UE, the portion of the CUBS over the unlicensed radio frequency spectrum band during a fractional period of a symbol period based at least in part on the windowing and overlap-and-add operation.

83. The apparatus of claim 82, further comprising:
means for selecting, by the UE, a plurality of tones included in a transmission to be made over the unlicensed radio frequency spectrum band subsequent to a transmission of the at least portion of the CUBS;
means for mapping a discrete Fourier transform (DFT) output to the plurality of tones; and
means for performing an inverse fast Fourier transform (IFFT) on the plurality of tones to generate the CUBS.

84. The apparatus of claim 83, further comprising:
means for generating a random sequence; and
means for performing a DFT on the random sequence to generate the DFT output.

85. The apparatus of claim 84, wherein the random sequence comprises a quadrature phase-shift keying (QPSK) sequence.

86. The apparatus of claim 84, wherein the random sequence comprises a sequence in a set of Generalized Zadoff-Chu or chirp-like sequences.

87. The apparatus of claim 84, wherein the random sequence comprises a polyphase sequence.

88. The apparatus of claim 84, wherein the plurality of tones includes ten tones, wherein the random sequence has a length of ten terms, and wherein the DFT performed on the random sequence has a length of ten.

89. The apparatus of claim 83, further comprising:
means for generating a random sequence;
means for performing a DFT on the random sequence to generate an intermediate output; and
means for down-sampling the intermediate output to generate the DFT output.

90. The apparatus of claim 83, wherein the transmission to be made over the unlicensed radio frequency spectrum band subsequent to the transmission of the portion of the CUBS comprises at least one of:
a physical uplink shared channel (PUSCH), a physical uplink control channel (PUCCH), a physical random access channel (PRACH), a sounding reference signal (SRS), or a scheduling request (SR).

91. The apparatus of claim 83, wherein the means for selecting the plurality of tones comprises:
means for selecting a tone in a middle of a resource block allocated to the transmission to be made over the unlicensed radio frequency spectrum band subsequent to the transmission of the portion of the CUBS.

92. The apparatus of claim 83, wherein the means for selecting the plurality of tones comprises:
means for selecting a tone in a middle of a contiguous resource block cluster allocated to the transmission to be made over the unlicensed radio frequency spectrum band subsequent to the transmission of the portion of the CUBS.

93. The apparatus of claim 83, wherein the plurality of tones has a uniform frequency spacing in the unlicensed radio frequency spectrum band.

94. The apparatus of claim 83, wherein the plurality of tones has a non-uniform frequency spacing in the unlicensed radio frequency spectrum band.

95. The apparatus of claim 82, wherein the means for performing a windowing and overlap-and-add operation:
means for performing a windowing and overlap-and-add operation for a transmission juncture of the portion of the CUBS and a subsequently transmitted signal.

96. The apparatus of claim 82, wherein the means for performing a windowing and overlap-and-add operation:
means for performing a windowing and overlap-and-add operation for a commencement of transmission of the portion of the CUBS.

97. The apparatus of claim 82, wherein the portion of the CUBS comprises a beginning portion of the CUBS.

98. The apparatus of claim 82, wherein the portion of the CUBS comprises an ending portion of the CUBS.

99. An apparatus for wireless communication, comprising:
a processor;
memory in electronic communication with the processor; and
the processor and memory configured to:
win, by a user equipment (UE), a contention for access to an unlicensed radio frequency spectrum band;
select, by the UE, a portion of a channel usage beacon signal (CUBS), the portion of the CUBS being selected based at least in part on a timing of winning the contention with reference to a next symbol period boundary of the unlicensed radio frequency spectrum band;
perform, by the UE, a windowing and overlap-and-add operation for the portion of the CUBS; and
transmit, by the UE, the portion of the CUBS over the unlicensed radio frequency spectrum band during a fractional period of a symbol period based at least in part on the windowing and overlap-and-add operation.

100. The apparatus of claim 99, wherein the processor and memory are configured to:
- select a plurality of tones included in a transmission to be made over the unlicensed radio frequency spectrum band subsequent to a transmission of the at least portion of the CUBS;
- map a discrete Fourier transform (DFT) output to the plurality of tones; and
- perform an inverse fast Fourier transform (IFFT) on the plurality of tones to generate the CUBS.

101. The apparatus of claim 100, wherein the processor and memory are configured to:
- generate a random sequence; and
- perform a DFT on the random sequence to generate the DFT output.

102. The apparatus of claim 100, wherein the transmission to be made over the unlicensed radio frequency spectrum band subsequent to the transmission of the portion of the CUBS comprises at least one of:
- a physical uplink shared channel (PUSCH), a physical uplink control channel (PUCCH), a physical random access channel (PRACH), a sounding reference signal (SRS), or a scheduling request (SR).

103. The apparatus of claim 100, wherein processor and memory configured to select the plurality of tones comprise instructions executable by the processor to:
- select a tone in a middle of a resource block allocated to the transmission to be made over the unlicensed radio frequency spectrum band subsequent to the transmission of the portion of the CUBS.

104. The apparatus of claim 100, wherein the processor and memory configured to select the plurality of tones comprise instructions executable by the processor to:
- select a tone in a middle of a contiguous resource block cluster allocated to the transmission to be made over the unlicensed radio frequency spectrum band subsequent to the transmission of the portion of the CUBS.

105. The apparatus of claim 99, wherein performing a windowing and overlap-and-add operation further comprises:
- performing a windowing and overlap-and-add operation for a transmission juncture of the portion of the CUBS and a subsequently transmitted signal.

106. The apparatus of claim 99, wherein performing a windowing and overlap-and-add operation further comprises:
- performing a windowing and overlap-and-add operation for a commencement of transmission of the portion of the CUBS.

107. The apparatus of claim 99, wherein the portion of the CUBS comprises a beginning portion of the CUBS.

108. The apparatus of claim 99, wherein the portion of the CUBS comprises an ending portion of the CUBS.

109. A non-transitory computer-readable medium storing computer-executable code for wireless communications, the code executable by a processor to:
- win, by a user equipment (UE), a contention for access to an unlicensed radio frequency spectrum band;
- select, by the UE, a portion of a channel usage beacon signal (CUBS), the portion of the CUBS being selected based at least in part on a timing of winning the contention with reference to a next symbol period boundary of the unlicensed radio frequency spectrum band;
- perform, by the UE, a windowing and overlap-and-add operation for a commencement of transmission of the portion of the CUBS; and
- transmit, by the UE, the portion of the CUBS over the unlicensed radio frequency spectrum band during a fractional period of a symbol period based at least in part on the windowing and overlap-and-add operation.

110. The non-transitory computer-readable medium of claim 109, wherein the code is executable by the processor to:
- select a plurality of tones included in a transmission to be made over the unlicensed radio frequency spectrum band subsequent to a transmission of the at least portion of the CUBS;
- map a discrete Fourier transform (DFT) output to the plurality of tones; and
- perform an inverse fast Fourier transform (IFFT) on the plurality of tones to generate the CUBS.

111. The non-transitory computer-readable medium of claim 110, wherein the code is executable by the processor to:
- generate a random sequence; and
- perform a DFT on the random sequence to generate the DFT output.

* * * * *